(12) United States Patent
Machida

(10) Patent No.: US 7,223,174 B2
(45) Date of Patent: *May 29, 2007

(54) PROGRAM FOR IMPLEMENTING A GAME AND GAMING MACHINE

(75) Inventor: Matsuzo Machida, Tokyo (JP)

(73) Assignee: Aruze Corporation, Tokyo (JP)

( * ) Notice: Subject to any disclaimer, the term of this patent is extended or adjusted under 35 U.S.C. 154(b) by 406 days.

This patent is subject to a terminal disclaimer.

(21) Appl. No.: 10/869,973

(22) Filed: Jun. 18, 2004

(65) Prior Publication Data

US 2004/0259614 A1 Dec. 23, 2004

(30) Foreign Application Priority Data

Jun. 19, 2003 (JP) ............................ 2003-175064
Jun. 19, 2003 (JP) ............................ 2003-175065
Jun. 19, 2003 (JP) ............................ 2003-175066

(51) Int. Cl.
*A63F 13/00* (2006.01)

(52) U.S. Cl. ..................................... 463/43; 463/31

(58) Field of Classification Search .................. 463/1, 463/30, 37, 38, 43–44, 31
See application file for complete search history.

(56) References Cited

U.S. PATENT DOCUMENTS 5,435,554 A * 7/1995 Lipson ........................... 463/3
6,217,446 B1 * 4/2001 Sanbongi et al. ............... 463/7
6,257,983 B1 * 7/2001 Rimoto ........................ 463/38
2004/0259617 A1 * 12/2004 Machida ........................ 463/5

FOREIGN PATENT DOCUMENTS

JP 2002-200354 7/2002

* cited by examiner

*Primary Examiner*—Kim Nguyen
(74) *Attorney, Agent, or Firm*—Snider & Associates; Ronald R. Snider

(57) ABSTRACT

A conventional game program involves the risk of the player losing interest in the game. A computer-readable program product which enables a beginner player to sufficiently enjoy interest in a game is provided. A character to be subjected to ring customization is selected. If a technical ring is selected as a ring type after the subject has been determined to be change of a ring type, an ally character makes attacks only when the player has performed operation input with a rotary bar situated in any of timing areas. When a gamble ring is selected as the ring type, only one timing area is available. In a case where a practice ring is selected as the ring type, determination of operation input timing is continuously made in all the remaining timing areas even when the operation input has been performed with the rotary bar not situated in any timing area.

22 Claims, 50 Drawing Sheets

SCREEN FOR INITIATING COMBAT SITUATION

FIG. 8A

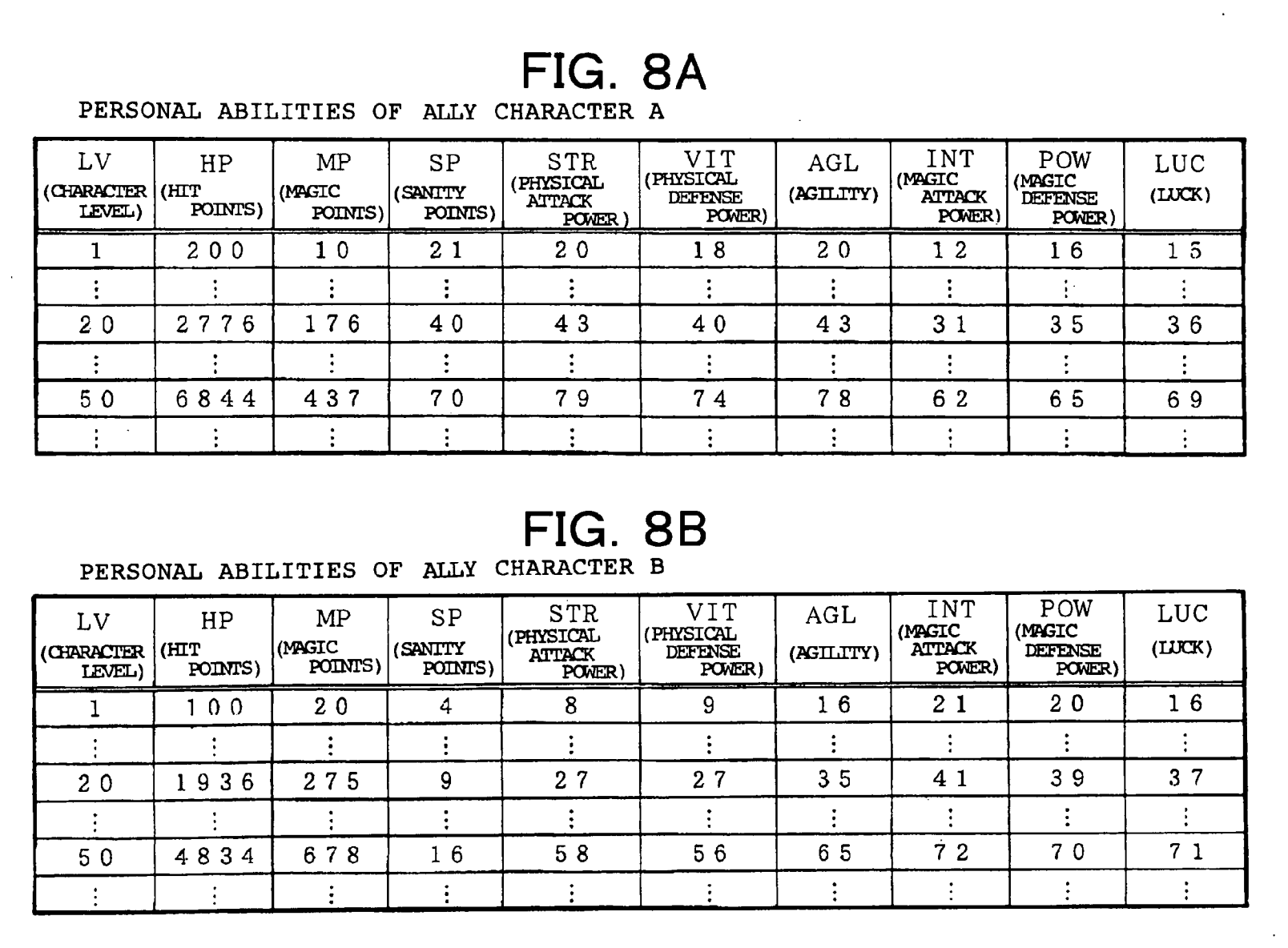

PERSONAL ABILITIES OF ALLY CHARACTER A

| LV (CHARACTER LEVEL) | HP (HIT POINTS) | MP (MAGIC POINTS) | SP (SANITY POINTS) | STR (PHYSICAL ATTACK POWER) | VIT (PHYSICAL DEFENSE POWER) | AGL (AGILITY) | INT (MAGIC ATTACK POWER) | POW (MAGIC DEFENSE POWER) | LUC (LUCK) |
|---|---|---|---|---|---|---|---|---|---|
| 1 | 200 | 10 | 21 | 20 | 18 | 20 | 12 | 16 | 15 |
| ... | ... | ... | ... | ... | ... | ... | ... | ... | ... |
| 20 | 2776 | 176 | 40 | 43 | 40 | 43 | 31 | 35 | 36 |
| ... | ... | ... | ... | ... | ... | ... | ... | ... | ... |
| 50 | 6844 | 437 | 70 | 79 | 74 | 78 | 62 | 65 | 69 |
| ... | ... | ... | ... | ... | ... | ... | ... | ... | ... |

FIG. 8B

PERSONAL ABILITIES OF ALLY CHARACTER B

| LV (CHARACTER LEVEL) | HP (HIT POINTS) | MP (MAGIC POINTS) | SP (SANITY POINTS) | STR (PHYSICAL ATTACK POWER) | VIT (PHYSICAL DEFENSE POWER) | AGL (AGILITY) | INT (MAGIC ATTACK POWER) | POW (MAGIC DEFENSE POWER) | LUC (LUCK) |
|---|---|---|---|---|---|---|---|---|---|
| 1 | 100 | 20 | 4 | 8 | 9 | 16 | 21 | 20 | 16 |
| ... | ... | ... | ... | ... | ... | ... | ... | ... | ... |
| 20 | 1936 | 275 | 9 | 27 | 27 | 35 | 41 | 39 | 37 |
| ... | ... | ... | ... | ... | ... | ... | ... | ... | ... |
| 50 | 4834 | 678 | 16 | 58 | 56 | 65 | 72 | 70 | 71 |
| ... | ... | ... | ... | ... | ... | ... | ... | ... | ... |

EXAMPLE DISPLAY OF CHARACTER HAVING BECOME OUT OF CONTROL AT SANITY POINT 0

EXAMPLE DISPLAY OF CHARACTER HAVING BECOME OUT OF CONTROL AT SANITY POINT 0

OBJECT CHARACTER SELECT SCREEN

SCREEN DISPLAYED AT THE TIME OF DETERMINATION OF COMMAND
(JUDGMENT RING DISPLAY)

SCREEN SHOWING SHATTERING OF JUDGMENT RING

EXAMPLE SCREEN DISPLAY PROVIDED DURING BATTLE ACTION INITIATION SCREEN

EXAMPLE SCREEN DISPLAY PROVIDED DURING BATTLE ACTION END SCREEN

FIG. 26

(WEAPON TABLE)

| ALLY CHARACTER | ITEM TO BE USED | INDIVIDUAL CAPABILITY OF ITEM TO BE USED | FIRST TIMING AREA [°] | | | SECOND TIMING AREA [°] | | | THIRD TIMING AREA [°] | | |
|---|---|---|---|---|---|---|---|---|---|---|---|
| | | | STARTING ANGLE | ENDING ANGLE | 120% AREA | STARTING ANGLE | ENDING ANGLE | 120% AREA | STARTING ANGLE | ENDING ANGLE | 120% AREA |
| A | WEAPON A1 | 6 | 45 | 135 | 30 | 180 | 247 | 23 | 292 | 337 | 15 |
| A | WEAPON A2 | 28 | 45 | 115 | 23 | 180 | 231 | 17 | 292 | 325 | 11 |
| A | WEAPON A3 | 50 | 45 | 100 | 18 | 180 | 219 | 13 | 292 | 316 | 8 |
| B | WEAPON B1 | 3 | 50 | 125 | 25 | 157 | 205 | 16 | 247 | 282 | 12 |
| B | WEAPON B2 | 20 | 50 | 105 | 18 | 157 | 193 | 12 | 247 | 273 | 9 |
| B | WEAPON B3 | 37 | 50 | 90 | 13 | 157 | 177 | 7 | 247 | 261 | 5 |
| C | WEAPON C1 | 42 | 22 | 90 | 23 | 202 | 260 | 19 | 270 | 310 | 13 |
| C | WEAPON C2 | 21 | 22 | 70 | 16 | 202 | 240 | 14 | 270 | 298 | 9 |
| C | WEAPON C3 | 38 | 22 | 55 | 11 | 202 | 232 | 10 | 270 | 289 | 6 |

FIG. 27

AMOUNT OF DAMAGE INFLICTED ON COUNTERPART = ASSIGNMENT VALUE × REMAINING SP CORRECTION VALUE × PERSONAL CAPABILITY OF CHARACTER × CAPABILITY OF INDIVIDUAL ITEM TO BE USED × JUDGMENT RING CORRECTION VALUE

| NUMBER OF ATTACK | ASSIGNMENT VALUE |
|---|---|
| FIRST TIME | 0.2 |
| SECOND TIME | 0.3 |
| THIRD TIME | 0.5 |

AT THE TIME OF PHYSICAL ATTACK
(WHEN COMMAND IS DETERMINED)

AT THE TIME OF PHYSICAL ATTACK
(AFTER DETERMINATION OF COMMAND)

FIG. 31

(SPECIAL TABLE)

| ALLY CHARACTER | SPECIAL ABILITY | ABILITY VALUE | FIRST TIMING AREA [°] | | | SECOND TIMING AREA [°] | | | THIRD TIMING AREA [°] | | |
|---|---|---|---|---|---|---|---|---|---|---|---|
| | | | STARTING ANGLE | ENDING ANGLE | 120% AREA | STARTING ANGLE | ENDING ANGLE | 120% AREA | STARTING ANGLE | ENDING ANGLE | 120% AREA |
| A | ATTACK MAGIC 1 | 99 | 45 | 180 | 20 | | | | | | |
| A | ATTACK MAGIC 2 | 18 | 60 | 165 | 12 | 220 | 265 | 8 | | | |
| A | ATTACK MAGIC 3 | 34 | 30 | 85 | 10 | 195 | 230 | 13 | 285 | 310 | 3 |
| B | RECOVERY MAGIC 1 | 19 | 45 | 315 | 31 | | | | | | |
| B | RECOVERY MAGIC 2 | 38 | 60 | 180 | 18 | 270 | 350 | 12 | | | |
| B | RECOVERY MAGIC 3 | 50 | 45 | 120 | 12 | 135 | 186 | 8 | 270 | 310 | 5 |
| C | | | | | | | | | | | |

FIG. 32

(1) AMOUNT OF DAMAGE INFLICTED ON COUNTERPART WHEN ATTACK MAGIC IS USED = ASSIGNMENT VALUE × PERSONAL CAPABILITY OF CHARACTER × CAPABILITY VALUE OF SPECIAL CAPABILITY TO BE USED × JUDGMENT RING CORRECTION VALUE (2) RECOVERY VALUE WHEN RECOVERY MAGIC IS USED = ASSIGNMENT VALUE × CAPABILITY VALUE OF SPECIAL CAPABILITY TO BE USED × JUDGMENT RING CORRECTION VALUE

| NUMBER OF USE OF SPECIAL CAPABILITY | ASSIGNMENT VALUE |
|---|---|
| FIRST TIME | 0.2 |
| SECOND TIME | 0.3 |
| THIRD TIME | 0.5 |

FIG. 33

(ITEM TABLE)

| ALLY CHARACTER | ITEM TO BE USED | INDIVIDUAL CAPABILITY OF ITEM TO BE USED | FIRST TIMING AREA [°] | | | SECOND TIMING AREA [°] | | | THIRD TIMING AREA [°] | | |
|---|---|---|---|---|---|---|---|---|---|---|---|
| | | | STARTING ANGLE | ENDING ANGLE | 120% AREA | STARTING ANGLE | ENDING ANGLE | 120% AREA | STARTING ANGLE | ENDING ANGLE | 120% AREA |
| COMMON | ITEM A | 100 | 45 | 315 | 34 | | | | | | |
| | ITEM B | 500 | 135 | 225 | 11 | | | | | | |
| | ITEM C | FULL RECOVERY | 45 | 130 | 7 | 215 | 285 | 10 | | | |

FIG. 34

JUDGMENT RING CORRECTION PARAMETER TABLE

| TYPE | CONSTITUENT ELEMENT | TIMING AREA RANGE | | ROTATIONAL SPEED | | SIZE | | NUMBER OF REVOLUTIONS | |
|---|---|---|---|---|---|---|---|---|---|
| | | INDIVIDUAL | ALL MEMBERS | INDIVIDUAL | ALL MEMBERS | INDIVIDUAL | ALL MEMBERS | INDIVIDUAL | ALL MEMBERS |
| ITEMS | ITEM D | DOUBLE | | | | | | | |
| | ITEM E | | DOUBLE | | | | | | |
| | ITEM F | | | 1/2 | | | | | |
| | ITEM G | | | | 1/2 | | | | |
| | ITEM H | DOUBLE | | 1/2 | | | | | |
| | ITEM I | | | IRREGULAR (HOWEVER, TRIPLE ATTACK POWER) | | | | | |
| | ITEM J | | EVERYWHERE (VALID EVERYWHERE) | | | | | | |
| | ITEM K | | | | | | | A MAXIMUM OF SEVEN ROTATIONS ARE PERFORMED, SO LONG AS SUCCESS IS ACHIEVED | |
| | ITEM L | | | | | | | ATTACK FORCE IS INCREASED AS RESULT OF EFFICACY OF ITEM I, PLUS NUMBER OF REVOLUTIONS IS INCREASED | |
| | ITEM M | NO EFFECTIVE ZONE. RANDOM NUMBER IS ALLOCATED TO THIS ITEM BY MEANS OF OPERATION TIMING, TO THUS DETERMINE THE NUMBER OF ATTACK CHARACTERS (0 TO 4) AND ATTACK POWER (ONE TO FOUR TIMES) | | | | | | | |
| ENEMY MAGIC | ENEMY MAGIC A | 1/2 | | | | | | | |
| | ENEMY MAGIC B | | | DOUBLE | | | | | |
| | ENEMY MAGIC C | | | | | 1/2 | | | |
| | ENEMY MAGIC D | | | | | | DOUBLE | | |
| | ENEMY MAGIC E | | | IRREGULAR | | DOUBLE | | | |
| | ENEMY MAGIC F | RANDOMLY DETERMINE EFFECTIVE ZONE, ROTATIONAL SPEED, AND SIZE AT THE RANGE OF 0.5 TO 2.0 (FOR ALL MEMBERS) | | | | | | | |
| EVENT TYPE | MIDDLE BOSS A | | | | DOUBLE | | | | |
| | MIDDLE BOSS B | | 1/2 | | | | | | |
| | MIDDLE BOSS C | | 1/2 | | IRREGULAR | | | | |
| | WRATH BOSS | | 1/2 | | | | | | |

SOUL POINT TABLE

| ENEMY CHARACTER TYPE | SOUL POINT | | | | | |
|---|---|---|---|---|---|---|
| | LIGHT | DARKNESS | WIND | EARTH | WATER | FIRE |
| MONSTER A | 0 | 0 | 0 | 1 | 0 | 0 |
| MONSTER B | 0 | 2 | 0 | 0 | 0 | 0 |
| MONSTER C | 0 | 0 | 0 | 0 | 0 | 0 |
| MONSTER D | 0 | 0 | 0 | 1 | 0 | 4 |
| MONSTER E | 1 | 0 | 0 | 0 | 0 | 0 |

SCREEN FOR DISPLAYING THE NUMBER OF ACQUIRED SOUL POINTS

VALUE REQUIRED TO PERFORM BATTLE FOR ACQUIRING FUSION MONSTERS

| LEVEL | REQUIRED SOUL POINTS |
|---|---|
| 2 | 80 |
| 3 | 300 |
| MAX | 999 |

EMERGENCE OF FUSION MONSTER

SCREEN FOR ACQUIRING FUSION SOUL

ITEM LIST SCREEN

ITEM A
HERB WHICH HAS BEEN USED AS
MEDICINAL HERB SINCE OLDEN
TIMES THIS HERB IS SAID TO
COME INTO FLOWER FOR ONLY ONE
NIGHT.PERSON WHO HAS SEEN
A SMALL FLOWER IS SAID TO
BE ABLE TO SPEND THIS YEAR HEALTHY

SHOP SCREEN

SCREEN FOR SELECTING ITEM TO BE PURCHASED

SCREEN FOR SELECTING ITEMS TO BE SOLD

FIG. 54

TRADING TABLE
WHEN BUYING AND SELLING ARE PERFORMED ON PER-CHARACTER BASIS

| CHARACTER TO BE USED | GUILD CARD | ARTICLE TO BE PURCHASED (ARTICLE TO BE SOLD) | FIRST TIMING AREA [°] | | | SECOND TIMING AREA [°] | | | DISCOUNT RATE (EXTRA PAYMENT RATE) |
|---|---|---|---|---|---|---|---|---|---|
| | | | STARTING ANGLE | ENDING ANGLE | 120% AREA | STARTING ANGLE | ENDING ANGLE | 120% AREA | |
| ALLY CHARACTER A | 1 | WEAPON A | 45 | 315 | 20 | | | | 10% OFF PRICE (UP 10%) |
| | | WEAPON B | 30 | 120 | — | 180 | 255 | | |
| ALLY CHARACTER B | | WEAPON A | 30 | 120 | 2 | 225 | 300 | 2 | |
| | | WEAPON B | 45 | 315 | 15 | | | | |

FIG. 55

TRADING TABLE
WHEN BUYING AND SELLING ARE PERFORMED ON PER-PARTY BASIS

| CHARACTER TO BE USED | GUILD CARD | ARTICLE TO BE PURCHASED (ARTICLE TO BE SOLD) | FIRST TIMING AREA [°] | | | SECOND TIMING AREA [°] | | | DISCOUNT RATE (EXTRA PAYMENT RATE) |
|---|---|---|---|---|---|---|---|---|---|
| | | | STARTING ANGLE | ENDING ANGLE | 120% AREA | STARTING ANGLE | ENDING ANGLE | 120% AREA | |
| COMMON | 1 | ITEM A | 45 | 280 | 25 | | | | |
| | | ITEM B | 45 | 120 | 10 | 180 | 255 | 10 | 5% OFF PRICE (UP 5%) |
| | 2 | ITEM A | 45 | 100 | 10 | 180 | 260 | 10 | |
| | | ITEM B | 30 | 90 | 10 | 180 | 230 | 10 | 15% OFF PRICE (UP 15%) |

PROGRAM FOR IMPLEMENTING A GAME AND GAMING MACHINE

RELATED APPLICATIONS

This application claims the priority of Japanese Patent Application Nos. 2003-175064, 2003-175065 and 2003-175066 filed on Jun. 19, 2003, which are incorporated herein by reference.

Further, this application is related to co-pending U.S. patent application entitled "COMPUTER-READABLE PROGRAM PRODUCT AND GAMING MACHINE" (referred to as prior Japanese Patent Application Nos. 2003-175136 and 2003-175137 filed on Jun. 19, 2003). This application is also related to Japanese Patent Application Nos. 2003-175618, 2003-175620, 2003-175622 and 2003-175623 filed on Jun. 19, 2003. The co-pending applications including specifications, drawings, and claims are expressly incorporated herein by reference in their entirety.

BACKGROUND OF THE INVENTION

1. Field of the Invention

The present invention relates to a computer-readable program product for implementing a game in which a plurality of characters are displayed on a display screen and a player is caused to select action patterns of the characters, to thus cause the game to proceed. The present invention also relates to a gaming machine constituted of a computer or specific hardware for executing the game.

2. Description of the Prior Art

Various games have already been provided, wherein a virtual world of the game appears on a screen of a computer or a TV (television) set. In the virtual world, a player controls characters in the game by means of entering commands by way of operation means, such as a controller or the like, thereby causing a predetermined story to proceed. These games are generally referred to as "RPGs" (Role Playing Games).

A commonly known RPG is as follows (see, e.g., Japanese Unexamined Patent Publication No. 2002-200354). Specifically, a combat situation is embedded in the RPG, wherein a character (hereinafter called an "ally character") controlled by the player battles against enemy characters controlled by a computer. The ally character acquires an experience value and virtual currency by means of defeating the enemy characters in battle. Thus, a story is caused to proceed while the level of the ally character is being raised.

In the combat situation in the RPG described in Japanese Unexamined Patent Publication No. 2002-200354, the pattern of an attack delivered by the ally character is determined in accordance with operation of buttons performed by the player after the player has selected an "attack" command. Specifically, when the player has selected an "attack" command, a variable display zone called a judgment ring appears on the screen, and a variable zone called a rotary bar rotationally moves around the variable display zone. A plurality of effective zones are formed in the variable display zone. In a case where the player has operated the buttons at a good timing when the rotary bar has passed through one of the effective zones, the ally character commences an attack. The pattern and efficacy of the attack are determined in accordance with an ability corresponding to the level of the ally character and items on hand (weapons, magic (spell), or the like). However, when the buttons are operated at a timing at which the rotary bar is in a special effective zone of the effective zone, the degree of effectiveness of the attack; that is, the efficacy of the attack, is enhanced. In contrast, in a case where the player has operated the buttons when the rotary bar is not situated in the effective zone of the variable display zone, the ally character does not make an attack. Moreover, the number of attacks corresponds to the number of times the player has operated the buttons at a good timing when the rotary bar is situated in any one of the effective zones.

In a case where the buttons are operated when the rotary bar is not situated in any one of the effective zones, the operation input is terminated at that point in time even when the effective zones—which the rotary bar has not yet passed through—still remain. When the player has failed to perform a button operation input within the effective zone which the rotary bar is to pass through first, the ally character does not make an attack.

As mentioned above, in the conventional game program, even when the buttons are operated during the course of the rotary bar passing through a plurality of the effective zones and the rotary bar is not situated in any one of the effective zones, the ally character carries out attacks by the amount corresponding to the number of times the player operates the buttons at a good timing. Consequently, some of the conventional game program involve the risk of the player losing interest in the game, because the player cannot find any amusement in operating the buttons.

Moreover, in the above-described conventional game program, the player can operate the buttons for determining the number of attacks for a plurality of respective effective zones, thereby relieving the player's strain on operation of the buttons. For this reason, in the conventional gaming machine, the player cannot find amusement in operating the buttons. Consequently, the gaming machine involves the risk of the player losing interest in the game.

In the conventional game program, it is not easy for a beginner player to operate the buttons when the rotary bar passes through any one of the effective zones. When the beginner player plays a game, the number of attacks made by the ally character is reduced, thereby posing difficulty in causing the story to proceed and preventing the player from sufficiently enjoying interest in the game.

SUMMARY OF THE INVENTION

The object of the present invention is to provide a program for implementing a game which enables enhancement of interest in a game, such as an RPG, as well as a recording medium having the program recorded thereon and a gaming machine capable of executing the game.

The present invention provides a computer-readable program product for implementing a game which displays a plurality of characters on a screen, determines action patterns of the characters by means of a player selecting commands, and causes a story to proceed on the screen, the program comprising the steps of:

displaying on the screen a variable display zone including a reference zone and a variable zone varying with lapse of time with reference to the reference zone, the reference zone and the variable zone respectively including at least one of a plurality of effective zones whose ranges are set in accordance with a parameter set for each character and which are relatively advantageous to the player and a non-effective zone whose range is set in accordance with a parameter set for each character and which is relatively disadvantageous to the player;

determining whether or not a timing of an operation input performed by way of operation means when the variable zone has changed with reference to the reference zone corresponds to a time when an overlap exists between effective zones of both the reference zone and the variable zone;

determining the efficacy of the action pattern determined on the basis of a determination result; and activating the efficacy of the action pattern only when the operation input has been performed when an overlap exists between all the effective zones of the reference zone and the effective zone of the variable zone.

The step of determining the action pattern of the character of the present invention is implemented by, e.g., the computer's function of executing "command processing" (see FIG. 14) to be described later. The step of displaying the variable display zone is implemented by the computer's function of executing "judgment ring determination processing" (FIG. 25) to be described later. The step of determining the efficacy of the action pattern is implemented by the computer's function of executing "judgment ring judgment processing" (FIG. 35) to be described later. The "variable display zone" is represented by, e.g., a judgment ring 100 to be described later; the "variable zone" is represented by, e.g., a rotary bar 101 to be described later; and the "effective zone" is represented by timing areas 102 to 104 (FIG. 28) to be described later.

In the present embodiment, the parameters are assumed to correspond to abilities set on a per-character basis, the types of items a character has on hand, or the status of the character.

In the embodiment, the method further includes a step of multiplying the efficacy of the action pattern by a factor which is a predetermined multiple of the operation input, when a request for changing the efficacy of the action pattern in the effective zone of the reference zone has been issued through the operation input; and a step of making narrow the range of the effective zone in accordance with a change for enhancing the effect of the action pattern when the change has been made on the effective zone of the reference zone.

Yet another embodiment of the present invention provides a gaming machine comprising:

operation means which can be operated by a player; and a machine main unit which displays a plurality of characters on a screen, determines action patterns of the characters by means of the player selecting commands, and causes a story to proceed on the screen, wherein the machine main unit comprises action pattern determination means for determining the action patterns of the characters in accordance with an operation input performed by way of the operation means;

variable display control means for displaying, on the screen, a variable display zone including a reference zone and a variable zone varying with lapse of time with reference to the reference zone, the reference zone and the variable zone respectively including at least one of a plurality of effective zones whose ranges are set in accordance with a parameter set for each character and which are relatively advantageous to the player and a non-effective zone whose range is set in accordance with a parameter set for each character and which is relatively disadvantageous to the player; and action pattern efficacy determination means for determining the efficacy of the action pattern determined in the action pattern determination means on the basis of the result of a determination as to whether or not a timing of an operation input performed by way of the operation means when the variable zone has changed with reference to the reference zone corresponds to a time when an overlap exists between effective zones of both the reference zone and the variable zone and activating the efficacy of the action pattern only when the operation input has been performed when an overlap exists between all the effective zones of the reference zone and the effective zone of the variable zone.

The present invention also provides a computer-readable program product for implementing a game which displays a plurality of characters on a screen, determines action patterns of the characters by means of the player selecting commands, and causes a story to proceed on the screen, the program comprising the steps of:

displaying on the screen a variable display zone including a reference zone and a variable zone varying with lapse of time with reference to the reference zone, the reference zone and the variable zone respectively including at least one of one effective zone whose range is set in accordance with a parameter set for each character and which is relatively advantageous to the player and a non-effective zone whose range is set in accordance with a parameter set for each character and which is relatively disadvantageous to the player;

determining whether or not a timing of an operation input performed by way of operation means when the variable zone has changed with reference to the reference zone corresponds to a time when an overlap exists between effective zones of both the reference zone and the variable zone;

determining the efficacy of the action pattern determined on the basis of a determination result.

The step of determining the action pattern of the character of the present invention is implemented by, e.g., the computer's function of executing "command processing" (see FIG. 14) to be described later. The step of displaying the variable display zone is implemented by the computer's function of executing "judgment ring determination processing" (FIG. 25) to be described later. The step of determining the efficacy of the action pattern is implemented by the computer's function of executing "judgment ring judgment processing" (FIG. 35) to be described later. The "variable display zone" is represented by, e.g., a judgment ring 100 to be described later; the "variable zone" is represented by, e.g., a rotary bar 101 to be described later; and the "effective zone" is represented by timing areas 102 to 104 (FIG. 28) to be described later.

In the present embodiment, the parameter is assumed to correspond to abilities set for each character, the types of items a character has on hand, or the status of the character.

The present embodiment includes a plurality of variable display zones which are different from the variable display zone and each include a reference zone and a variable zone varying with lapse of time with reference to the reference zone, wherein variation speed of the variable zone in the variable display zone with reference to the reference zone is set so as to become faster than variation speeds of the respective variable zones with reference to the respective reference zones in a plurality of the respective variable display zones different from the variable display zone.

Yet another embodiment of the present invention provides a gaming machine comprising:

operation means which can be operated by a player; and a machine main unit which displays a plurality of characters on a screen, determines action patterns of the characters by means of the player selecting commands, and causes a story to proceed on the screen, wherein the machine main unit comprises action pattern determination means for determining the action patterns of the characters in accordance with an operation input performed by way of the operation means;

variable display control means for displaying, on the screen, a variable display zone including a reference zone and a variable zone varying with lapse of time with reference to the reference zone, the reference zone and the variable zone respectively including at least one of one effective zone whose range is set in accordance with a parameter set for each character and which is relatively advantageous to the player and a non-effective zone whose range is set in accordance with a parameter set for each character and which is relatively disadvantageous to the player; and action pattern efficacy determination means for determining the efficacy of the action pattern determined in the action pattern determination means on the basis of the result of a determination as to whether or not a timing of an operation input performed by way of the operation means when the variable zone has changed with reference to the reference zone corresponds to a time when an overlap exists between effective zones of both the reference zone and the variable zone.

The present invention also provides a computer-readable program product for implementing a game which displays a plurality of characters on a screen, determines action patterns of the characters by means of a player selecting commands, and causes a story to proceed on the screen, the program comprising the steps of:

displaying on the screen a variable display zone including a reference zone and a variable zone varying with lapse of time with reference to the reference zone, the reference zone and the variable zone respectively including at least one of a plurality of effective zones whose ranges are set in accordance with a parameter set for each character and which are relatively advantageous to the player and a non-effective zone whose range is set in accordance with a parameter set for each character and which is relatively disadvantageous to the player;

determining whether or not a timing of an operation input performed by way of operation means when the variable zone has changed with reference to the reference zone corresponds to a time when an overlap exists between effective zones of both the reference zone and the variable zone;

determining the efficacy of the action pattern determined on the basis of a determination result; and making a determination as to an effective zone to be an object of a determination in a case where an operation input is performed when no overlap exists between the effective zones of both the reference zone and the variable zone and the object effective zone has been left in the reference zone at that time.

The step of determining the action pattern of the character of the present invention is implemented by, e.g., the computer's function of executing "command processing" (see FIG. 14) to be described later. The step of displaying the variable display zone is implemented by the computer's function of executing "judgment ring determination processing" (FIG. 25) to be described later. The step of determining the efficacy of the action pattern is implemented by the computer's function of executing "judgment ring judgment processing" (FIG. 35) to be described later. The "variable display zone" is represented by, e.g., a judgment ring 100 to be described later; the "variable zone" is represented by, e.g., a rotary bar 101 to be described later; and the "effective zone" is represented by, e.g., timing areas 102, 103, and 104 (FIG. 28) to be described later.

In the present embodiment, the parameters are assumed to correspond to abilities set on a per-character basis, the types of items a character has on hand, or the status of the character.

In the embodiment of the present invention, in a case where the operation input has been performed when no overlap exists between the effective zones of both the reference zone and the variable zone, the efficacy of the action pattern is corrected. This correction is made in accordance with the number of operation inputs made when no overlap exists between the effective zones of both the reference zone and the variable zone.

Yet another embodiment of the present invention provides a gaming machine comprising:

operation means which can be operated by a player; and a machine main unit which displays a plurality of characters on a screen, determines action patterns of the characters by means of the player selecting commands, and causes a story to proceed on the screen, wherein the machine main unit comprises action pattern determination means for determining an action pattern of a character in accordance with an operation input performed by way of the operation means;

variable display control means for displaying on the screen a variable display zone including a reference zone and a variable zone varying with lapse of time with reference to the reference zone, the reference zone and the variable zone respectively including at least one of a plurality of effective zones whose ranges are set in accordance with a parameter set for each character and which are relatively advantageous to the player and a non-effective zone whose range is set in accordance with a parameter set for each character and which is relatively disadvantageous to the player; and action pattern efficacy determination means for determining the efficacy of the action pattern determined in the action pattern determination means on the basis of the result of a determination as to whether or not a timing of an operation input performed by way of the operation means when the variable zone has changed with reference to the reference zone corresponds to a time when an overlap exists between effective zones of both the reference zone and the variable zone and making a determination as to an effective zone to be an object of a determination in a case where an operation input is performed when no overlap exists between the effective zones of both the reference zone and the variable zone and the object effective zone has been left in the reference zone at that time.

BRIEF DESCRIPTION OF THE DRAWINGS

FIGS. 8A and 8B are views showing personal abilities of an ally character A and personal abilities of an ally character B;

FIG. 26 is a view showing a weapon table;

FIG. 27 is a view showing a formula used for computing the amount of damage inflicted on several characters;

FIG. 31 is a view showing a special table;

FIG. 32 is a view showing a formula used for computing the amount of damage inflicted on an opponent when attack magic has been used and a formula used for computing a recovery value achieved when recovery magic has been used;

FIG. 33 is a view showing an item table;

FIG. 34 is a view showing a judgment ring correction parameter table;

FIG. 54 is a view showing a trading table to which a reference is made when a buyer or seller buys or sells on a character basis;

FIG. 55 is a view showing a trading table to which a reference is made when the buyer or seller buys or sells on a party basis;

DESCRIPTION OF THE REFERRED EMBODIMENTS

Figure 1:
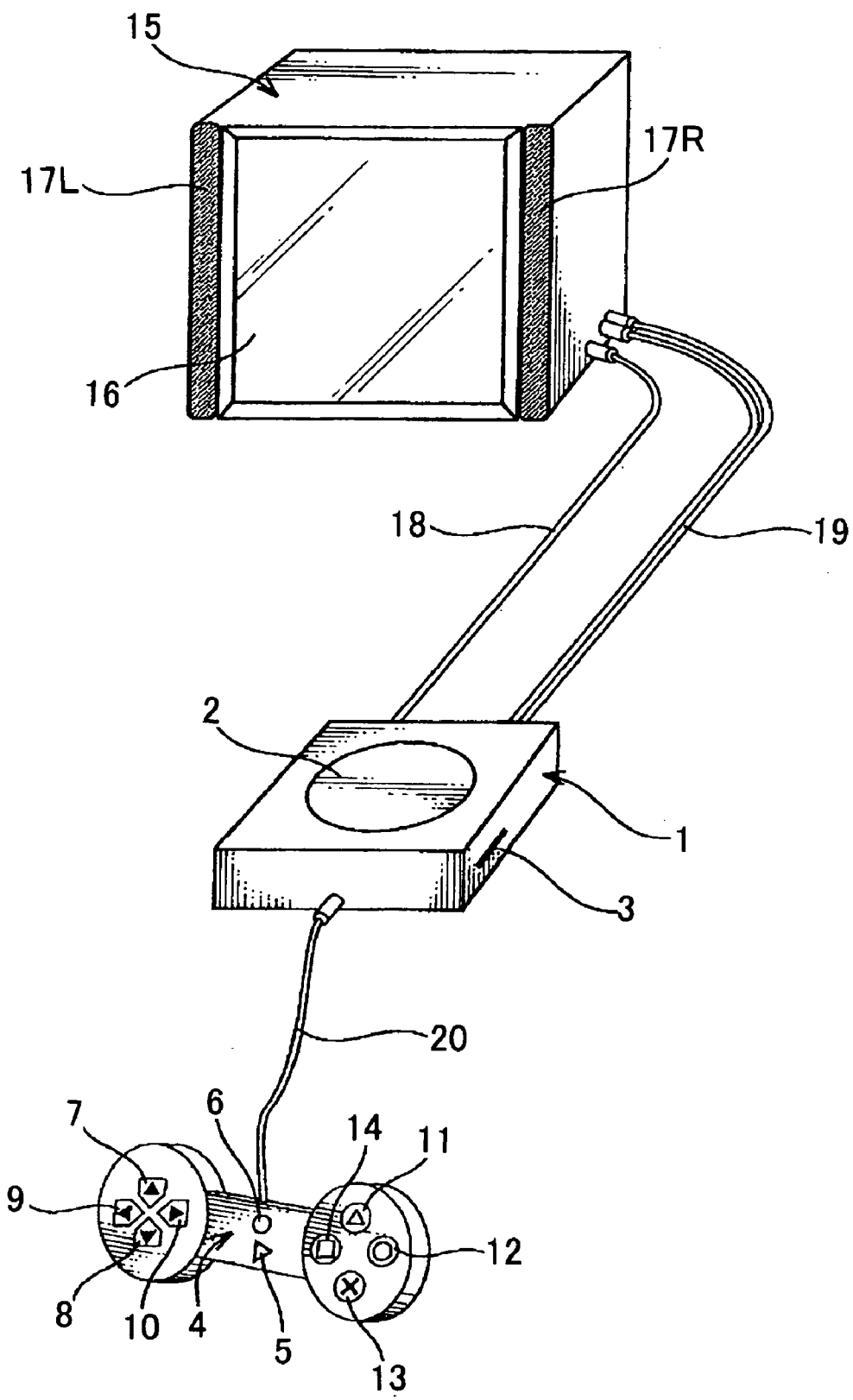
FIG. 1 is a view showing the overall configuration achieved when the present invention is applied to a gaming machine.

FIG. 1 shows the overall configuration achieved when the present invention is applied to a gaming machine. This gaming machine comprises a main unit 1; a controller 4 for issuing a control command to the main unit 1 in accordance with a player's operation; and display means 15 for displaying an image in accordance with an image signal output from the main unit 1. In this gaming machine, a game is executed by means of displaying various images on a display screen (hereinafter called a "display") 16 of the display device 15 such as a CRT.

The game to be executed by this gaming machine is carried out by means of loading a game program recorded on an external recording medium separated from the main unit 1. In addition to a CD-ROM or a DVD-ROM, an FD (flexible disk) or another arbitrary recording medium can be utilized as the external recording medium having the game program recorded thereon. The present embodiment describes the case where a DVD-ROM is used. A reclosable cover 2 is provided at the upper center of the main unit 1. The DVD-ROM can be loaded into a DVD-ROM drive 29 (see FIG. 2) which is disposed in the main unit 1 and serves as a recording medium drive device, by means of opening the cover 2.

The controller 4 has various input sections which issue control commands to a CPU 21 (FIG. 2) provided in the main unit 1 by means of the player's operation. Provided on the left-side area of the controller 4 is an input section which is chiefly used at the time of movement of a character to appear in the game or a menu selection item and comprises an up button 7, a down button 8, a left button 9, and a right button 10. Provided on the right-side area of the controller 4 are a Δ button 11, a O button 12, a x button 13, and a button 14, which are chiefly operated when various items are determined or cancelled. A selection button 6 and a start button 5 are provided at upper and lower positions at the center of the controller 4.

The display device 15 has a video signal input terminal and a sound signal input terminal. The video signal input terminal and the sound signal input terminal are connected to a video output terminal and a sound output terminal of the main unit 1 by way of terminal cables 18 and 19. An existing TV set is used as the display device 15, wherein the display 16 capable of displaying image data output from an image output section 25 (FIG. 2) to be described later and speakers 17L, 17R capable of outputting sound data output from a sound output section 27 (FIG. 2) to be described later are integrally provided in the TV set. The main unit 1 and the operation means 4 are connected together by means of a signal cable 20, as shown in FIG. 1.

A memory slot 3 serving as an inlet for a memory card 32 (FIG. 2) is formed in the side surface of the main unit 1. The memory card 32 is a recording medium to be used for temporarily storing game data when the player interrupts a game. Data stored in the memory card 32 are read by way of a communications interface 30 (FIG. 2) which serves also as a card reader and will be described later.

Figure 2:
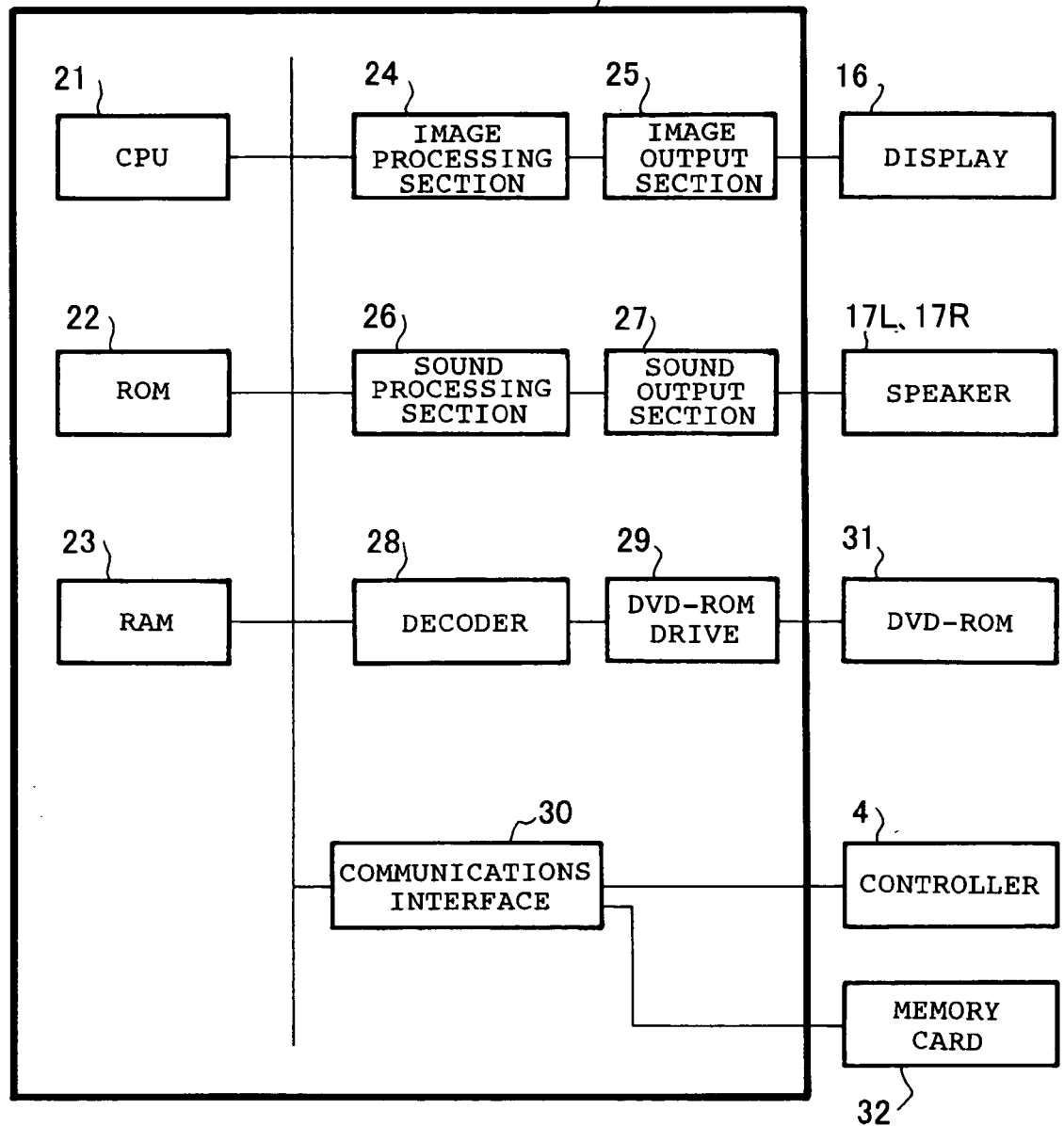
FIG. 2 is a block diagram showing a system configuration of the gaming machine shown in FIG. 1.

FIG. 2 shows a system configuration of the gaming machine. The main unit 1 comprises the CPU 21; ROM 22 and RAM 23, both acting as storage means; an image processing section 24; the image output section 25; a sound processing section 26; a sound output section 27; a decoder 28; the DVD-ROM drive 29; and the communications interface 30.

The DVD-ROM drive 29 is configured to enable removable loading of a DVD-ROM 31. A game program stored in the thus-loaded DVD-ROM 31 is read by the CPU 21 in accordance with a basic operation program, such as an OS (Operating System), stored in the ROM 22. The thus-read game program is converted into a predetermined signal by the decoder 28 and then stored in the RAM 23.

The game program stored in the RAM 23 is executed by the CPU 21 in accordance with the basic operation program or the input signal from the controller 4. In accordance with the game program to be executed, image data and sound data are read from the DVD-ROM 31. The image data are delivered to the image processing section 24, and the sound data are delivered to the sound processing section 26.

The image processing section 24 converts the received image data into an image signal and supplies the image signal to the display 16 by way of the image output section 25. The sound processing section 26 converts the thus-received sound data into a sound signal and supplies the sound data to the speakers 17L, 17R by way of the sound output section 27.

The communications interface 30 can removably connect the controller 4 with the memory card 32. Reading and writing of data from and to the memory card 32 are performed by way of the communications interface 30. The signal output from the controller 4 is delivered to individual sections, such as the CPU 21 or the like.

There will now be described details of processing to be executed by the CPU 22 in accordance with the game program recorded in the DVD-ROM 31 and a specific example of game contents to be displayed on the display 16 in association with the processing details.

When the DVD-ROM 31 is loaded in the DVD-ROM drive 29 while the power source of the main unit 1 remains active, an "Opening Demonstration" appears on the display 16. The "Opening Demonstration" is a presentation display for informing the player of commencement of a game. After lapse of a predetermined time since display of the "Opening Demonstration," a "Title Screen" having a game title of large size drawn thereon is displayed, and "Main Game Processing" shown in FIG. 4 to be described later is commenced.

Figure 3A:
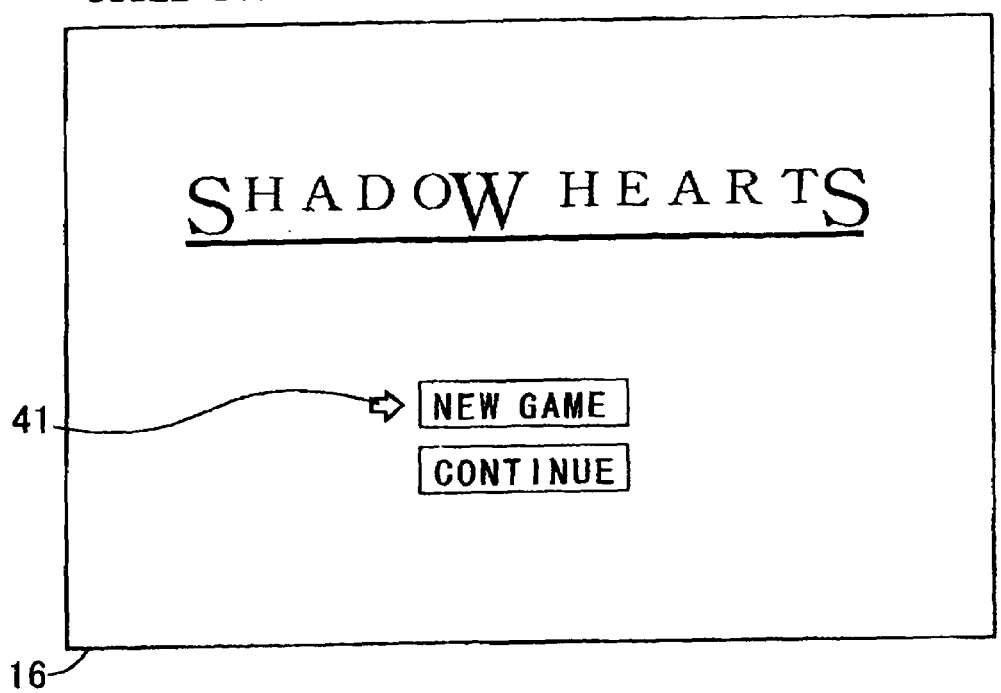
FIG. 3A shows an example display of a title screen.

FIG. 3A shows an example of the "Title Screen." Here, a game title having characters "SHADOW HEARTS" is displayed, and two selection items ("NEW GAME" and "CONTINUE") are provided below the game title. A cursor 41 is displayed at a position on the left side of either of "NEW GAME" and "CONTINUE," and the position of the cursor 41 is changed to the other position by the player operating either the up button 7 or the down button 8. When the player has operated the O button 12, the selection item indicated by the selection cursor 41 is selected.

Figure 3B:
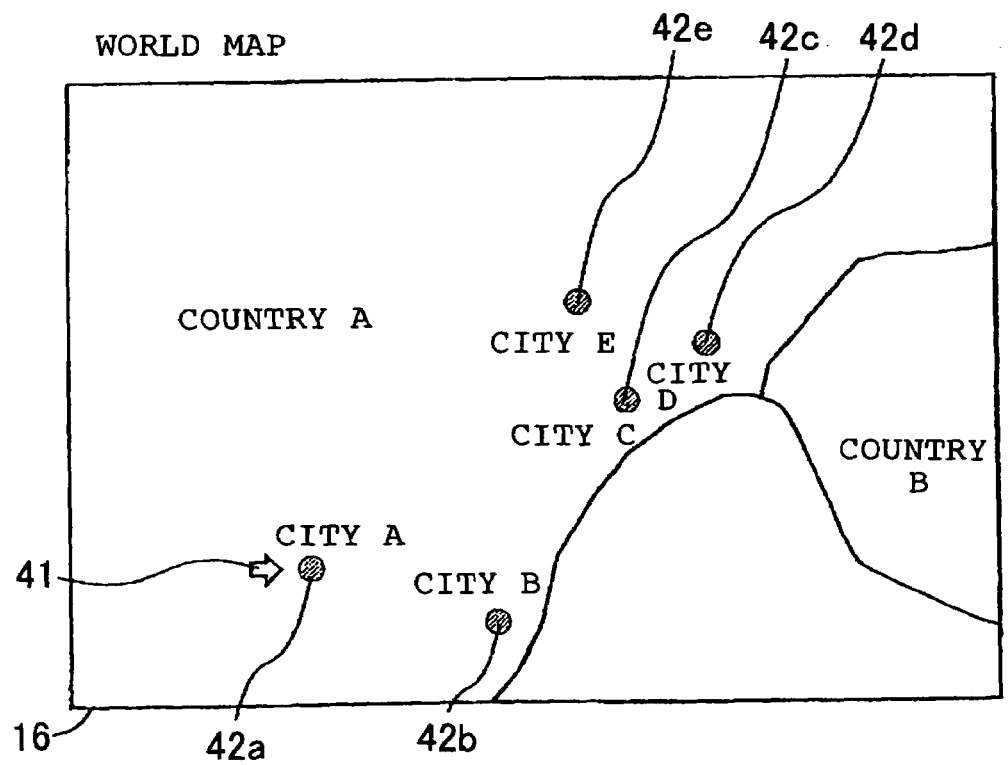
FIG. 3B shows an example display of a world map.
Figure 4:
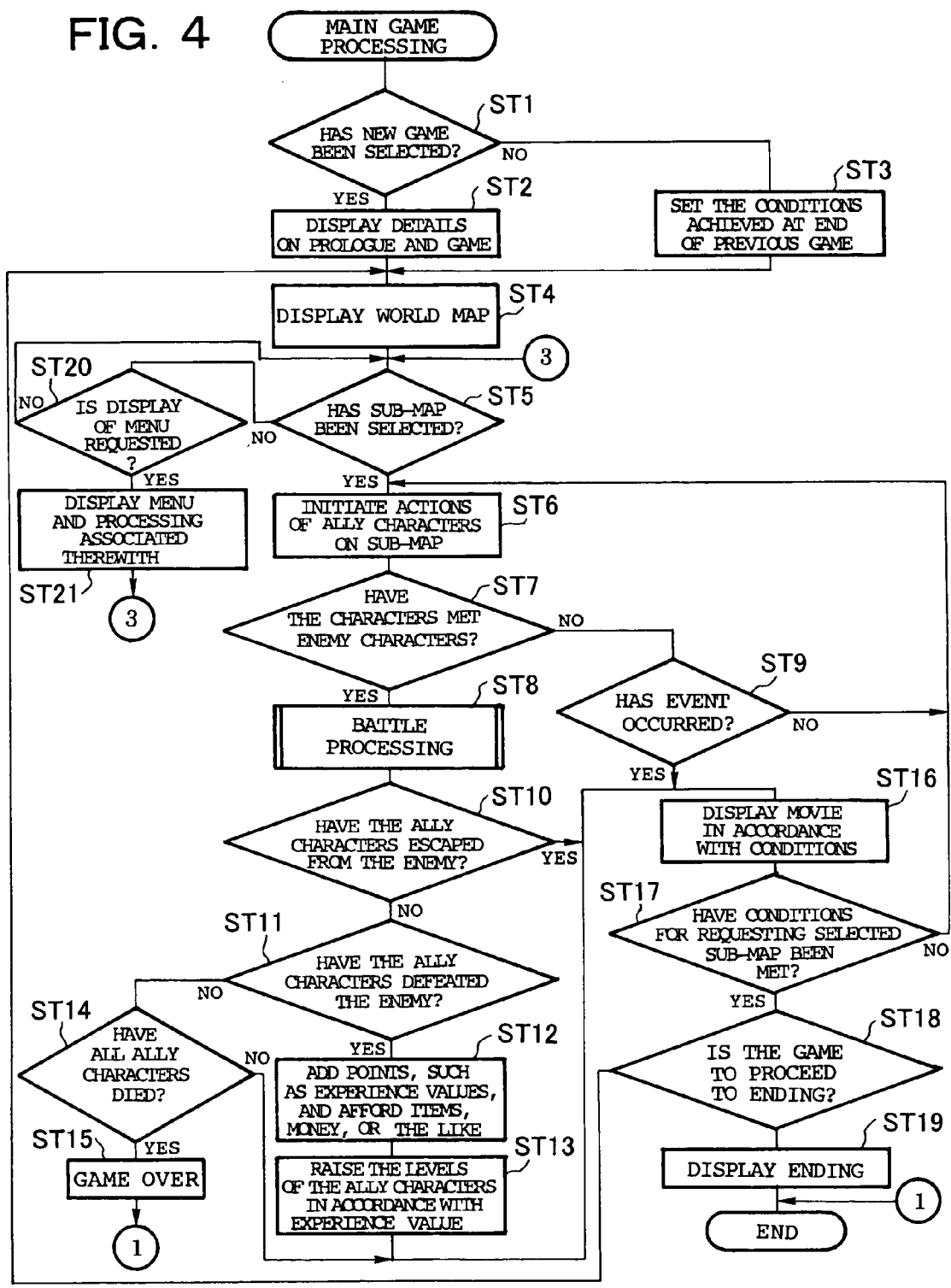
FIG. 4 is a flowchart showing procedures of main game processing.

In the "Main Game Processing" shown in FIG. 4, a determination is first made as to which one of the two selection items has been selected on the "Title Screen" (ST1). When "NEW GAME" is determined to have been selected (when "YES" is selected in ST1), a prologue and game contents are displayed (ST2). Subsequently, a "World Map" shown in FIG. 3B is displayed (ST4). When "CONTINUE" is determined to have been selected on the "Title Screen" (when "NO" is selected in ST1), the "World Map" is displayed in place of the prologue and the game contents.

Ally characters which act on the basis of the player's operation, and enemy characters which act on only the basis of the game program emerge in the game of the present embodiment. A game which unfolds chiefly on the basis of a battle between the characters is implemented on the display. In the present embodiment, three characters; that is, an ally character A, an ally character B, and an ally character C, emerge as the ally characters. In the game, the ally characters are assumed to act on the basis of a party comprising the three ally characters. Various statuses are set beforehand for the respective characters. In each of the statuses the number of games, an experience value to be added in accordance with the number of defeated enemy characters, money on hand, weapons, capabilities, etc., have been previously determined.

FIG. 3B shows an example of the "World Map." Major cities of a "Country A" which is a setting of the game story are displayed on the "World Map," and selection items indicated by names of five cities (i.e., "City A" 42a, "City B" 42b, "City C" 42c, "City D" 42d, and "City E" 42e) are displayed. These selection items are those to be used for shifting the view to a previously-prepared "sub-map." The cursor 41 indicating each of the selection items is shifted by means of the player operating the up button 7 or the down button 8, and one of the selection items is selected by means of the player operating the O button 12. When the "sub-map" has been selected in this way, the view shifts to any one of screens of the respective "sub-maps," and various games set for the respective "sub-maps" can be played. Specifically, internal scenery of the respective cities is displayed as a background image through pre-rendering in association with progress in a stage of a story. The ally characters overcome various events while moving through the background images, whereby the story proceeds.

When the player has operated the button 14 on the "World Map," a "Menu Screen" appears, so that the player can perform various settings on the "menu screen."

Turning again to FIG. 4, when any one of the selection items appearing on the "World Map" has been selected (when "YES" is selected in ST5), a start screen of a "sub-map" corresponding to the selection is displayed, and the party of ally characters commence their actions on the "sub-map" (ST6). When "NO" is selected in ST5, the button 14 is operated on the "World Map," to thus determine whether or not a request for displaying the "Menu Screen" has been issued (ST20). Now, when "YES" is selected, the "Menu Screen" is displayed, and various setting operations corresponding to the player's operations (ST21) are performed. Now, the term "actions" on the "sub-map" signifies the ally characters' walking actions, actions for talking to passersby, and buying actions. The "menu screen" can be displayed even on the "sub-map" by means of operating the button, whereby various operations become possible. "Tool Command Processing" (FIG. 44) to be described later is executed by means of selecting, e.g., the "tool" command, whereby the abilities of allies can be recovered. "Buying/Selling Processing" (FIG. 48) to be described later is executed as a result of selection of a "buying/selling" command, so that sale/purchase of items on hand becomes feasible.

"Ring Customize Processing" (FIG. 57) to be described later is executed by means of selecting a "Ring Customize" command. From among a plurality of types of judgment rings which change their display patterns with lapse of a time and will be described later, any one type of judgment ring can be specified for each ally character in accordance with operation input of the controller 4. In this "Ring Customize Processing," the range of a timing area of the specified judgment ring, which will be described later, and the degree of effectiveness of the timing area; that is, the efficacy of the ally character, can be changed in a manner to be described later, in accordance with the operation input performed by way of the controller 4. Moreover, in this "Ring Customize Processing," a manner of displaying the efficacy of the determined action pattern (e.g., a damage attribute of a final attack in the present embodiment) on the display 16 can be changed for each ally character in a manner to be described later, in accordance with the operation input performed by way of the controller 4. In addition, in the "Ring Customize Processing," a special effect is imparted, on a per-character basis, to the damage attribute of the final attack in accordance with the operation input performed by way of the controller 4, whereby the effect of the determined action pattern can be changed on a per-character basis.

Subsequently, when the party of ally characters which have commenced their actions on the "sub-map" encounters enemy characters (when "YES" is selected in ST7), "Battle Processing" is commenced (ST8). When the "Battle Processing" is started, the view shifts to a "Battle Situation," where the party of ally characters fight against the enemy characters. This "Battle Situation" will be described later. In contrast, even in a case where the party of ally characters does not encounter enemy characters (when "NO" is selected in ST7), when some type of event has arisen (when "YES" is selected in ST9), processing proceeds to ST16, where a movie corresponding to the event is displayed. However, when no event arises (when "NO" is selected in ST9), processing returns to processing pertaining to ST6.

In the "Battle Situation" executed through the "Battle Processing," when the party of ally characters have successfully escaped from the enemy characters (when "YES" is selected in ST10), processing proceeds to ST16, where a movie corresponding to that situation is displayed. In contrast, when the party has failed to escape from the enemy characters or when the party has fought against the enemy characters (when "NO" is selected in ST10), a determination is then made as to whether or not the party of ally characters has won over the enemy characters in the "Battle Situation" (ST11). When "YES" is selected in ST11; that is, when the party of ally characters has won over the enemy characters, the respective ally characters of the party are provided with an addition of points, such as experience values, items, money, or the like (ST12), in accordance with the types of enemy characters they have fought or the nature of the battle (ST12). In accordance with the experience values of the respective ally characters, the levels of the respective characters are raised (ST13). Subsequently, a movie corresponding to the situation is displayed (ST16). When "NO" is selected in ST11; that is, when the party of ally characters has failed to win over the enemies, a determination is then made as to whether or not all the ally characters of the party have died (ST14). When "NO" is selected in ST14, processing proceeds to ST16. When "YES" is selected in ST14, the game is over (ST15), and the "Main Game Processing" is terminated.

When requirements for requesting the "sub-map" have been satisfied after the movie has been displayed in ST16 (when "YES" is selected in ST17), a determination is then made whether to proceed to ending (ST18). When "YES" is selected in ST18, a predetermined ending display is provided, and the "Main Game Processing" is terminated.

Figure 5:
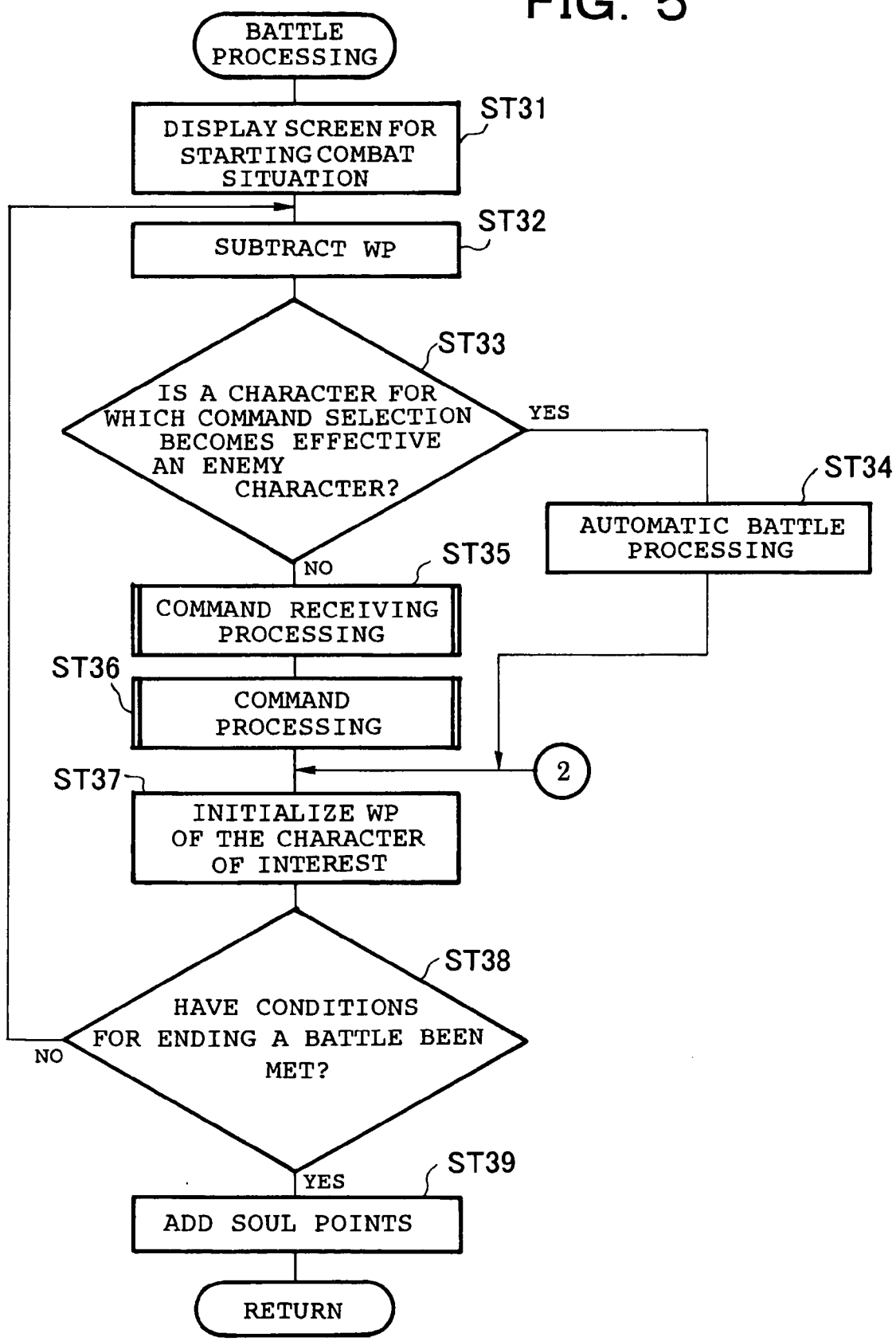
FIG. 5 is a flowchart showing procedures of battle processing.
Figure 6:
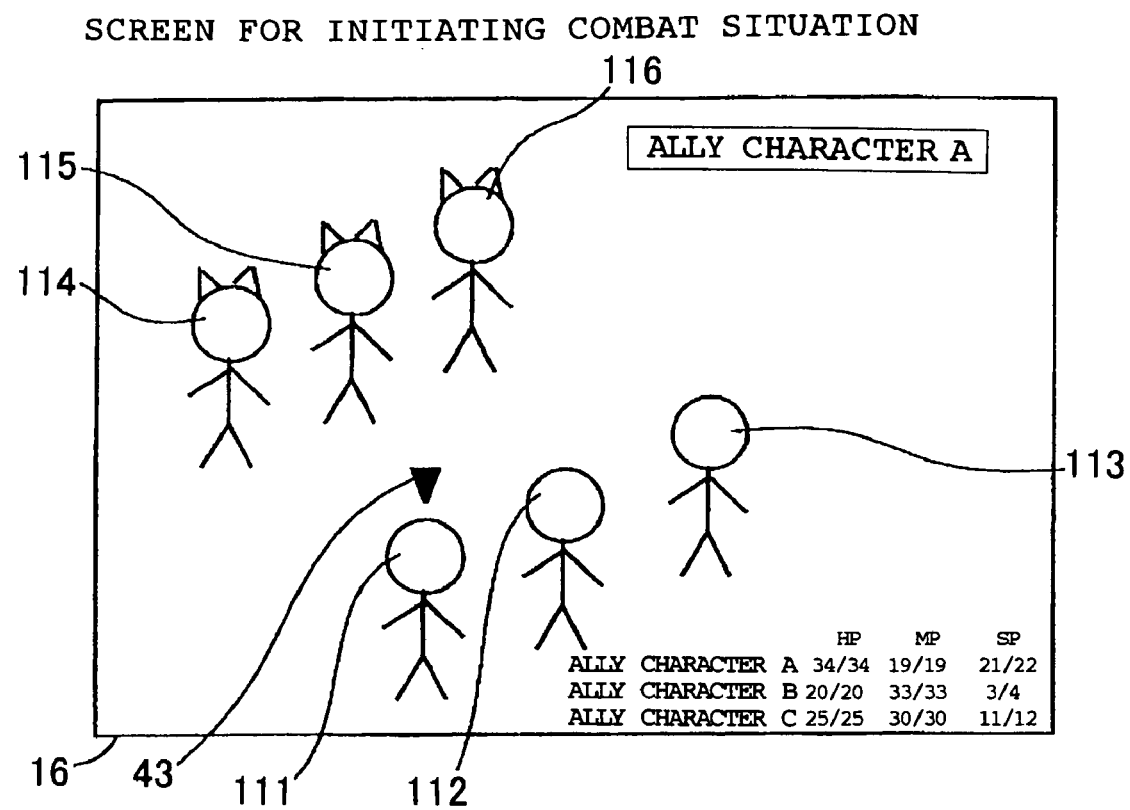
FIG. 6 is a view showing a start screen of a battle situation.

FIG. 5 shows procedures of the "Battle Processing." First, a start screen of the "Battle Situation," such as that shown in FIG. 6, is displayed (ST31). In this start screen, the party of ally characters (i.e., the "ally character A" 111, the "ally character B" 112, and the "ally character C" 113) is displayed toward the player, and three enemy characters (i.e., an "enemy character A" 114, an "enemy character B" 115, and an "enemy character" 116) corresponding to the respective ally characters are displayed opposite the ally characters. Information about the statuses of the respective ally characters is displayed at a lower right position of the start screen. Specifically, hit points (hereinafter abbreviated as "HP"), magic points (hereinafter abbreviated as "MP"), and sanity points (hereinafter abbreviated as "SP") are previously determined for the respective ally characters. The number of remaining points pertaining to these statuses (the number of points on hand/the number of points held at the beginning) is displayed on the start screen. When the "HP" still remains greater than zero, the character can execute various commands, such as an attack and use of an item. When the "HP" has run out, the ally character becomes inactive. The "MP" is a status which enables the character to use a special ability, such as a magic (spell). When the "MP" has run out, the ally character cannot use the special ability. The "SP" is a status which enables the ally character to retain sanity. When the "SP" has run out, the ally character loses its sanity and enters an anomalous state. When the ally character has entered this anomalous state, command operation for the character becomes invalid. The character uncontrollably performs anomalous operation, such as making an attack against everybody regardless of whether they are allies or enemies.

Next, there is performed "WP subtraction processing" for subtracting, on the basis of predetermined requirements, weight points (WP) which manage a sequence in which characters, including the ally characters and the enemy characters, can make an attack or the like (ST32). With regard to the ally characters, the sequence in which characters can be subjected to command selection performed by the player is managed in the "WP subtraction processing." Details of the "WP subtraction processing" will be described later.

Automatic processing is executed in accordance with the game program such that a determination is made as to whether or not the character for which command selection has been made effective in the "WP subtraction processing" (i.e., a character for which a turn to be described later has come) is an enemy character (ST33); and such that, when "YES" is selected, the enemy character makes an attack against the corresponding ally character (ST34). The WP of the enemy character is returned to its initial value (ST37). When in ST33 the character for which command selection has been made valid is determined to be an ally character, there is performed "Command Receiving Processing" for receiving command selection from the player's operation (ST35). This "Command Receiving Processing" will be described in detail later.

Details of the player's command selection received during the "Command Receiving Processing" are ascertained, and "Command Processing" for performing display processing according to the type of the command is performed (ST36). Display processing in conformance to the action pattern of the selected ally character is performed through the "Command Processing." For instance, when an attack command (i.e., a "fight" command to be described later) has been selected, display processing for making an attack on the corresponding enemy character is performed. When a special ability command (i.e., a. "special" command to be described later) has been selected, display processing for working magic against the enemy character or for causing the attacked ally to recover from damage through use of a recovery magic is performed. "Judgment processing" which enables player's technical intervention attributable to operation timing is also performed during the "Command Processing." Details of the "Command Processing" will be described later.

After the "Command Processing" has been performed, the WP of the character for which command selection has been made effective in the "WP subtraction processing" is returned to the initial value (255) (ST37). Subsequently, a determination is made as to whether or not requirements for completing the "Battle Processing" have been satisfied. When "NO" is selected, processing returns to processing pertaining to ST32. When "YES" has been selected, "Soul Point Addition Processing" is performed (ST39), and "Battle Processing" is completed. Details of the "Soul Point Addition Processing" will be described later. Here, requirements for completing "Battle Processing" correspond to any one of the following: namely, annihilation of the enemy characters that have emerged on the battle screen; successful escape of the ally characters from the enemy characters as a result of an "escape" command having been selected by the player; annihilation of the party of ally characters; and occurrence of such an event as to end the battle.

Figure 7:
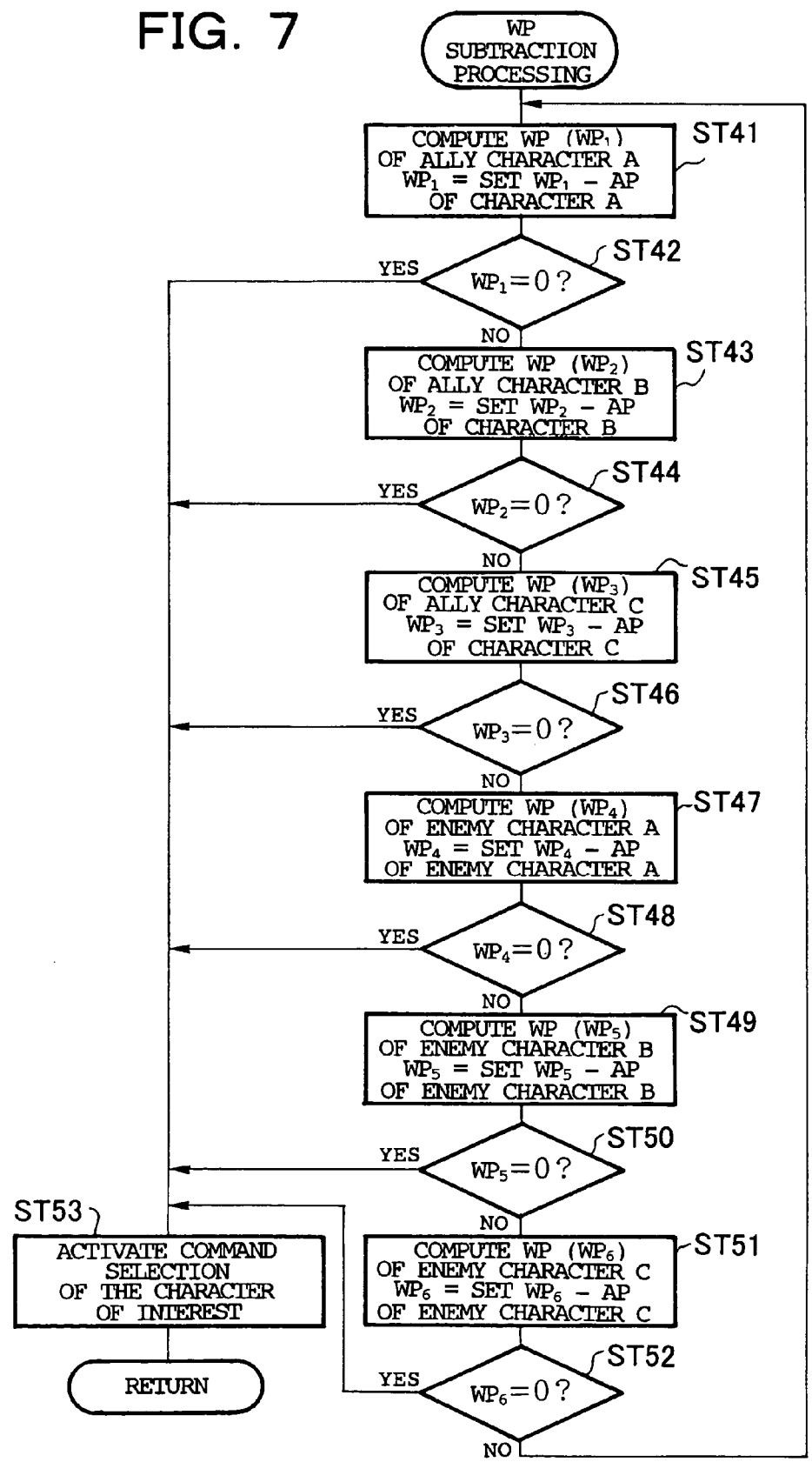
FIG. 7 is a flowchart showing procedures of WP subtraction processing.

FIG. 7 shows procedures of "WP subtraction processing" pertaining to ST32 in the "Battle Processing." First, the WP of the ally character A (WP of the ally character A is represented as $WP_1$) is computed, and the thus-computed WP is set in a predetermined area of the RAM (ST41). An initial value of the WP is set to "255." The $WP_1$ is computed by means of subtracting an ability value AP set for the ally character A from the $WP_1$ set in the RAM, by means of the previous "WP subtraction processing." This method for computing "WP" is applied to the other characters in the same manner, and the ability value AP changes from one character to another character. Various individual capabilities have previously been set for the respective characters in accordance with character levels (LV) determined by the experience values. The ability values "AP" are computed on the basis of such a status.

FIGS. 8A and 8B show individual abilities of the ally characters A, B by way of an example. As shown in FIGS. 8A and 8B, various individual abilities are set for the respective characters in accordance with the character levels (LV), which change according to the experience values. In addition to including the HP, the MP, and the SP, which have been described previously, the types of the individual abilities of the characters include physical attack power (STR), physical defense power, such as vitality (VIT), agility (AGL), magic attack power (INT), magic defense power (POW), and luck (LUC). These abilities are expressed numerically. Even when the characters have the same level, different values are set for the characters in accordance with the types of the characters. The "AP" value is computed from the "AGL" value and the "LUC" value. Specifically, the AP value is computed by a formula $AP=AGL+LUC/2$.

After the $WP_1$ of the ally character A has been determined in the manner mentioned above, a determination is made as to whether or not the thus-determined $WP_1$ is 0 (ST42). When YES is selected in ST42, command selection for the ally character A is made effective (ST53). Accordingly, in the battle situation, the player comes to be able to specify a command for causing the ally character A to make an attack or the like.

When NO is selected in ST42, the WP of the ally character B (the WP of the ally character B is represented as $WP_2$) is computed, and the thus-computed WP is set in the predetermined area of the RAM (ST43). Subsequently, a determination is made as to whether or not the thus-determined $WP_2$ is 0 (ST44). When YES is selected in ST44, command selection for the ally character B is made effective (ST53). When NO is selected in ST44, processing proceeds to ST45.

In ST45, the WP of the ally character C (the WP of the ally character C is represented as $WP_3$) is computed, and the thus-computed WP is set in the predetermined area of the RAM. Subsequently, a determination is made as to whether or not the thus-determined $WP_3$ is 0 (ST46). When YES is selected in ST46, command selection for the ally character C is made effective (ST53). When NO is selected in ST46, processing proceeds to ST47.

In ST47, the WP of the enemy character A (the WP of the enemy character A is represented as $WP_4$) is computed, and the thus-computed WP is set in the predetermined area of the RAM. Subsequently, a determination is made as to whether or not the thus-determined $WP_4$ is 0 (ST48). When YES is selected in ST48, command selection for the enemy character A is made effective (ST53). When NO is selected in ST48, processing proceeds to ST49.

In ST49, the WP of the enemy character B (the WP of the enemy character B is represented as $WP_5$) is computed, and the thus-computed WP is set in the predetermined area of the RAM. Subsequently, a determination is made as to whether or not the thus-determined $WP_5$ is 0 (ST50). When YES is selected in ST50, command selection for the enemy character B is made effective (ST53). When NO is selected in ST50, processing proceeds to ST51.

In ST51, the WP of the enemy character C (the WP of the enemy character C is represented as $WP_6$) is computed, and the thus-computed WP is set in the predetermined area of the RAM. Subsequently, a determination is made as to whether or not the thus-determined $WP_6$ is 0 (ST52). When YES is selected in ST52, command selection for the enemy character C is made effective (ST53). When NO is selected in ST48, processing returns to ST41, where the WP subtraction processing is repeated from the beginning.

When the character—for which command selection has been made effective in the WP subtraction processing—is an ally character, a selection mark 43 is displayed, on the display 16, over that ally character for which the command selection has been made effective, as shown in FIG. 6. After such a display, the ally character over which the selection mark 43 is displayed (here the Ally Character A 111) is zoomed in on, and a command selection screen, such as that shown in FIG. 9, appears.

Figure 9:
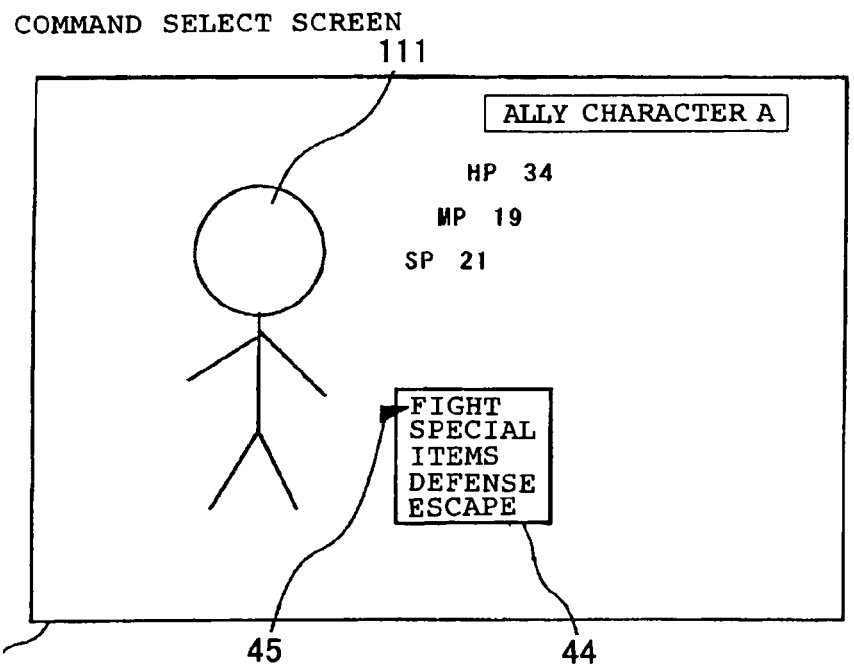
FIG. 9 is a view showing a command selection screen.

Displayed on the command selection screen shown in FIG. 9 is a command menu 44 in which commands to be used for determining the action pattern of the Ally Character A 111 are indicated as selection items. A selection cursor 45 displayed on the left side of the command menu 44 is moved by means of the player operating the up button 7 or the down button 8. The command on whose left side the selection cursor 45 is displayed when the O button 12 has been operated is selected, whereby the action pattern of the Ally Character A 111 is determined. In FIG. 9, five commands Fight, Special, Item, Defense, and Escape are displayed in the command menu 44. Here, the selection cursor 45 is displayed on the left side of the Fight command, thereby showing a case where this command has been determined. The HP value, the MP value, and the SP value of the Ally Character A 111 are displayed at positions above the command menu 44.

Figure 10:
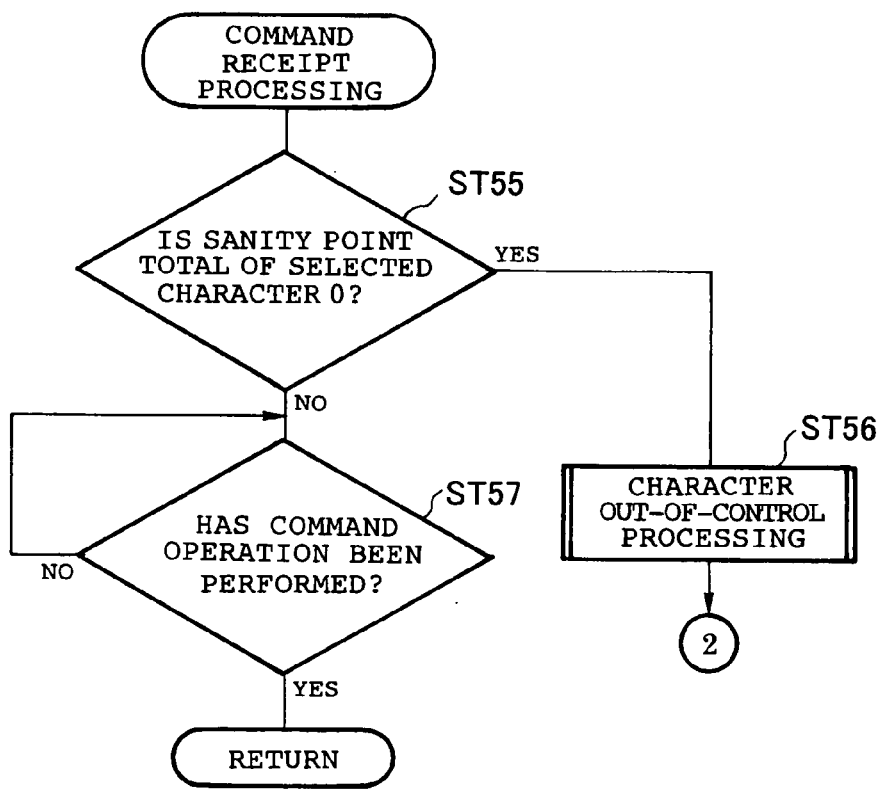
FIG. 10 is a flowchart showing procedures of command receipt processing.

FIG. 10 shows procedures of the command receiving processing pertaining to ST35 in the above-described battle processing. First, when the character—for which command selection has been made effective in the WP subtraction processing—is an ally character, a determination is made as to whether or not the SP of this ally character is 0 (ST55). When YES is selected in ST55, Character Out-of-control Processing is performed in connection with that ally character (ST56), and processing proceeds to processing pertaining to ST37 (FIG. 5). When the Character Out-of-control Processing is performed, a command operation for that character becomes ineffective, and the character performs an anomalous action, such as an action of making an attack against all characters regardless of whether they are allies or enemies. In contrast, when NO is selected in ST55, a determination is made as to whether or not the player has performed a command operation; that is, whether or not a command has been selected on the command selection screen (ST57).

Figure 11:
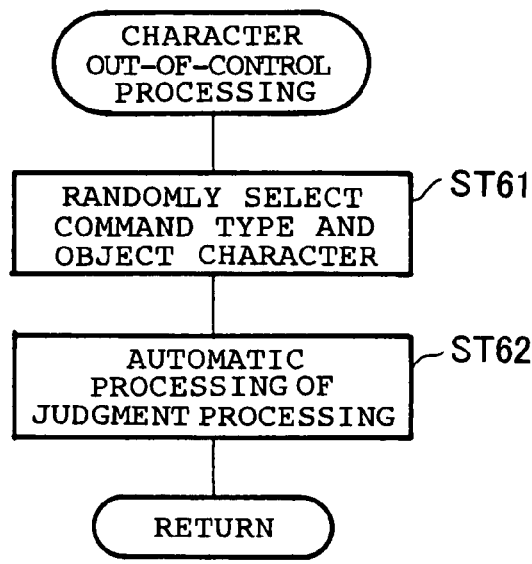
FIG. 11 is a flowchart showing procedures of character out-of-control processing.

FIG. 11 is a flowchart showing procedures of character out-of-control processing pertaining to ST56 in the above-described command receiving processing. First, the type of a command to be used for determining the action of the ally character is randomly selected. Characters—which are objects of the action based on the command (e.g., an attack, use of an attack magic, use of a recovery magic, or the like)—are randomly selected without regard to whether the thus-selected characters are allies or enemies (ST61). For instance, when the Fight command has been selected, characters—which are objects of an attack—are randomly selected without regard to whether or not the thus—selected characters are allies or enemies. The Judgment Processing, which will be described later and displays actions of the characters determined on the basis of the selected command or the like, is automatically performed (ST62), and the Character Out-of-control Processing is completed.

Figure 12:
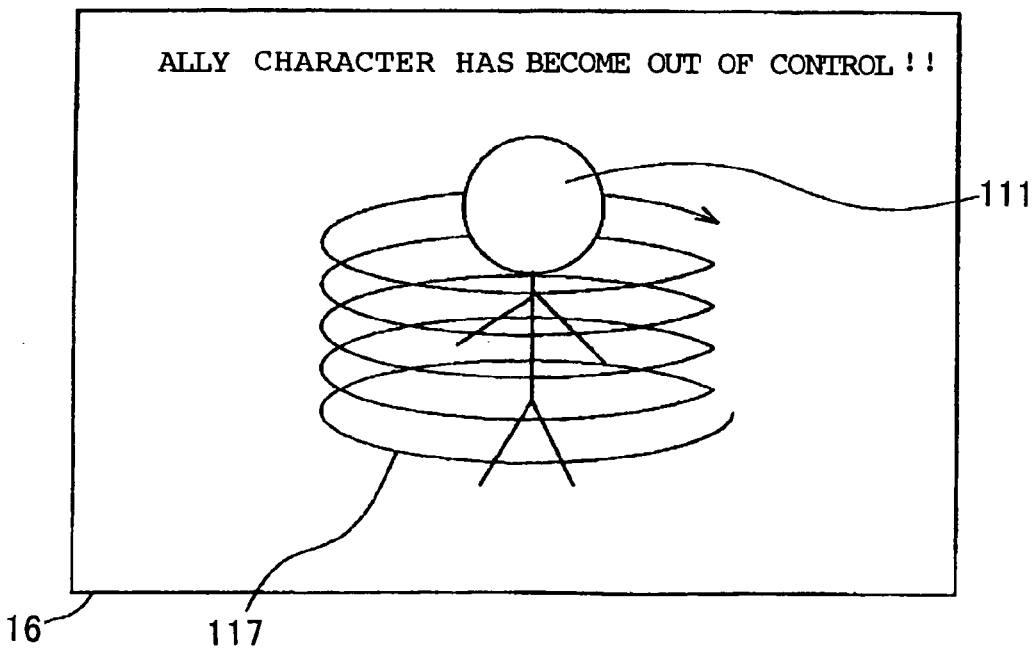
FIG. 12 is an example display provided when the character out-of-control processing is performed.
Figure 13:
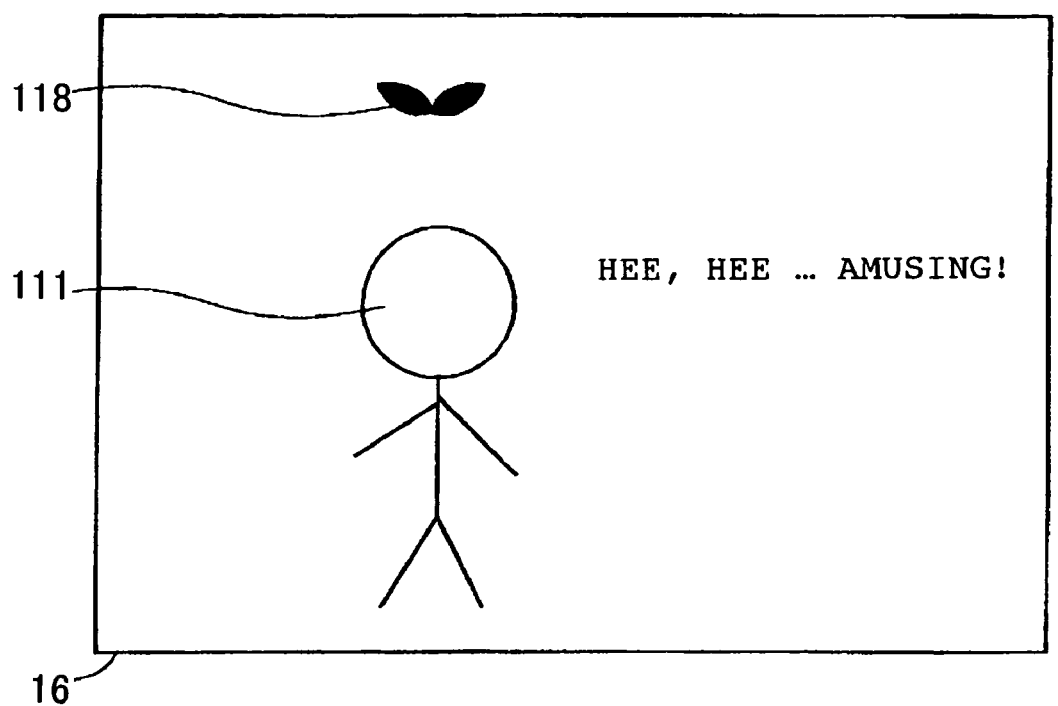
FIG. 13 is a second example display provided when the character out-of-control processing is performed.

FIGS. 12 and 13 are example displays provided when the character out-of-control processing is performed. By way of an example, there is shown a case where the SP of the Ally Character A 111 has become 0 and the character out-of-control processing is performed in connection with the Ally Character A 111.

FIG. 12 shows a state achieved immediately after the character out-of-control processing has been executed, showing a cloud of black smoke 117 shooting up from feet of the Ally Character A 111 to surround the body of the Ally Character A 111. At this time, the words "Ally Character A has become out of control!" also appear on the display 16. Subsequently, as shown in FIG. 13, an out-of-control mark 118 indicating that the Ally Character A has become out of control is provided over the Ally Character A 111. Further, the words "Hee, Hee, . . . Amusing . . . !" also appear. Subsequently, the Ally Character A 111 commences an attack or the like against the object characters selected in ST61.

In the embodiment, once having become out of control, the character does not accept any command operations at all. However, it may be the case that only some commands are accepted by the out-of-control character under predetermined conditions. For instance, only an Item command is accepted, and an object of use of the selected item may be made uncertain, or the Fight command is accepted once every three turns. The ally character may be set to become out of control when the SP values assumes 0 but not to remain out of control and to return to the normal state after elapse of a time.

Figure 14:
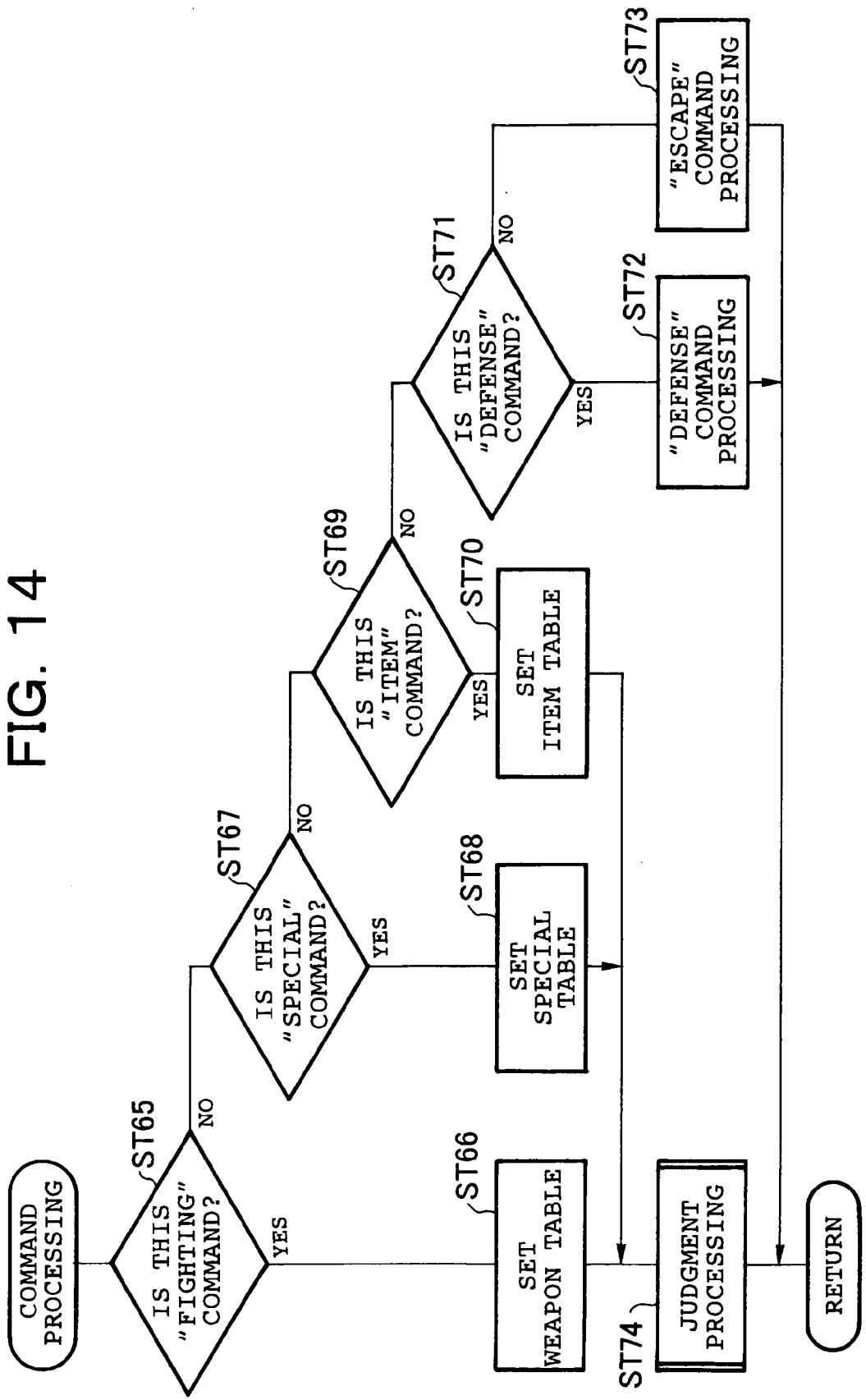
FIG. 14 is a flowchart showing procedures of command processing.

FIG. 14 is a flowchart showing procedures of Command Processing pertaining to ST36 in the Battle Processing. First, a determination is made as to whether or not the selected command is the Fight command (ST65). When YES is selected in ST65; that is, when the player has selected Fight from the selection items on the Command Selection Screen, a Weapon Table (shown in detail in FIG. 26) is fetched from the DVD-ROM 31, and the thus-fetched weapon table is set in the predetermined area of the RAM 23 (ST66).

When NO is selected in ST65, a determination is made as to whether or not the selected command is a Special command; that is, whether or not the player has selected Special from the selection items on the Command Selection Screen (ST67). When YES is selected in ST67, a Special Table (shown in detail in FIG. 31) is fetched from the DVD-ROM 31, and the thus-fetched special table is set in the predetermined area of the RAM 23 (ST68).

When NO is selected in ST67, a determination is made as to whether or not the selected command is the Item command; that is, whether or not the player has selected Item from the selection items on the Command Selection Screen (ST69). When YES is selected in ST69, an Item Table (shown in detail in FIG. 33) is fetched from the DVD-ROM 31, and the thus-fetched item table is set in the predetermined area of the RAM 23 (ST 70).

When NO is selected in ST69, a determination is made as to whether or not the selected command is the Defense command; that is, whether or not the player has selected Defense from the selection items on the Command Selection Screen (ST71). When YES is selected in ST71, Defense command processing for displaying the ally character defending the attack made by the enemy character is executed (ST72).

When NO is selected in ST71, Escape command processing for displaying the ally character escaping from the enemy character is executed (ST73).

When any one has been selected from the Fight command, the Special command, the Item command and when the table corresponding to the thus-selected command has been set in the predetermined area of the RAM 23, Judgment Processing for displaying the action of the ally character determined from the command and the table is executed (ST74).

Figure 15:
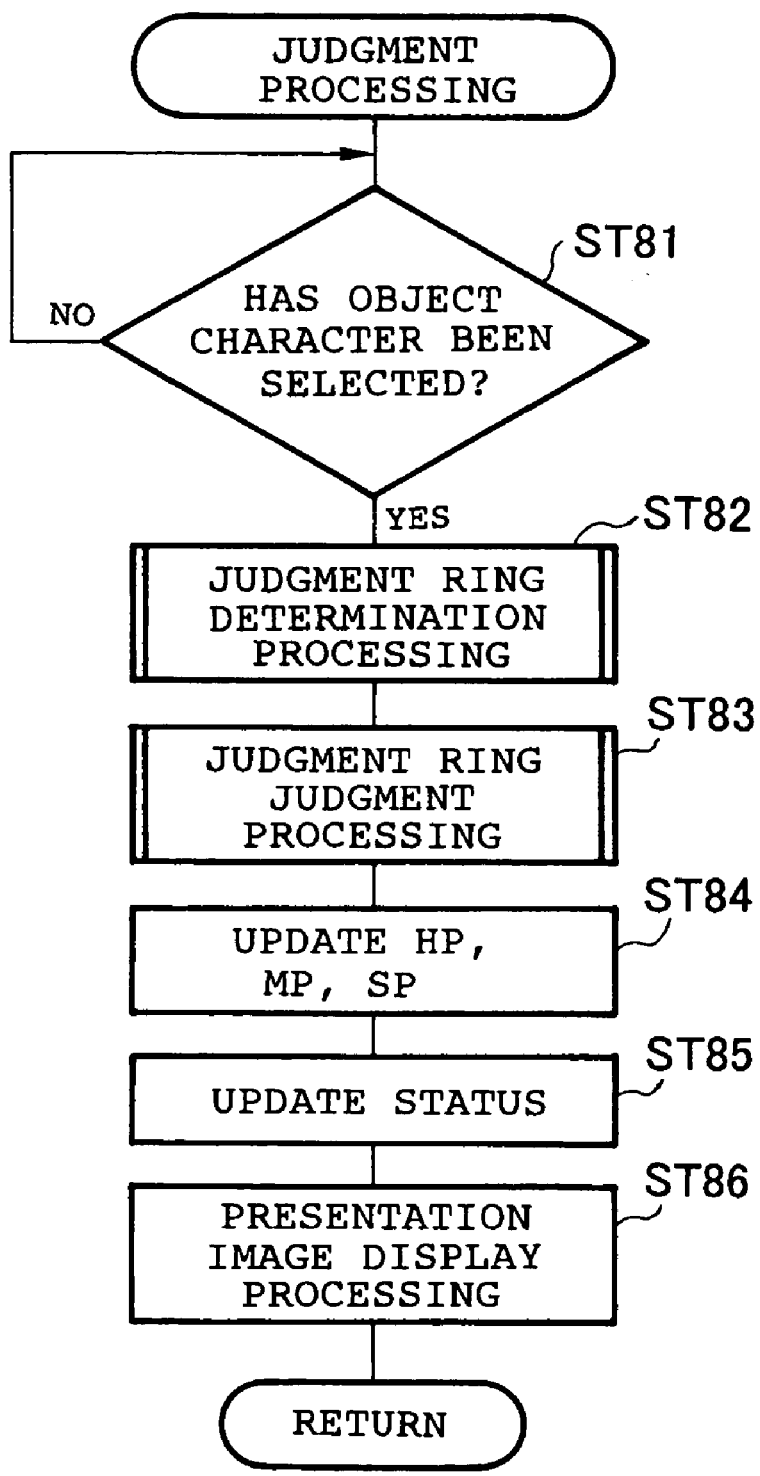
FIG. 15 is a flowchart showing procedures of judgment processing.
Figure 16:
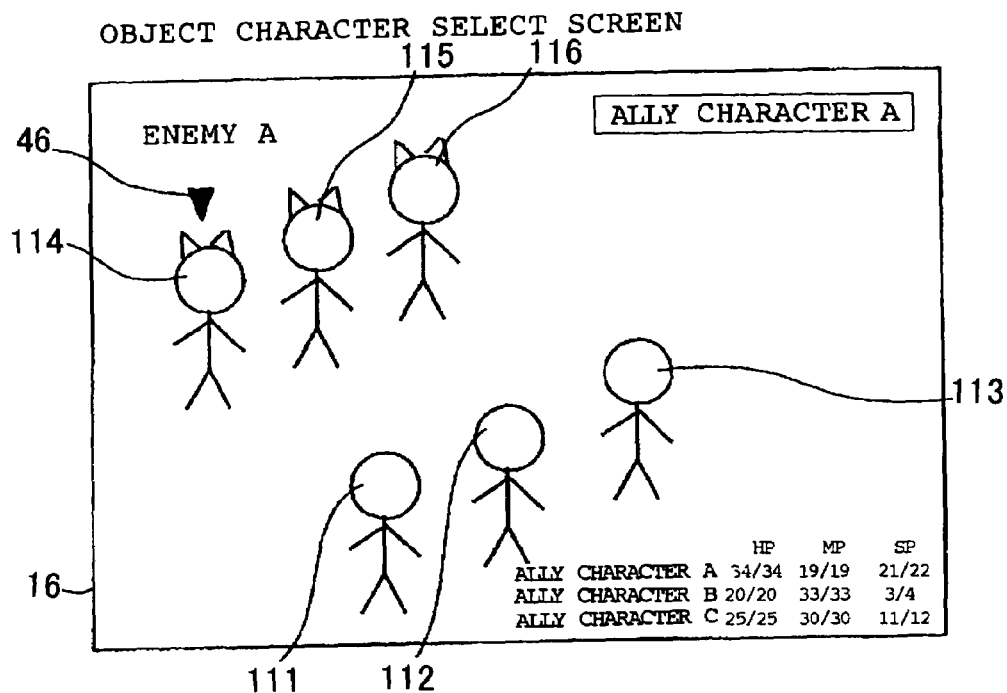
FIG. 16 is a view showing an object character selection screen.

FIG. 15 shows procedures of the Judgment Processing. First, a determination is made as to whether or not the player has selected a character which will be an object (hereinafter called an "object character") of an action (e.g., an attack, use of attack magic, use of recovery magic, or the like) to be performed on the basis of the selected command (ST81). Specifically, when selection of the command has been completed on the Command Selection Screen, an Object Character Selection Screen shown in FIG. 16 is displayed, whereby the player selects an object character on this screen. Selection of the object character is performed as follows. Specifically, a selection mark 46 displayed on the Object Character Selection Screen is moved by the player operating the up button 7 or the down button 8. The character over which the selection mark 46 is displayed when the O button 12 is operated is determined as an object character. FIG. 16 shows a case where the selection mark 46 is displayed over the Enemy Character A and where the enemy character is determined as an object character.

When YES is selected in ST81, Judgment Ring Determination Processing is executed (ST82), and Judgment Ring Judgment Processing is executed (ST83).

The HP value, the MP value, and the SP value are then updated on the basis of the amount of damage or the recovery value computed through the Judgment Ring Judgment Processing in ST83 (ST84). Here, addition/subtraction of the HP and MP values and subtraction of the SP value are performed in accordance with the amount of damage, the recovery value, or the like. Subtraction of the SP is assumed to be performed such that one is subtracted from the SP value every time processing pertaining to ST84 is assumed to be carried out. Specifically, one is assumed to be subtracted from the SP value every time the character takes a turn.

Alternatively, the value to be subtracted from the SP value may be determined in accordance with the amount of damage, a recovery value, or the like. For instance, a value proportional to the amount of damage and a recovery value (e.g., a value which is one-tenth of the amount of damage, the recovery value, or the like) is determined as a value to be subtracted from the SP value.

A time interval (number of seconds) from when command selection has become effective until when the judgment ring 100 is displayed may be determined as a value to be subtracted from the SP value. In this case, the time required by the player to select a command is set as a value to be subtracted from the SP value. Hence, if the player selects a command swiftly, only a small value to be subtracted from the SP value is required. However, if selecting a command takes a long time, a value corresponding to the amount of time is to be subtracted from the SP value.

The status of the character is updated in accordance with the contents determined through processing pertaining to ST82 and ST83 (ST85). When the status of the character has been updated to an Anomalous Status through the processing, the character enters an anomalous state different from a normal state. The Anomalous Status changes according to the type of an item, a magic, or the like used for making an attack. For instance, an anomalous status Poison is an anomalous status in which the physical strength of the ally character automatically decreases every time the ally character taking an action takes a turn in the case where the ally character has undergone working of magic by the enemy or has been attacked by a predetermined item. Moreover, an anomalous status Petrifaction is an anomalous status in which the character becomes hardened like stone when having undergone working of magic by the enemy or an attack by a predetermined item, thereby disabling command input operation.

Display of a presentation image, in which the ally character takes a predetermined action (an attack, working of magic, or the like) against the object character is executed on the basis of the updated parameter (ST86).

Figure 17:
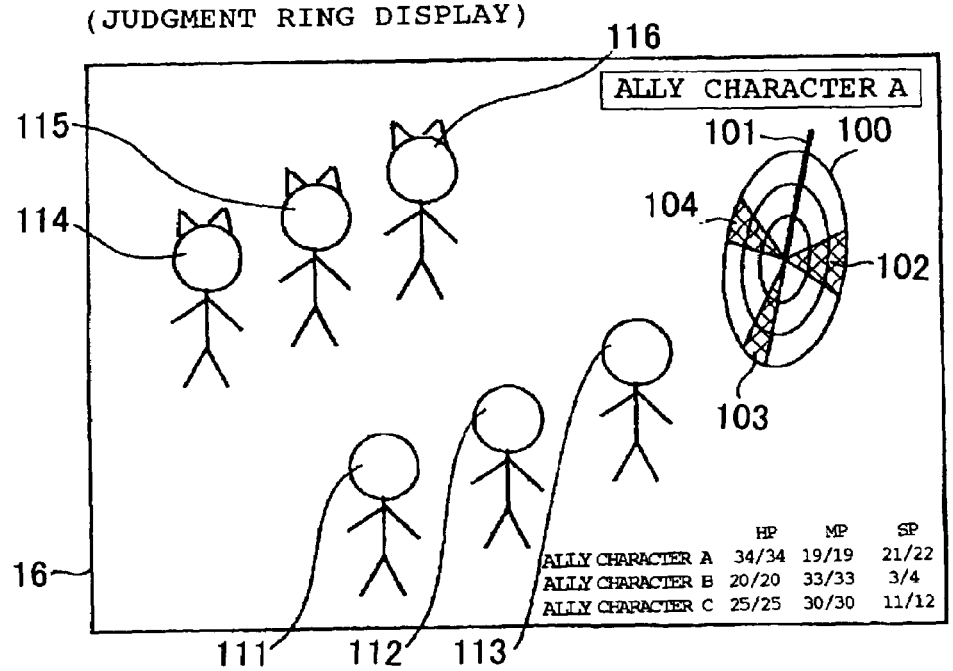
FIG. 17 is a view showing a display screen provided at the time of determination of a command.

In the game of the present invention, as shown in FIG. 17, a normal judgment ring 100 serving as a variable display zone is displayed immediately before the ally character takes against the object character an action based on the selected command. A parameter required to determine the efficacy is determined by utilization of the judgment ring 100.

As shown in FIG. 17, the judgment ring 100 is displayed while being tilted obliquely. A rotary bar 101 serving as a variable zone is displayed on the judgment ring 100, wherein the rotary bar 101 rotates clockwise like the hands of a clock around the point of center of the judgment ring 100. A colored area of predetermined angular range (hereinafter called a "timing area") is displayed on the judgment ring 100. This timing area is an Effective Zone which is relatively advantageous to the player.

Subsequently, rotation of the rotary bar 101 is commenced. Details of the parameter change depending on whether or not the player has been able to operate the O button 12 when the rotary bar 101 is passing over the timing area. As shown in FIG. 17, the timing area is constituted of three timing areas. The first timing area where the rotary bar 101 passes over is a First Timing Area 102. The second timing area where the rotary bar 101 passes over is a Second Timing Area 103. The final timing area where the rotary bar 101 passes over is a Third Timing Area 104.

For instance, when the O button 12 has been pressed when over any one of the three timing areas; namely, when the O button 12 has been operated while the rotary bar 101 is over any one of the three timing areas, the action subsequently taken by the ally character against the object character becomes effective. In a case where the Fight command has been selected, an attack is made three times with predetermined attack power, to thus inflict damage on the enemy character. In a case where the Special command has been selected, magic having predetermined recovery power is worked on the allied characters three times, to thus impart recovery power thereto.

In contrast, when the O button 12 has been operated over one of the timing areas out of operation timing, the efficacy allocated to the timing area becomes ineffective. Particularly, when operation of the O button 12 has failed three times, the efficacy comes to zero. The present embodiment adopts a system in which the effective region of the judgment ring 100 is visually ascertained. In short, the essential requirement is a configuration which enables the player to recognize the operation timing through use of the five senses. For instance, there may be adopted an audible configuration, wherein a specific sound is generated for a specific period of time and an operation is required to be performed in a period during a period in which the specific sound is generated. Alternatively, there may be adopted a tangible configuration, wherein the controller 4 or a portable cellular phone or the like is vibrated and an operation is required to be performed during a period in which vibration is generated.

Figure 18:
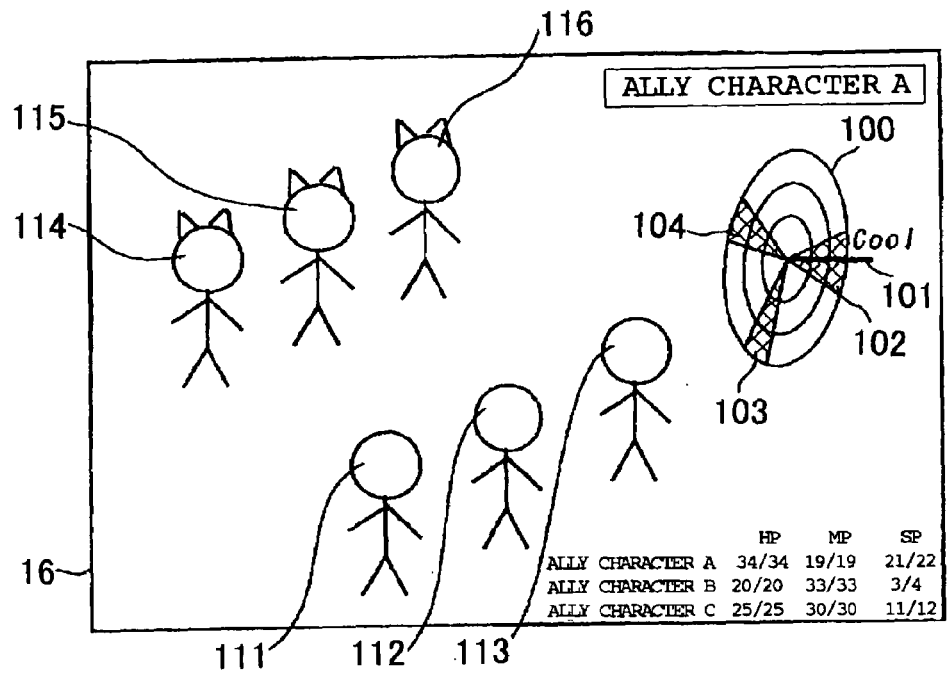
FIG. 18 is a view showing that O button is operated when a rotary bar passes over a first timing area (hereinafter "O button" refers to button 12 marked a sign of circle on its surface of the controller 4.

FIG. 18 shows that the O button 12 is operated when the rotary bar 101 passes over the first timing area 102. As shown in FIG. 18, when the O button 12 has been operated over the first timing area 102, the word "Cool" appears.

Figure 19:
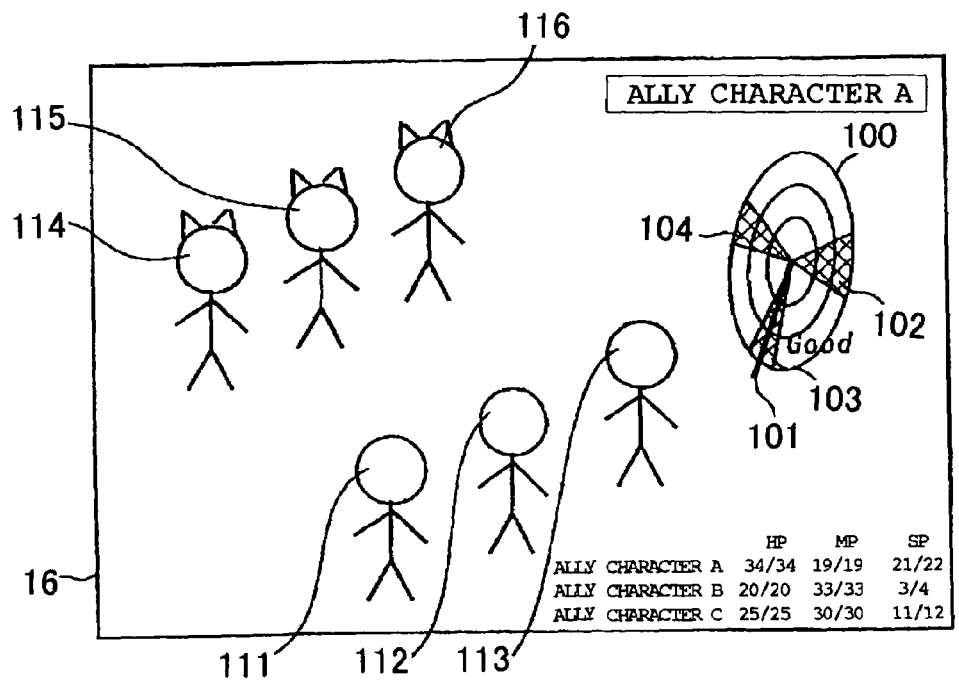
FIG. 19 is a view showing that the O button is operated when a rotary bar passes over a second timing area.

FIG. 19 shows that the O button 12 is operated when the rotary bar 101 passes over the second timing area 103. As shown in FIG. 19, when the O button 12 has been operated over the second timing area 103, the word "Good" appears.

Figure 20:
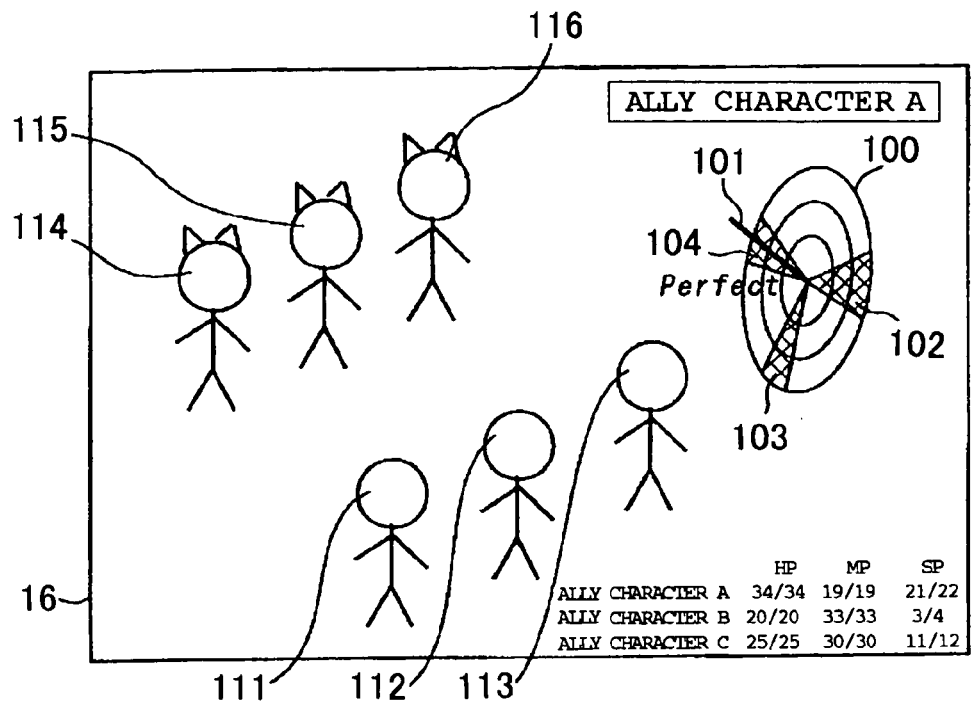
FIG. 20 is a view showing that the O button is operated when a rotary bar passes over a third timing area.

FIG. 20 shows that the O button 12 is operated when the rotary bar 101 passes over the third timing area 104. As shown in FIG. 20, when the O button 12 has been operated over the third timing area 104, the word "Perfect" appears.

Figure 21:
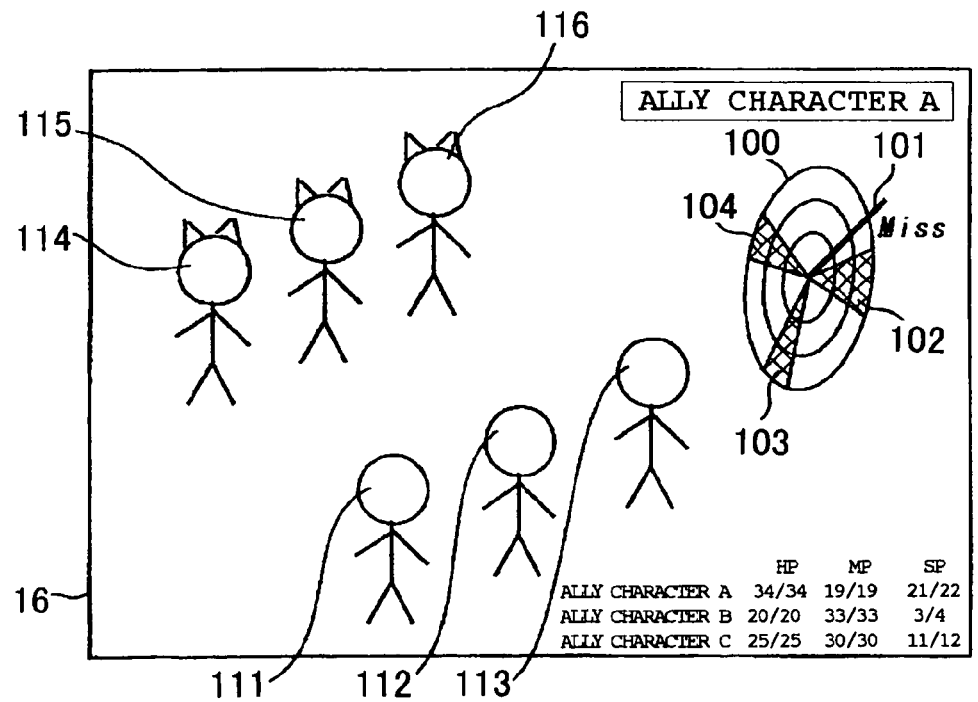
FIG. 21 is a view showing that operation of the O button has failed in the timing area.

FIG. 21 shows that the O button 12 is operated before the rotary bar 101 passes over the first timing area 102; that is, operation of the O button 12 has failed over the timing area. As shown in FIG. 21, when operation of the O button 12 has failed over the timing area, the word "Miss" appears.

Figure 22:
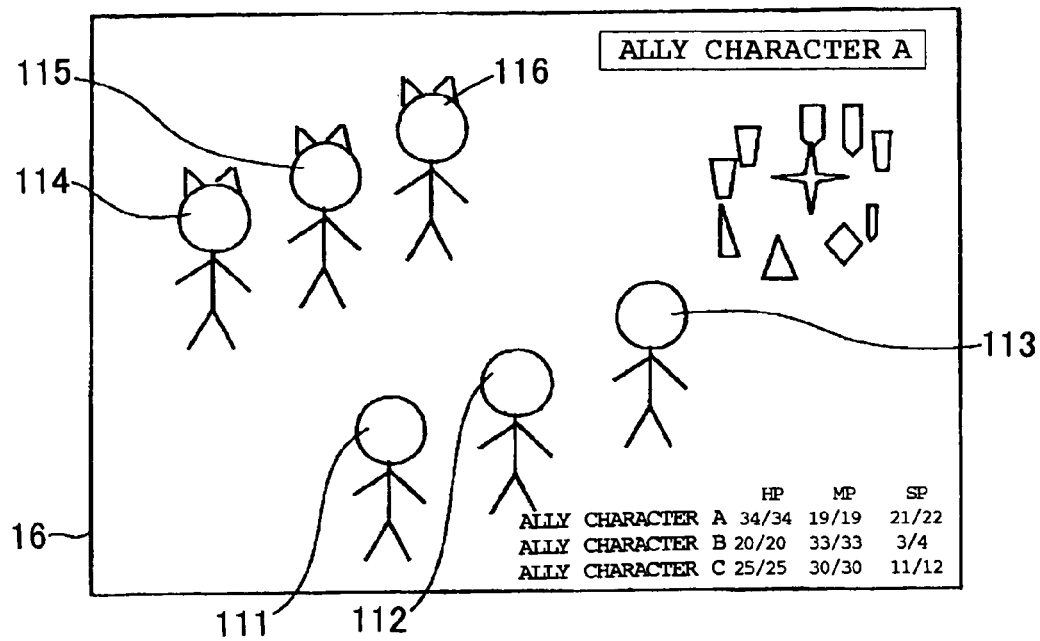
FIG. 22 is a view showing a state achieved after rotation of the rotary bar when operation of the O button has been successfully performed over all the timing areas.

FIG. 22 shows a state achieved after rotation of the rotary bar 101 when operation of the O button 12 has been successfully performed over the three timing areas; that is, a state achieved after rotation of the rotary bar 101 when operation of the o button 12 has been performed while the rotary bar 101 is situated over all three of the timing areas. As shown in FIG. 22, the judgment ring 100 becomes shattered simultaneous with stoppage of rotation of the rotary bar 101, and resultant fragments fly apart. Subsequently, the Ally Character A 111 for which the Fight command has been selected in FIG. 9 moves toward an Enemy Character A 114 selected as the object character in FIG. 16 and commences an attack against the same. The attack power obtained at this time (i.e., the amount of damage inflicted on the enemy character) is changed in accordance with the timing at which the O button 12 is operated on the judgment ring 100.

Figure 23:
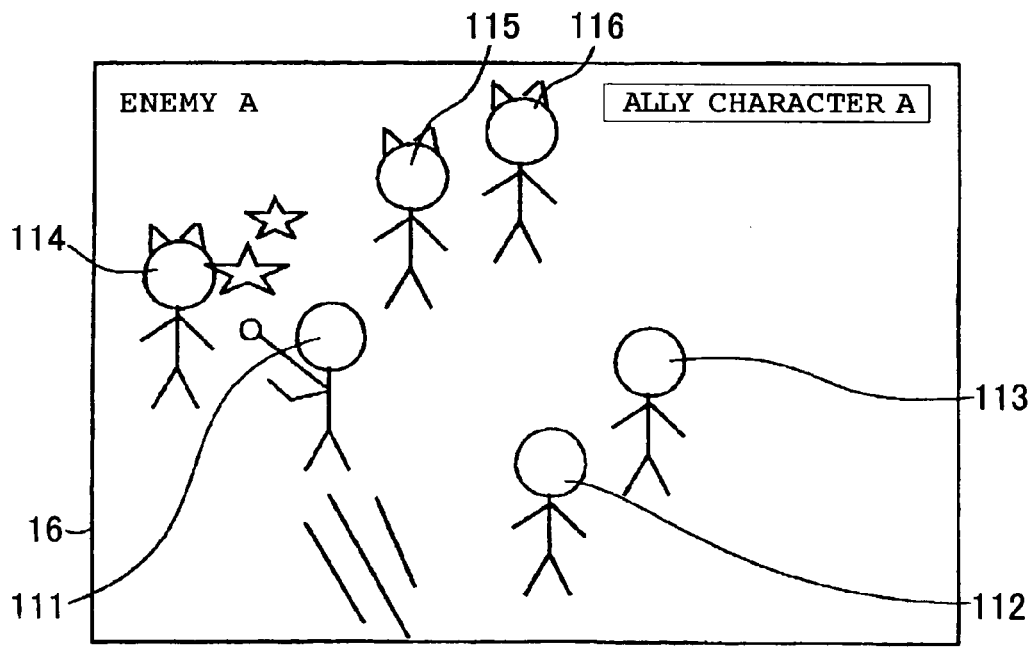
FIG. 23 is a view showing that the ally character A is making an attack on an enemy character A.

FIG. 23 shows that the ally character A 111 is making an attack against the enemy character A 114 on the basis of the selected command and the operation result yielded during the course of display of the judgment ring 100. A case where the Fight command has been selected is displayed, thereby showing that the Ally Character A 111 is making an attack against the Enemy Character A 114. As mentioned previously, when operation of the O button 12 has been performed over the three timing areas during the course of display of the judgment ring 100, the Ally Character A 111 makes an attack against the Enemy Character A 114 three times on this screen with predetermined attack power.

The previous embodiment is a case where the player has a chance to attempt the second operation even when the first operation has ended in failure. However, the program may be configured such that receipt of operation may be completed when the first operation has failed.

Figure 24:
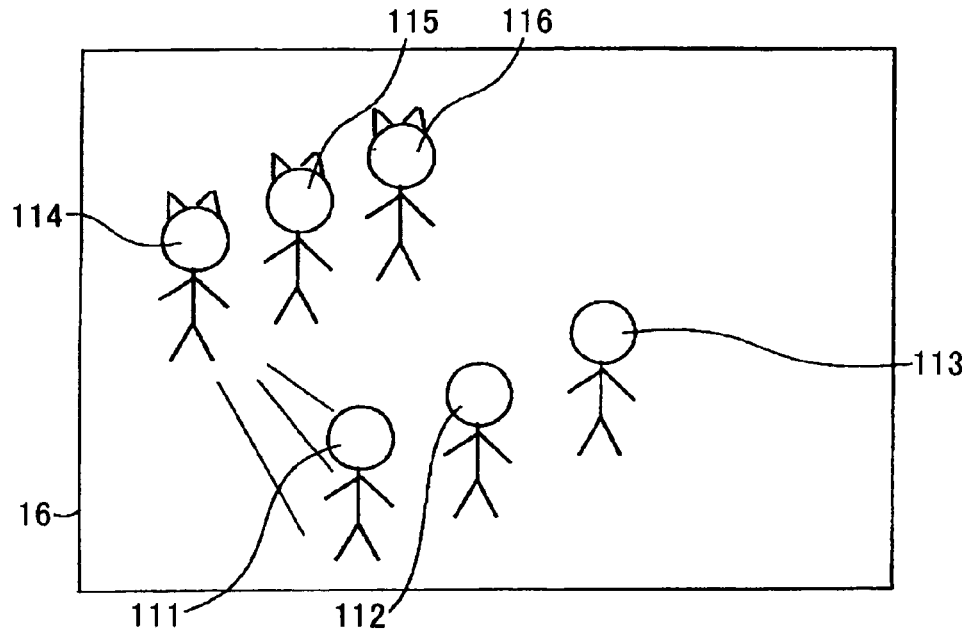
FIG. 24 is a view showing that the ally character A has returned to its original position after having finished making an attack on the enemy character A.

FIG. 24 shows that the Ally Character A has finished making an attack against the Enemy Character A 114 and returned to its original position. Here, a period from when an action against the character or the object character of the enemy character is commenced (i.e., a state shown in FIG. 23) until when the action ends (i.e., a state shown in FIG. 24) is taken as one turn. Display processing pertaining to one turn is performed through the Presentation Image Display Processing pertaining to ST85 (FIG. 15).

Figure 25:
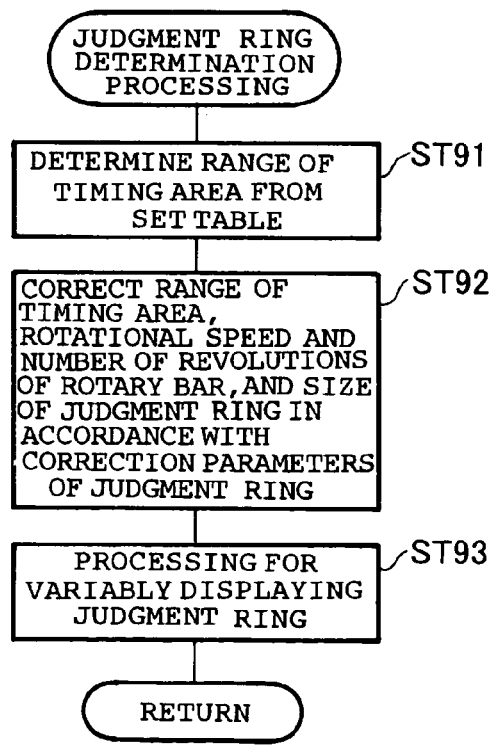
FIG. 25 is a flowchart showing procedures of judgment ring determination processing.

FIG. 25 shows procedures of the Judgment Ring Determination Processing pertaining to ST82 (FIG. 15). First, a reference is made to any one of the Weapon Table, the Special Table, and the Item Table, all being set in the RAM 23, and the range of the timing area is determined (ST91). Subsequently, the range of the timing area determined in ST91, the predetermined rotational speed of the rotary bar 101, the predetermined number of revolutions of the rotary bar 101, and the size of the judgment ring 100 are corrected on the basis of the judgment ring correction parameters to be described later (ST92). Here, the rotational speed of the rotary bar is set to 1.5 seconds/rotation as a basic speed, and the number of revolutions of the rotary bar is set to one rotation as a basic number of revolutions. There is performed judgment ring variation display processing for displaying the judgment ring 100 within the range of the timing area finally determined in ST92, as well as rotationally displaying the rotary bar 101 at the determined rotational speed and with the determined number of revolutions (ST93). The timing areas and the judgment ring correction parameter will be described later.

FIG. 26 shows the Weapon Table. This is a table set when the command has been set by the player. As shown in FIG. 26, an available weapon is determined according to the type of the ally character. The individual capability of an item to be used and the ranges of the respective timing areas are set according to the type of the weapon.

The individual capability of an item to be used is used for computing the amount of damage inflicted on the enemy character (i.e., the amount of damage inflicted on the opponent). The greater the numeral of the individual capability of the item to be used, the larger the amount of damage inflicted on the enemy character.

Figure 28:
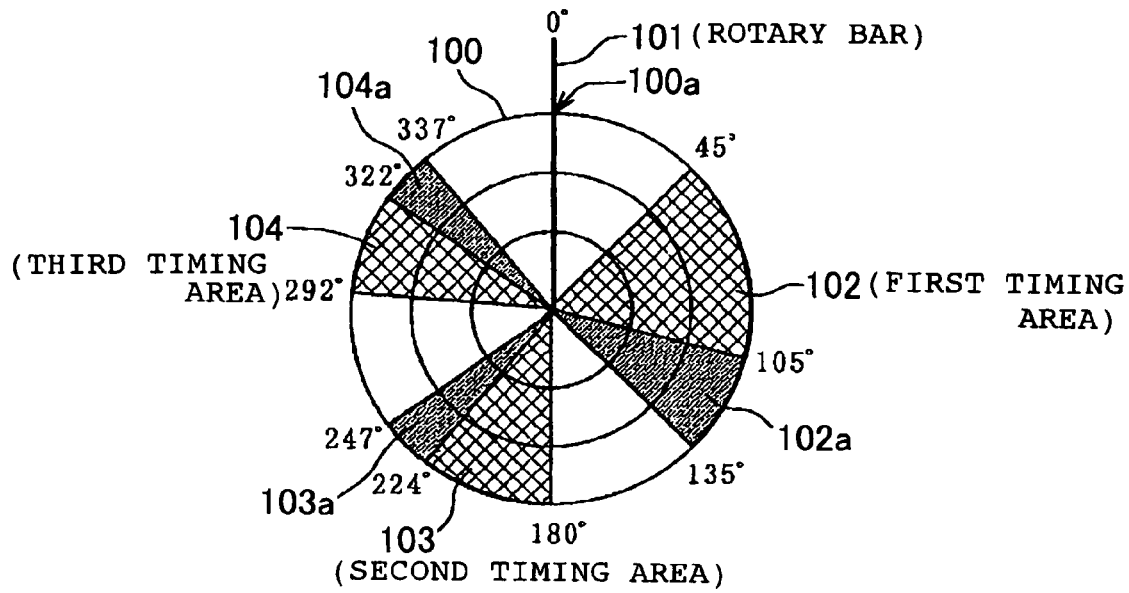
FIG. 28 is a view showing a display of the judgment ring provided when a command is determined.

As shown in FIG. 28, the range of the timing area is indicated as an angular range bound by a starting angle and an ending angle, wherein a position 100a where rotation of the rotary bar 101 is commenced is taken as 0°. As shown in FIG. 26, the starting angle and the ending angle are set to different values according to the type of a weapon to be used. For instance, when the ally character is the Ally Character A and the available weapon is a weapon A1, the range of the first timing area 102 is set to an angular range of 90° with the starting angle of 45° and the ending angle of 135°. The range of the second timing area 103 is set to an angular range of 67° with the starting angle of 180° and the ending angle of 247°. The range of the third timing area 104 is set to an angular range of 45° with the starting angle of 292° and the ending angle of 337°.

In the judgment ring 100, a 120% area is set as a specially-effective area in the predetermined ranges of the respective timing areas. In this specially-effective area, the amount of damage inflicted on the enemy character is increased by 20%; i.e., by a factor of 1.2, so long as the O button 12 can be operated while the rotary bar passes through the timing areas. The 120% area is formed within a range from an angular position—which is determined by subtracting an angle corresponding to the 120% area from the ending angle—to the ending angle.

FIG. 27 shows a formula used for computing the amount of damage inflicted on the enemy character.

As shown in FIG. 27, an Assignment Value is set to 0.2 for the first attack; 0.3 for the second attack; and 0.5 for the third attack.

A Remaining SP Correction Value assumes one until the current SP value falls below 25% of the maximum SP value; that is, during a period in which a relationship of 25−current SP/maximum SP×100≦0 is satisfied. The remaining SP correction value assumes 1.01 resulting from addition of 0.01 to 1 when the current SP value falls below 25% of the maximum SP; that is, a relationship of 25−current SP/maximum SP×100>0 is satisfied. The SP value is then added in increments of 0.01 every time the SP value decreases by one point. Specifically, the remaining SP correction value is set such that the amount of damage inflicted on the opponent increases in increments of 1% every time the SP value decreased by one point.

Individual Ability of Character shows the STR (physical attack power) shown in FIG. A8 end 8B. Individual Capability of Item to be Used corresponds to values set according to the types of the ally characters and the types of the weapons, both being shown in FIG. 26.

A Judgment Ring Correction Value assumes 1.2 when the O button 12 is operated when the rotary bar 101 is situated in the 120% area of the timing area. The Judgment Ring Correction Value assumes one when the O button 12 is operated when the rotary bar 101 is situated in a portion of the timing area other than the 120% area. The Judgment Ring Correction Value assumes 0 when the O button 12 is not operated when the rotary bar 101 is situated in the timing area.

In a case where, for example, the Fight command has been selected, when the O button 12 has been operated in the three timing areas; namely, when the O button 12 has been operated while the rotary bar 101 is situated in the three respective timing areas, the ally character repeatedly makes three attacks against the enemy character, to thus inflict predetermined damage to the enemy character. For instance, when the ally character A makes an attack through use of the weapon A1, the amount of damage inflicted on the opponent by the first attack is determined by 0.2×remaining SP correction value×STR×6×1 (1.2). The number of points corresponding to the amount of damage is subtracted from the HP of the enemy character. Similarly, the amount of damage inflicted on the opponent by the second attack is determined by 0.3×remaining SP correction value×STR× 6×1 (1.2), and the amount of damage inflicted on the opponent by the third attack is determined by 0.5×remaining SP correction value×STR×6×1 (1.2). Thus, the points corresponding to these damage amounts are subtracted from the HP of the enemy character.

When the O button 12 has been operated out of operation timing on one of the timing areas, the Judgment Ring Correction Values acquired in subsequent timing areas assume 0. For instance, in a case where the ally character A makes an attack through use of the weapon A1, when the rotary bar 101 is situated in the first timing area, the O button 12 can be operated. The amount of damage inflicted on the opponent by the first attack is determined by 0.2×remaining SP correction value×STR×6×1 (1.2). However, when the O button 12 is operated out of operation timing in the second timing area, the Judgment Ring Correction Value for the second and third attacks becomes 0, and the amount of damage inflicted on the opponent also becomes 0.

When the HP of the enemy character has become 0, the ally character is considered to have defeated the enemy character.

FIG. 28 shows a display of the judgment ring provided when a command is determined. The drawing shows the judgment ring 100 for the time of determination of a command when the ally character is the Ally Character A and when the Fight command is selected through use of the weapon A1. The judgment ring 100 is formed from the angular ranges of the respective timing areas set in the Weapon Table shown in FIG. 26. When the ally character is the Ally Character A and the Fight command has been selected through use of the weapon A1, the first timing area 102 has a starting angle of 45° and an ending angle of 135°; the second timing area 103 has a starting angle of 180° and an ending angle of 247°; and the third timing area 104 has a starting angle of 292° and an ending angle of 337°. As shown in FIG. 28, in the first timing area 102, the 120% area falls within a range 102a starting from a starting angle 105°, which is obtained by subtracting 30° from the ending angle of 135°, and the ending angle of 135°. In the second timing area 103, the 120% area falls within a range 103a starting from a starting angle 224°, which is obtained by subtracting 23° from the ending angle of 247°, and the ending angle of 247°. In the third timing area 104, the 120% area falls within a range 104a starting from a starting angle 322°, which is obtained by subtracting 15° from the ending angle of 337°, and the ending angle of 337°.

Figure 29:
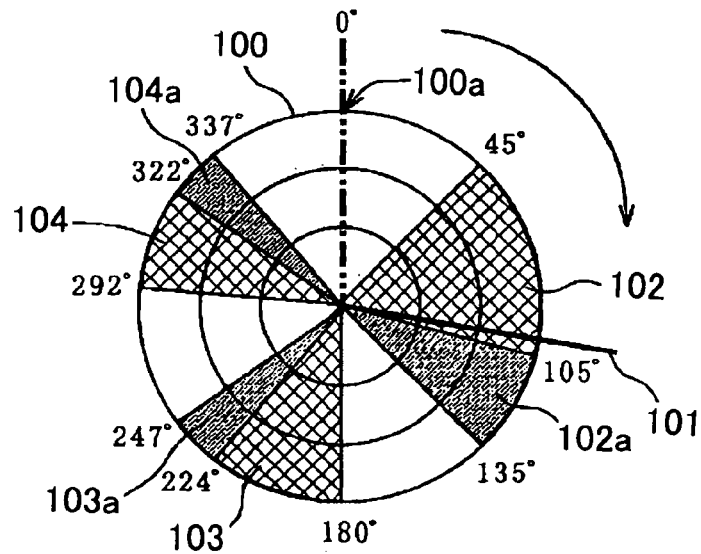
FIG. 29 is a view showing a display of the judgment ring provided after determination of the command.

FIG. 29 shows a display of the judgment ring 100 provided after determination of the command. The drawings show that rotation of the rotary bar 101 has been commenced and is passing over the first timing area 102.

Figure 30A:
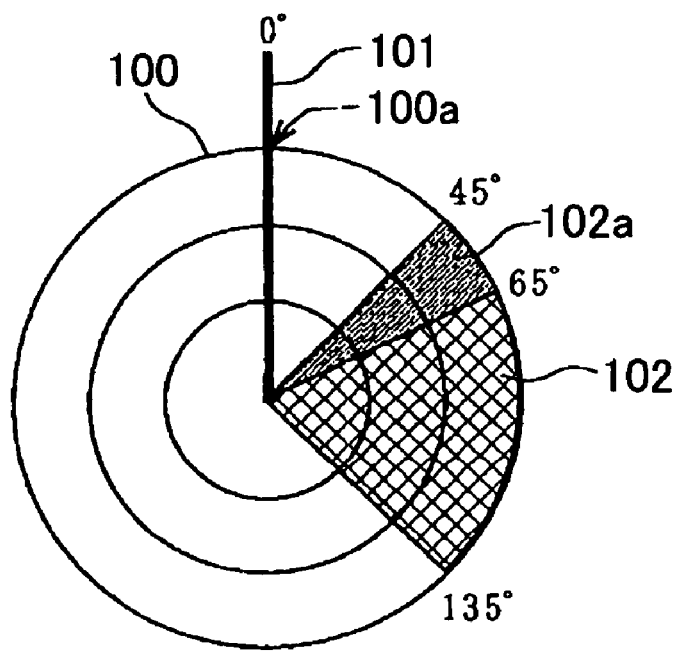
FIGS. 30A and 30B are views showing an example of a 120% area.
Figure 30B:
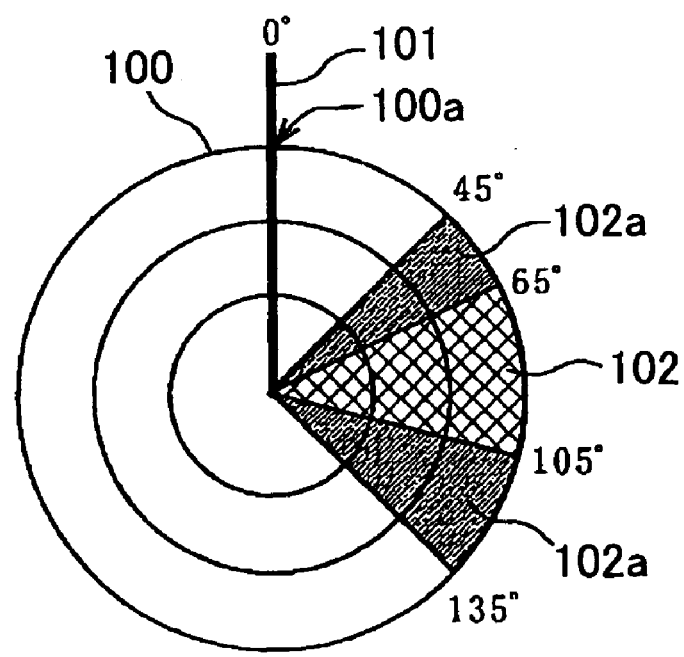

The 120% area is not limited to the above-mentioned case. For instance, as shown in FIG. 30A, the 120% area may be provided as a single area within the range defined between the starting angle and the predetermined angle. Alternatively, as shown in FIG. 30B, two 120% areas may be provided. FIG. 30A shows a case where the range 102a defined between a starting angle of 45° and an ending angle of 65° obtained by adding 20° to 45° is taken as the 120% area. FIG. 30B shows a case where the range 102a defined between a starting angle of 45° and an ending angle of 65° obtained by adding 20° to 45°, and a range defined between an ending angle of 135° and an angle of 105° obtained by subtracting 30° from 135° are taken as the 120% area.

FIG. 31 shows the Special Table. This table is set when the player has selected the Special command. Here, the term "special" means a command which employs special ability that is individually set for the character. For instance, in the case of the Ally Character A, the ally character is transformed into a fusion monster to be described later. The ally character, which had been unable to use the attack magic, becomes able to use the attack magic. As shown in FIG. 31, available special abilities are determined in accordance with the type of the ally character. Ability values and the ranges of the respective timing areas are set for the respective special abilities.

As shown in FIG. 31, when the ally character is the Ally Character A, the ally character can use types of attack magic 1 through 3 as the special abilities. Ability values set for these types of attack magic 1 through 3 are used for computing the amount of damage on the opponent, which is intended for inflicting damage on the enemy character through use of the types of attack magic 1 through 3. In this case, the greater the ability value of the special ability to be used, the greater the amount of damage on the enemy character; that is, the greater the number of points to be used for reducing the HP of the enemy character. Here, the types of attack magic 1 through 3 are available when the ally character has become transformed into the fusion monster to be described later.

In contrast, when the ally character is the Ally Character B, the ally character can use types of recovery magic 1 through 3 as the special abilities. Ability values set for these types of recovery magic 1 through 3 are used for computing a recovery value to be used for causing the allied characters to recover through use of the types of recovery magic 1 through 3. In this case, the greater the ability value of the special ability to be used, the greater the recovery value of the allied characters; that is, the number of points to be used for recovering the HP of the allied characters that have suffered damage from the enemy characters.

As in the case of the Weapon table, the range of the timing area is indicated as an angular range bound by a starting angle and an ending angle, wherein the position 100a where rotation of the rotary bar 101 is commenced is taken as 0°. The starting angle and the ending angle are set to different values in accordance with the type of a weapon to be used. In addition, depending on the type of special ability to be used, there may arise a case where only the first timing area 102 is set in the Special table and a case where only two timing areas; that is, the first and second timing areas, are set in the Special table. Such special ability is not prepared for the ally character C, and neither the ability value nor the ranges of the timing areas are set in the Special table in connection with the ally character C.

FIG. 32 show a formula used for computing the amount of damage inflicted on an opponent when the types of attack magic 1 through 3 have been used as the special ability and a formula used for computing a recovery value achieved when the types of recovery magic 1 through 3 have been used as the special ability.

As shown in FIG. 32, an assignment value assumes 0.2 when special ability is used for the first time; 0.3 when the special ability is used for the second time; and 0.5 when the special ability is used for the third time.

Personal Capability of Character used in the formula for computing the amount of damage inflicted on the opponent when the types of attack magic 1 through 3 shown in FIG. 32 are used represents the INT (power of an attack using magic) shown in FIGS. 8A. and 8B. Capability Value of Special Ability to be Used corresponds to an ability value set in accordance with the type of the ally character and the type of special ability, both being shown in FIG. 31.

The Judgment Ring Correction Value assumes 1.2 when the O button 12 is operated when the rotary bar 101 is situated in the 120% area of the timing area. The Judgment Ring Correction Value assumes "1" when the O button 12 is operated when the rotary bar 101 is situated in a portion of the timing area other than the 120% area. The Judgment Ring Correction Value assumes 0 when the O button 12 is not operated when the rotary bar 101 is situated in the timing area.

In a case where, for example, the Special command has been selected and the attack magic has been selected as the special ability to be used, when the O button 12 has been operated in all the timing areas, the ally character makes an attack against the enemy character through use of the attack magic, to thus inflict predetermined damage on the enemy character. For instance, when the ally character A makes an attack through use of the attack magic 1, the ally character A makes only one attack against the enemy character through use of the attack magic, because only one timing area is set. In accordance with the formula shown in FIG. 32, the amount of damage inflicted on the opponent at this time is computed as a value of 0.2×INT ×99×1 (1.2). The points corresponding to these damage amounts are subtracted from the HP of the enemy character.

In a case where, for example, the Special command has been selected and the recovery magic has been selected as the special ability to be used, when the O button 12 has been operated in all the timing areas, the ally character works the recovery magic on the allied characters, to thus cause the allied characters to recover from the damage. For instance, when the ally character B uses the recovery magic 1, the ally character B can use the recovery magic only once, because only one timing area is set. In accordance with the formula shown in FIG. 32, the recovery value gained by the allied characters at this time is computed as a value of 0.2×19×1 (1.2). The points corresponding to the recovery value are added to the HPs of the allied characters.

A comparison is made between the ranges of the timing area set in the tables of the respective characters. In relation to the weapon table shown in FIG. 26, the ranges of the timing areas set for the ally character A are generally wider than the ranges of the timing areas set for the ally character B. For instance, a total of the ranges of the timing areas set for the weapon A1 falls within an angular range of (135°–45°)+(247°–180°)+(337°–292°)=202°. A total of the ranges of the timing areas set for the weapon B1 falls within an angular range of (125°–50°)+(205°–157°)+(282°–247°)=185°.

The reason for this is that the ally character A is set, in the story, as a male who has high muscular strength and high physical attack power. For this reason, the ally character A excels over others in making an attack through use of weapons. Accordingly, the ranges of the timing areas employed in the case of use of a weapon; that is, at the time of selection of the weapon table, are set wide, and the degree of difficulty in operating the judgment ring 100 is low.

Conversely, in the special table shown in FIG. 31, the ranges of the timing areas set for the ally character B are wider than the ranges of the timing areas set for the ally character A.

The reason for this is that the ally character B is set, in the story, as a female sorcerer. For this reason, the ranges of the timing areas employed in the case of use of the recovery magic; that is, at the time of selection of the spatial table, are set wide, and the degree of difficulty in operating the judgment ring 100 is low.

As mentioned above, the features of the respective characters set in the story are taken into the requirements for executing the judgment ring 100. As a result, there are provided not only a technical intervening element but also amusement for searching a command conforming to each character, thereby enhancing interest in the game.

FIG. 33 shows an Item Table. This is set when the player has selected the Item command. Individual capabilities of the respective items to be used and the ranges of the respective timing areas are set in accordance with the types of the items to be used. As shown in the Item Table, items A through C can be commonly used for all the ally characters. The items A through C are for recovering the HPs of the allied characters which have been reduced upon infliction of damage by the enemy characters. Accordingly, the individual capabilities of the items to be used in this Item Table are used for computing recovery values to be used for causing the allied characters A through C to recover through use of the items A through C.

The formula used for computing the recovery values achieved when the ally character has used the items A through C is identical with that shown in FIG. 32. An assignment value assumes 0.2 when the items are used for the first time; and 0.3 when the items are used for the second time.

FIG. 34 shows a Judgment Ring Correction Parameter Table. This Judgment Ring Correction Parameter Table shows parameters (hereinafter called "Judgment Ring Correction Parameters") for changing a display mode of the judgment ring 100 (i.e., the ranges of the timing areas, the rotational speed and number of revolutions of the rotary bar 101, and the size of the judgment ring) and detailed changes in the display mode.

Types of the judgment ring correction parameters shown in the Judgment Ring Correction Parameter Table include "Item," "Enemy Magic," and "Event Type."

As shown in the Judgment Ring Correction Parameter Table, ten types of items (items D through M) are set for items serving as the judgment ring correction parameters. These items become available by the party of ally characters satisfying predetermined conditions in respective sub-maps. When these items are used in the battle situation or in a shop, the display mode of the judgment ring 100 differs from that provided in normal times, and the judgment ring 100 is displayed in a manner which is very advantageous to the player.

Efficacy yielded as a result of use of the respective items will be described.

(1) When the item D or E is used, the ranges of the respective timing areas are broadened to double size. Namely, operation of the O button 12 becomes easy.

(2) When the item F or G is used, the rotational speed of the rotary bar 101 becomes one-half. Namely, operation of the O button 12 becomes easy.

(3) When the item H is used, the ranges of the respective timing areas are broadened to double, and the rotational speed of the rotary bar 101 becomes half.

(4) When the item I is used, the rotational speed of the rotary bar 101 is changed irregularly; i.e., faster or slower. However, when the O button 12 is operated well, the attack power; i.e., the amount of damage inflicted on an opponent, becomes tripled, thereby bringing the player into a very advantageous state.

(5) When the item J is used, the entire area of the judgment ring 100 becomes a timing area. Success is achieved regardless of where the O button 12 is operated.

(6) When the item K is used, the number of revolutions of the rotary bar 101 is increased to a maximum of seven times, although the number of revolutions is usually one. In this case, the player can operate the O button 12 carefully.

(7) When the item L is used, the efficacy of the item is enabled, and the number of rotations of the rotary bar 101 is increased. The amount of damage inflicted on an opponent is increased in accordance with the number of revolutions consumed until the O button 12 is successfully operated.

(8) When the item M is used, no timing areas are displayed on the judgment ring 100. However, the number of ally characters that make attacks and their attack powers are randomly determined in response to a timing at which the O button 12 is operated.

Even in the case of the Judgment Ring Correction Parameter Table, parameters corresponding to blanks in the table remain unchanged as in normal times.

Acquisition of the items D through M as the judgment ring correction parameters enables development of the game that is very advantageous to the player. Therefore, these items are set as rare items which are not acquired easily.

The Enemy Magic set as one of the judgment ring correction parameters indicates specific enemy magic among types of magic possessed by the enemy character (hereinafter called "enemy magic"). When any of the types of enemy magic has been worked on the ally character, the display mode of the judgment ring 100 becomes disadvantageous to the player. In the Judgment Ring Correction Parameter Table, six types of enemy magic (enemy magic A to F) are set in the Enemy Magic as the judgment ring correction parameters.

Efficacy yielded when the ally character has been subjected to the respective types of enemy magic will now be described.

(1) When the enemy magic A has been worked on the ally character, the ranges of the timing areas on the judgment ring 100 become half.

(2) When the enemy magic B has been worked on the ally character, the rotational speed of the rotary bar 101 is doubled.

(3) When the enemy magic C has been worked on the ally character, the size of the judgment ring 100 becomes half.

(4) When the enemy magic D has been worked on the ally character, the size of the judgment ring 100 becomes doubled, but the ranges of the timing areas on the judgment ring 100 become half.

(5) When the enemy magic E has been worked on the ally character, the size of the judgment ring 100 becomes doubled, but the rotational speed of the rotary bar 101 is changed irregularly; i.e., made faster or slower. Even when the O button 12 has been operated well, the attack power is not tripled, in contrast with the case of the item I, and remains as in normal times.

(6) When the enemy magic F has been worked on the ally character, the ranges of the timing areas, the rotational speed of the rotary bar 101, and the size of the judgment ring 100 are randomly determined within the range from a half size to a double size.

The Event Type set as one of the judgment ring correction parameters corresponds to an event in which the party of ally characters fights against specific enemy characters. When this event has arisen, the display mode of the judgment ring 100 becomes disadvantageous to the player. In the Judgment Ring Correction Parameter Table, four types of events (middle bosses A through C, and a wrath boss) are set in the Event Type as the judgment ring correction parameters.

Efficacy yielded at the time of occurrence of the respective event types will now be described.

(1) Event type "Middle Boss A" is an event in which the party of ally characters encounter and fight against a middle boss A, which is one type of enemy boss character. When this event has arisen, the rotational speed of the rotary bar 101 becomes doubled.

(2) Event type "Middle Boss B" is an event in which the party of ally characters encounters and fights against a middle boss B, which is one type of enemy boss character. When this event has arisen, the ranges of the timing areas become half.

(3) Event type "Middle Boss C" is an event in which the party of ally characters encounters and fights against a middle boss C, which is one type of enemy boss character. When this event has arisen, the ranges of the timing areas become half, and the rotational speed of the rotary bar 101 is changed irregularly, such as made faster or slower.

(4) Event type "Wrath Boss" is an event in which the party of ally characters encounters and fights against a wrath boss, which is one type of enemy boss character. When this event has arisen, the ranges of the timing areas become half.

Here, the boss characters are enemy characters which enable acquisition of a much larger number of points when defeated, as compared with the points acquired by defeating the ordinary enemy characters. As mentioned above, the display mode of the judgment ring 100 becomes difficult for the player.

Figure 35:
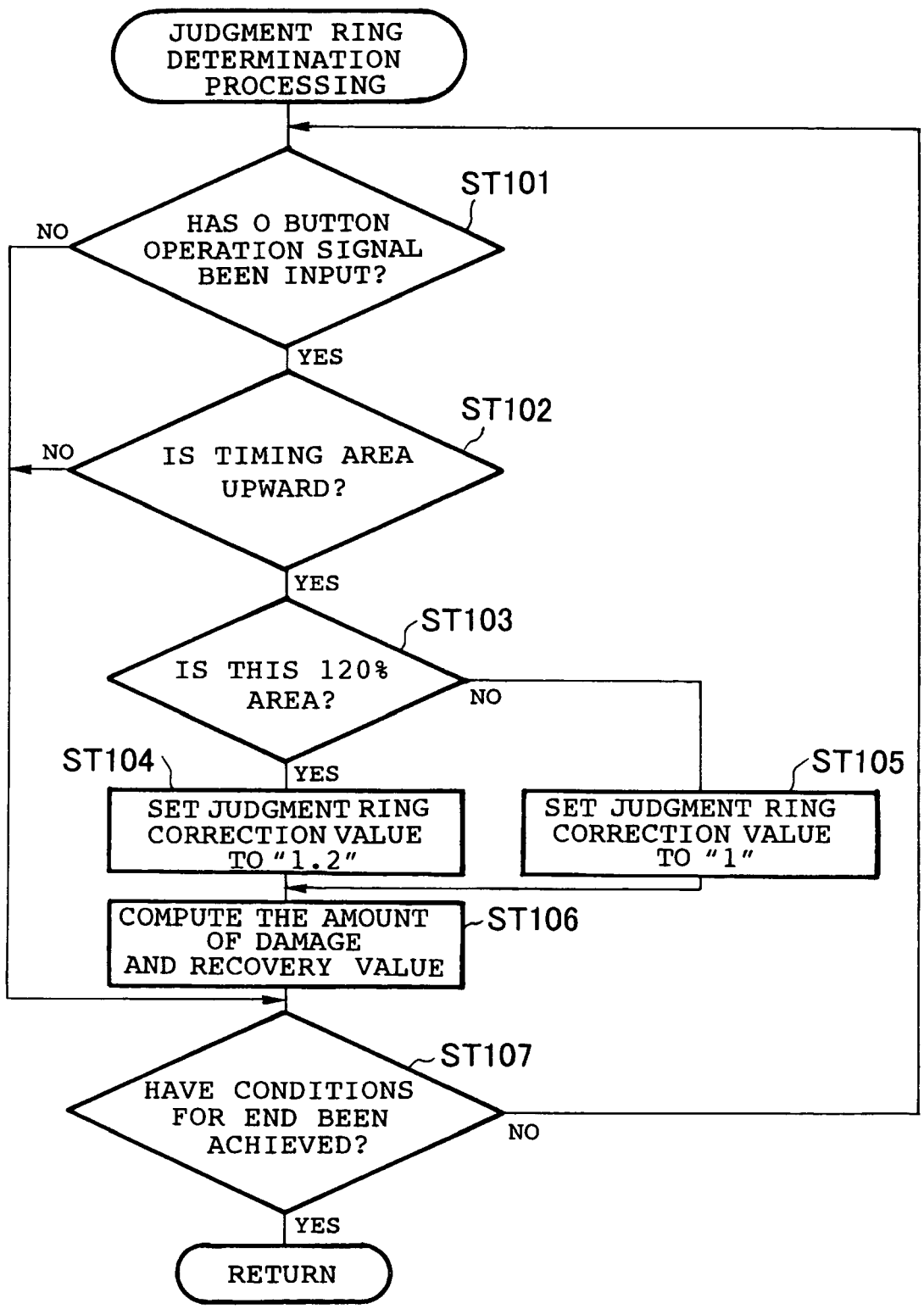
FIG. 35 is a flowchart showing procedures of judgment ring judgment processing.

FIG. 35 shows procedures of Judgment Ring Judgment Processing pertaining to ST83 (FIG. 15). This processing corresponds to the previously-described Judgment Ring Determination Processing and is subsequent to commencement of rotation of the rotary bar 101 in the judgment ring 100. First, the player operates the O button 12, thereby determining whether or not an operation signal has been input (ST101). When the result of determination in ST101 is NO, processing proceeds to ST107. When the result of determination in ST101 is YES; that is, when the input of the operation signal has been ascertained, another determination is made as to whether or not the rotary bar 101 is situated in any of the timing areas (ST102).

When the result of determination in ST102 is NO, processing proceeds to ST107. When the result of determination is YES; that is, when the rotary bar 101 is situated in any of the timing areas, another determination is made as to whether or not the position of the rotary bar 101 falls within the 120% area (ST103). A case where the result of determination in ST102 is NO is a case where the O button 12 has been operated when the rotary bar 101 is situated in the timing area. In this case, operation of the O button 12 performed in subsequent stages becomes invalid, and requirements for completing display of the judgment ring 100 come to be satisfied.

When the result of judgment in ST103 is YES; that is, when the rotary bar 101 is situated in the 120% area, 1.2 is set in the predetermined area of the RAM 23 as the judgment ring correction value (ST104). When the result of determination in ST103 is NO; that is, when the rotary bar 101 is situated in the timing area other than the 120% area, "1" is set in the predetermined area of the RAM 23 as the judgment ring correction value (ST105).

Next, the amount of damage inflicted on an opponent or the recovery value is computed by means of a predetermined formula on the basis of the type of the selected command, the type of the selected ally character, and the item used, and a result of computation is set in the predetermined area of the RAM 23 (ST106).

In ST107, a determination is made as to whether or not requirements for completing display of the judgment ring 100 have been satisfied. Here, the requirements for completion include (1) exhaustion of a specified number of revolutions (usually assumes one but may be increased by the judgment ring correction parameter), and (2) exhaustion of a specified number of times pinpoint stopping action has been performed (usually assumes three but may be changed by various parameters). When the result of determination in ST107 is YES, the Judgment Ring Judgment Processing is completed. When the result of determination is NO, processing returns to ST101.

Figures 36, 37:
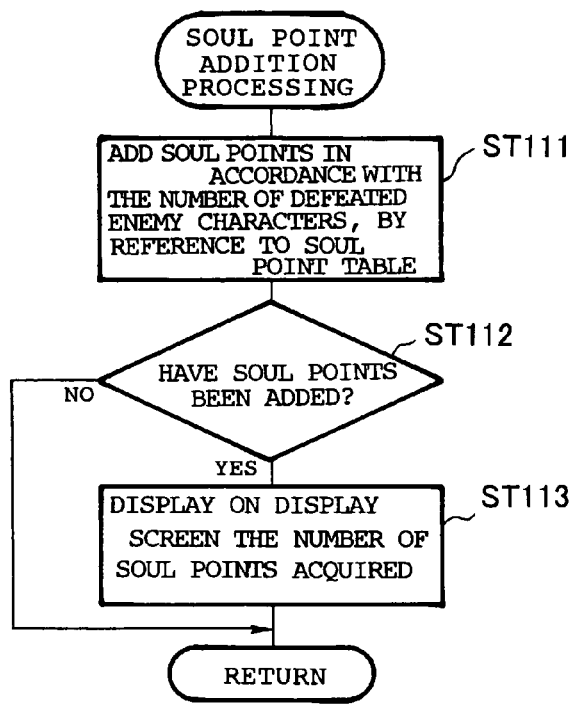
FIG. 36 is a flowchart showing procedures of soul point addition processing.
FIG. 37 is a view showing a soul point table.

FIG. 36 shows procedures of the Soul Point Addition Processing pertaining to ST39 (FIG. 5). This processing is to be performed after completion of one turn in the battle situation. In some cases, points called soul points are provided for the enemy characters against which the ally characters are to fight. When the soul points are set in the enemy character defeated by any of the ally characters, the ally character acquires these soul points.

FIG. 37 shows a Soul Point Table which show enemy characters and soul points thereof. As shown in FIG. 37, the soul points include six types of attributes; that is, "Light," "Darkness," "Wind," "Earth," "Water, " and "Fire." Acquired soul points are added to corresponding Soul Point Addition Counters provided in the RAM 23 in accordance with the types of the attributes.

Accordingly, in the Soul Point Addition Processing, reference is first made to a Soul Point Table, and soul points set for the defeated enemy character are added to corresponding soul point addition counters (ST111). When the defeated enemy character is a monster A, a soul point of attribute Earth; that is, one point, is added to a soul point addition counter having an attribute of Earth, because the soul point of Earth is set to one. When the defeated enemy character is a monster B, soul points of attribute Darkness; that is, two points, are added to a soul point addition counter having an attribute of Darkness, because the soul point value of Darkness is set to two. When the defeated enemy character is a monster C, nothing is added to a corresponding soul point addition counter, because the soul point of the monster C is not set. When the defeated enemy character is a monster D, one is added to the soul point addition counter having an attribute of Earth, and four points are added to the soul point addition counter having an attribute of Fire, because the soul point value having an attribute of Earth is set to one, and the soul point value having an attribute of Fire is set to four. When the defeated enemy character is a monster E, a soul point having an attribute of Light; that is, one point, is added to a soul point addition counter having an attribute of Light, because the soul point value of Light is set to one.

Next, a determination is made as to whether or not the soul point(s) has (have) been added to the corresponding soul point addition counter(s). When NO is selected, the Soul Point Addition Processing is completed. When YES is selected, a Screen for Displaying the Number of Acquired Soul Points is displayed (ST113).

Figure 38A:
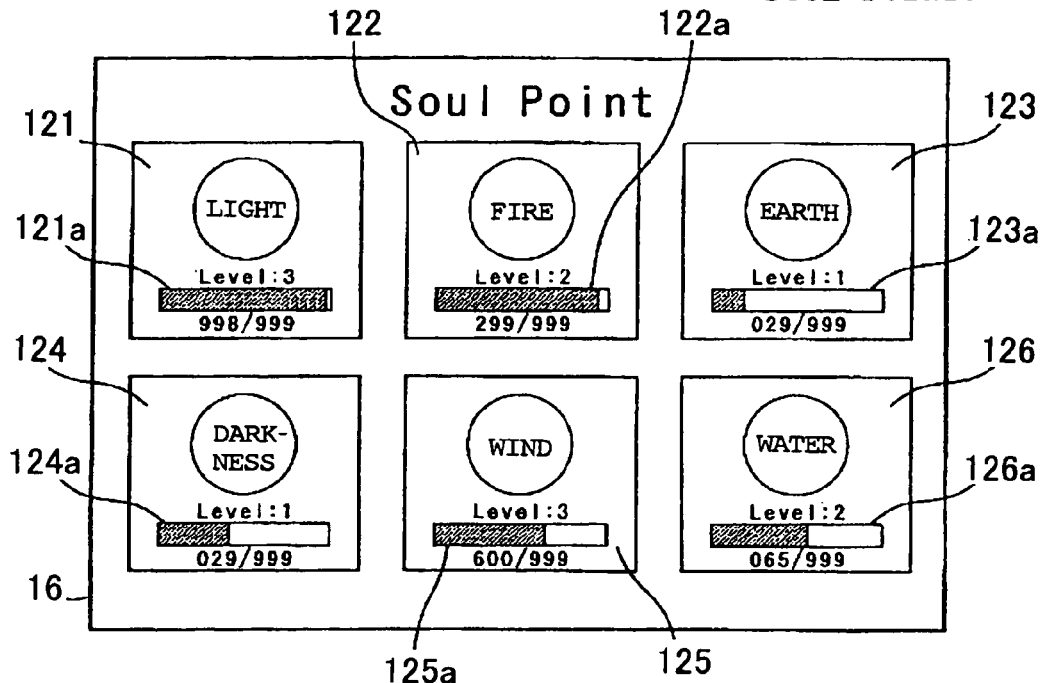
FIGS. 38A and 38B are views showing an acquired soul point display screen.

FIG. 38A shows an example display of the Screen for Displaying the Number of Acquired Soul Points. The number of acquired soul points having an attribute of Light is displayed in an area 121 where the word Light is displayed, through use of a level indicator 121a and numerals. The number of acquired soul points having an attribute of Fire is displayed in an area 122 where the word Fire is displayed, through use of a level indicator 122a and numerals. The number of acquired soul points having an attribute of Earth is displayed in an area 123 where the word Earth is displayed, through use of a level indicator 123a and numerals. The number of acquired soul points having an attribute of Darkness is displayed in an area 124 where the word Darkness is displayed, through use of a level indicator 124a and numerals. The number of acquired soul points having an attribute of Wind is displayed in an area 125 where the word Wind is displayed, through use of a level indicator 125a and numerals. The number of acquired soul points having an attribute of Water is displayed in an area 126 where the word Water is displayed, through use of a level indicator 126a and numerals.

The soul points are set such that the level of the ally character increases in increments of one in accordance with the number of acquired soul points. When the level of the ally character has increased, the ally character can fight against the Fusion Monster to be described later. Here, the Fusion Monster is an enemy character set so as to impart special ability to the ally character on condition that the ally character has won over the fusion monster. The special ability is the ability of the ally character to transform into the fusion monster itself.

Figures 39, 40:
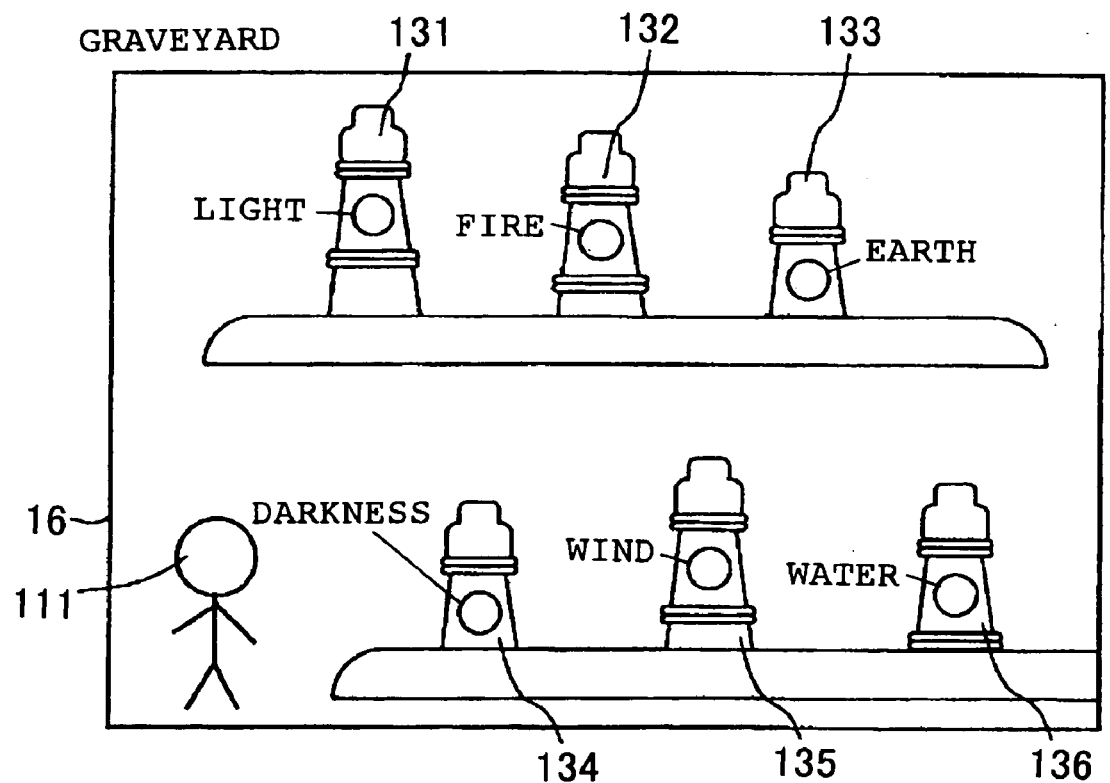
FIG. 39 is a view showing an example of the number of soul points required to raise a fusion level.
FIG. 40 is a view showing a state in which a graveyard is displayed.

FIG. 39 shows an example of the number of soul points required to reach a certain level (called a "fusion level") on condition that the ally character fights against fusion monsters. Here, the fusion monsters include six types of fusion monsters corresponding to the attributes of the soul points. (i.e., a light fusion monster, a fire fusion monster, an earth fusion monster, a darkness fusion monster, a wind fusion monster, and a water fusion monster).

The embodiment shown in FIG. 39 describes the number of soul points required to reach a certain fusion level on condition that the ally character fights against the Fire Fusion Monster. In this case, when the number of acquired soul points has reached 80, the fusion level is increased to two, and the ally character can fight against the fire fusion monster of corresponding level. When the number of acquired soul points has reached 300, the fusion level is increased to three, and the ally character can fight against the fire fusion monster of corresponding level. Moreover, when the number of acquired soul points has reached 999, the fusion level becomes MAXIMUM, and the ally character can fight against the fire fusion monster of corresponding level. Thus, the fusion level is increased in accordance with the number of acquired soul points. When the fusion level is increased, the attack power of the fusion monster is set to be increased as well. When the fusion monster is defeated, the ally character acquires the ability to be transformed into the defeated fusion monster itself.

Accordingly, the numerals provided over the respective level indicators 121a to 126a shown in FIG. 38A indicate the current fusion levels. For instance, Level: 3 is displayed over the level gauge 121a where the number of acquired soul points having the Light attribute is to be displayed, thereby indicating that the fusion level is three. Numerals provided below the respective level indicators 121a to 126a indicate the number of currently-acquired soul points/the maximum number of acquired points. For instance, 998/999 is displayed below the level indicator 121a where the number of acquired soul points having the Light attribute is to be displayed, thereby indicating that the number of currently-acquired soul points is 998 and that the maximum number of acquired points is 999.

Graphic indicators of the respective level indicators 121a through 126a are set so as to come to the right end when the fusion level is increased as a result of having attained a predetermined number of acquired soul points. Accordingly, when the fusion level has increased, the graphic indicators of the level indicators 121a to 126a are cleared.

Figure 38B:
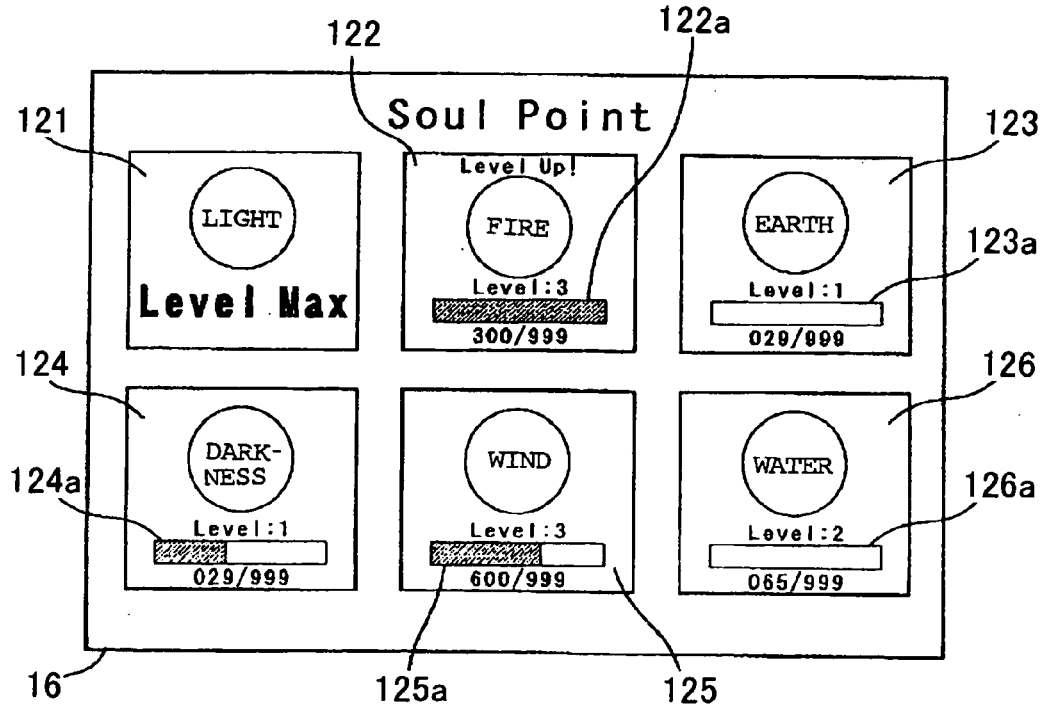

An example display of the Screen for Displaying the Number of Acquired Soul Points shown in FIG. 38B shows that a certain fusion level has been increased on condition that the words Level Max are displayed in the area 121 where the letter Light has already been displayed; that the number of acquired soul points having the Light attribute has reached 999; and that the player can fight the light fusion monster. An example display of the Screen for Displaying the Number of Acquired Soul Points shown in FIG. 38B shows that a certain fusion level has been increased from two to three on condition that the words Level UP! are displayed in the area 122 where the word Fire has already been displayed; that the number of acquired soul points having the Fire attribute has reached 300; and that the player can fight against the fire fusion monster.

A determination as to whether or not the ally character fights against the fusion monster depends on a result of selection of a command issued by the player. Command selection becomes effective only when the fusion level has increased. For instance, an increase in fusion level can be readily ascertained, so long as the words Level Up! or Level Max, such as those shown in FIG. 38B, appear. Therefore, the player can fight against the fusion monster by means of selecting a predetermined command in the next battle situation.

A battle against the fusion monster is performed in a Graveyard different from the scene of an ordinary battle situation. When the fusion level has increased, a Fusion command is added to the command menu. When the Fusion command has been selected, the ally character is guided to the Graveyard, where the ally character can fight against the fusion monster.

FIG. 40 shows that the Graveyard is displayed on the display 16. Here, six tombstones 131 through 136 are displayed and correspond to the respective fusion monsters. The tombstone 131 affixed with the word Light corresponds to the light fusion monster; the tombstone 132 affixed with the word Fire corresponds to the fire fusion monster; the tombstone 133 affixed with the word Earth corresponds to the earth fusion monster; the tombstone 134 affixed with the word Darkness corresponds to the darkness fusion monster; the tombstone 135 affixed with the word Wind corresponds to the wind fusion monster; and the tombstone 136 affixed with the word Water corresponds to the water fusion monster.

So long as any one is selected from the tombstones, a fusion monster corresponding to the thus-selected tombstone appears, and the ally character can fight against the fusion monster.

In an example display shown in FIG. 40, the tombstones are displayed as differing in height from each other, thereby indicating fusion levels of the respective attributes. For instance, the tombstone 131 associated with the light fusion monster indicates that the fusion level of the attribute Light is MAXIMUM. The tombstone 132 associated with the fire fusion monster indicates that the fusion level of the attribute Fire is three. The tombstone 133 associated with the earth fusion monster indicates that the fusion level of the attribute Earth is one. The tombstone 134 associated with the darkness fusion monster indicates that the fusion level of the attribute Darkness is one. The tombstone 135 associated with the wind fusion monster indicates that the fusion level of the attribute Wind is three. The tombstone 136 associated with the water fusion monster indicates that the fusion level of the attribute Water is, two.

Figure 41:
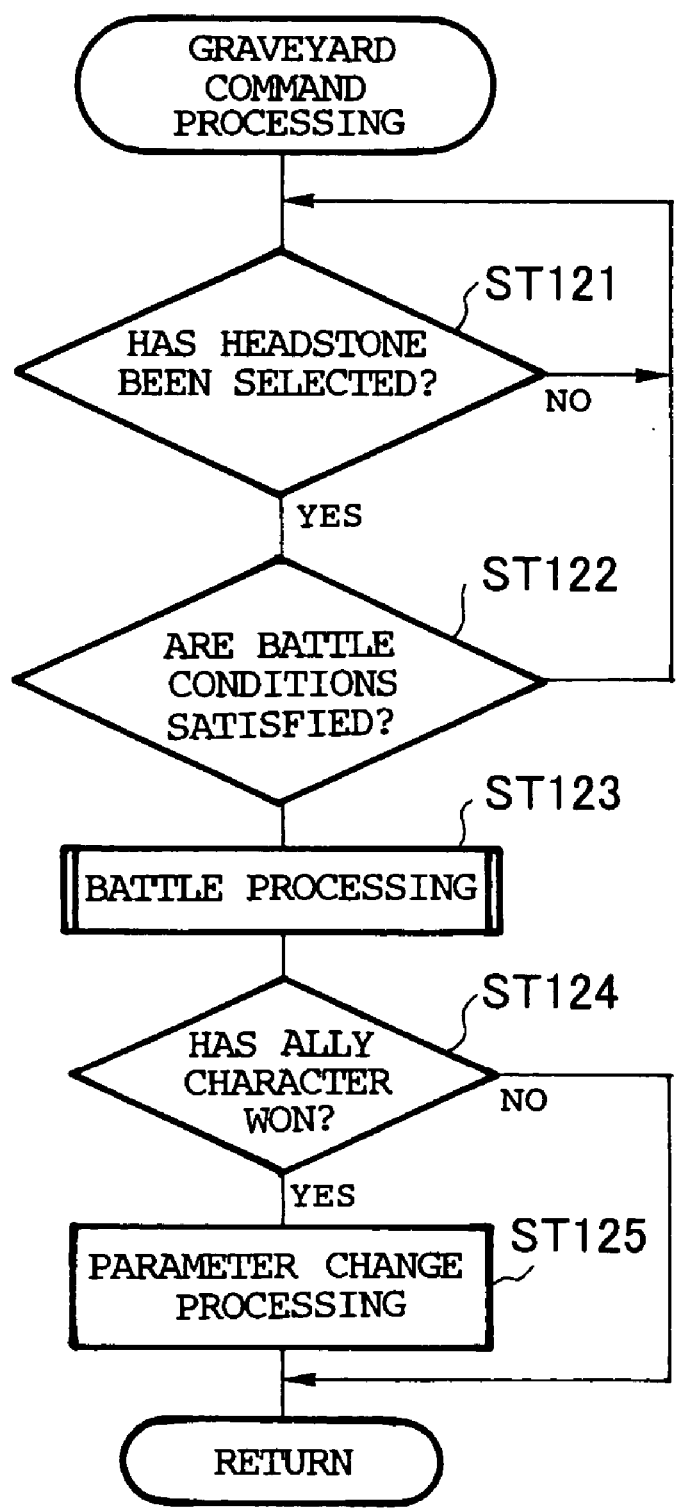
FIG. 41 is a flowchart showing procedures of graveyard command processing.

FIG. 41 shows procedures of Graveyard Command Processing performed when the Graveyard command has been selected by the player. First, a determination is made as to whether or not the player has selected the tombstone (ST121). When the result of determination in ST121 is YES, another determination is made as to whether or not requirements for fighting against a fusion monster corresponding to the tombstone (i.e., battle requirements) are satisfied (ST122). The battle requirements correspond to either the fusion level whose attribute associated with the selected tombstone has just been increased or the fusion level having already been increased and the ally character not having fought another fusion monster subsequently.

When the result of determination in ST122 is YES, there is performed the foregoing Battle Processing in which the player fights against the selected fusion monster. Here, when the ally character has defeated the fusion monster (when YES is selected in ST124), there is performed Parameter Change Processing for adding, to the use items of the ally character, the ability of the ally character to transform into the defeated fusion monster (called a "fusion soul") (ST125).

Figure 42:
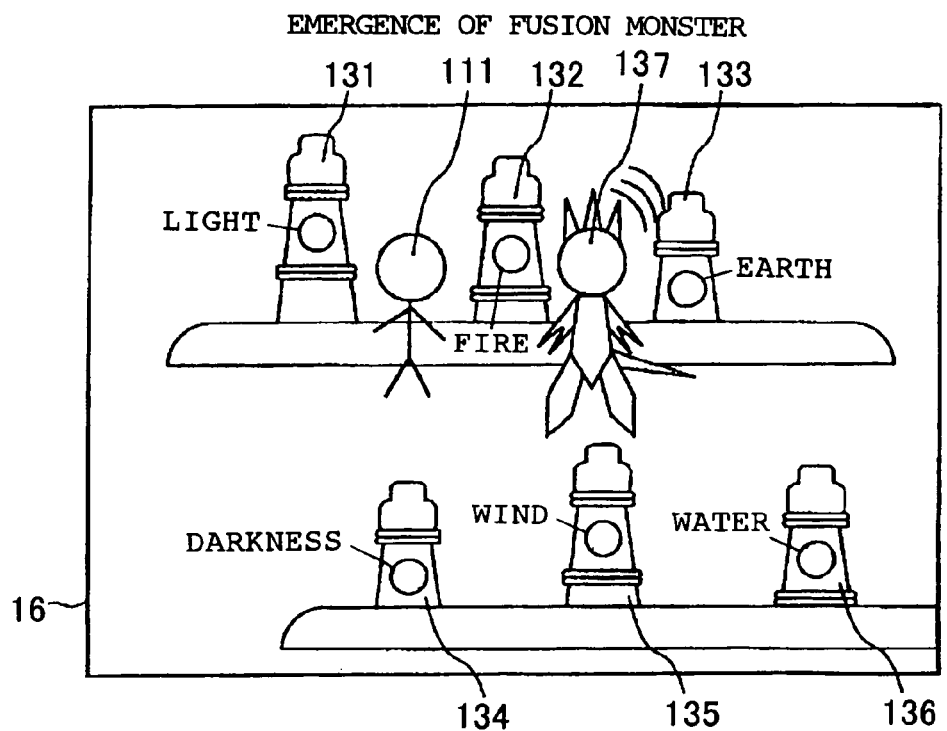
FIG. 42 is a view showing that a fusion monster has emerged in the graveyard.

FIG. 42 shows that the fusion monster 137 associated with the selected tombstone emerges from the back of the tombstone.

Figure 43:
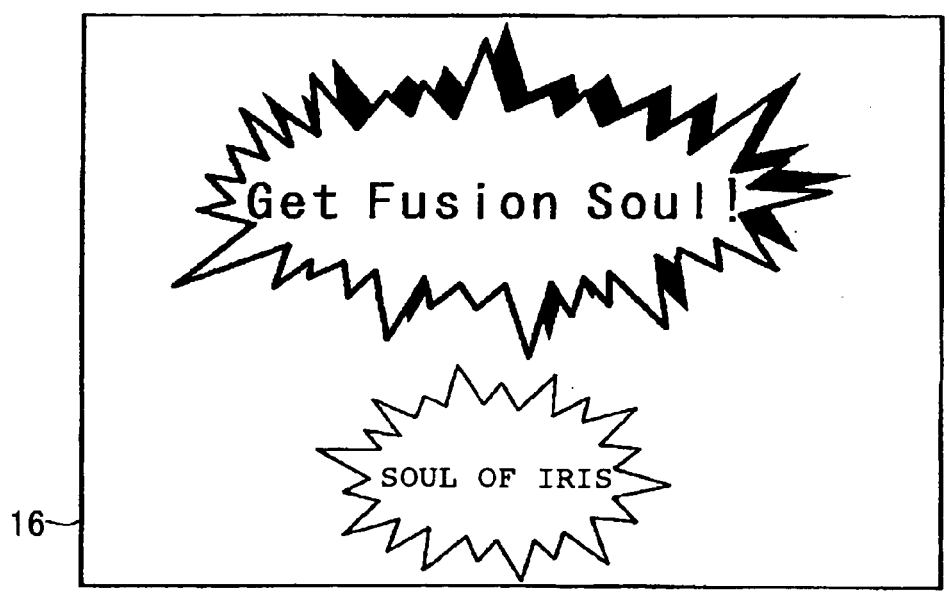
FIG. 43 is a view showing a fusion soul acquisition screen.

FIG. 43 shows a Fusion Soul Acquisition Screen which appears when the ally character has defeated the fusion monster. Here, the words "Get Fusion Soul!" appear on the display 16, and the name of the acquired fusion soul is displayed below the words. In FIG. 43, Soul of Iris is displayed as the name of the fusion soul. Here, Iris is the designation of the fusion monster.

As mentioned above, so long as the ally character acquires a fusion soul, the ally character can make an attack in a subsequent battle through use of the fusion soul. Specifically, in a battle situation subsequent to acquisition of the fusion soul, the name of the acquired fusion soul (Iris in the case of the foregoing situation) is added to the command menu as a command. The ally character can transform into the fusion monster as a result of the player selecting the thus-added command. Transformation of the ally character into the fusion monster does not mean simple change in shape, but means that all the capabilities of the fusion monster can be utilized. Specifically, the ally character can become the fusion monster itself.

There will now be described Tool Command Processing which is to be executed, when the Tool Command has been selected, on a Menu Screen displayed as a result of operation of the button on the sub-map. In this Tool Command Processing, changing of the parameters (the HP, the MP, the SP, or the like) of the ally character is enabled by means of the player using the item on hand.

Figure 44:
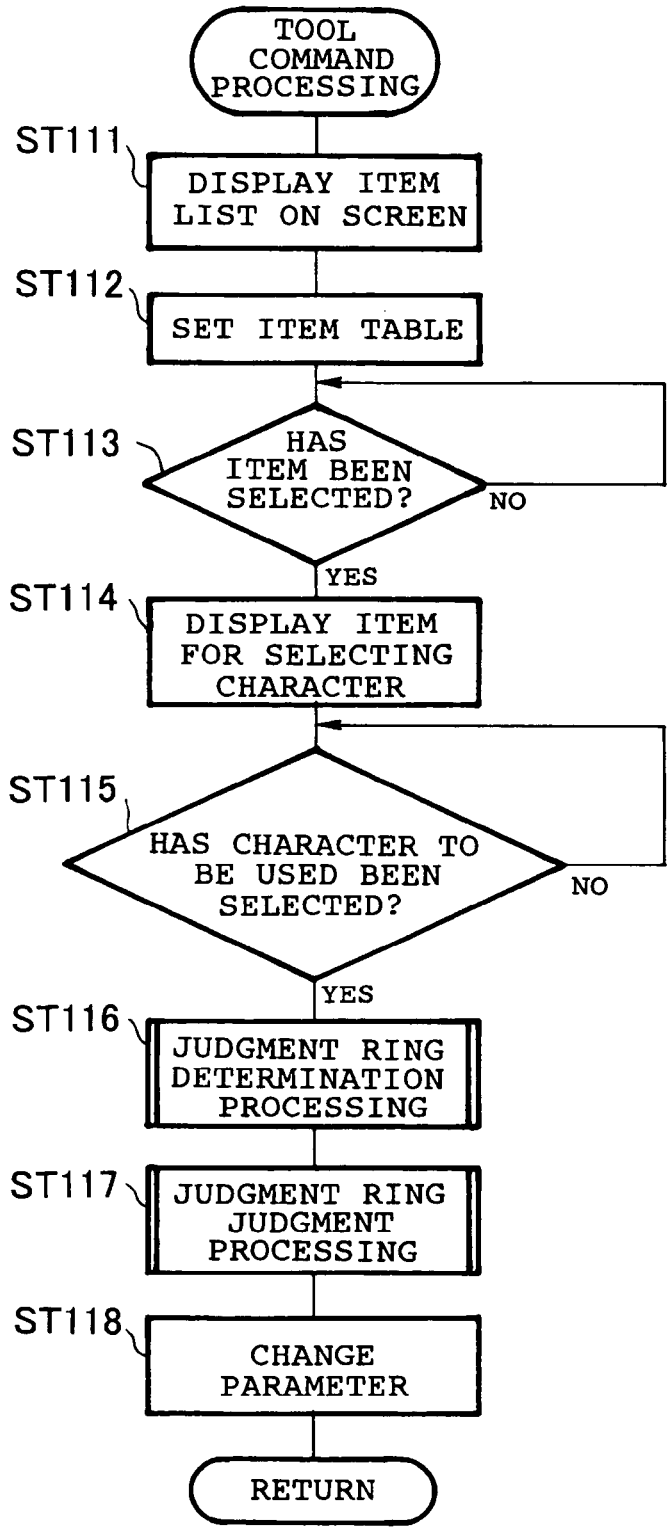
FIG. 44 is a flowchart showing procedures of tool command processing.

FIG. 44 shows procedures of the Tool Command Processing. When the Tool command is selected and the Tool Command Processing is executed, an Item List Screen appears on the display 16 (ST111).

Figure 45:
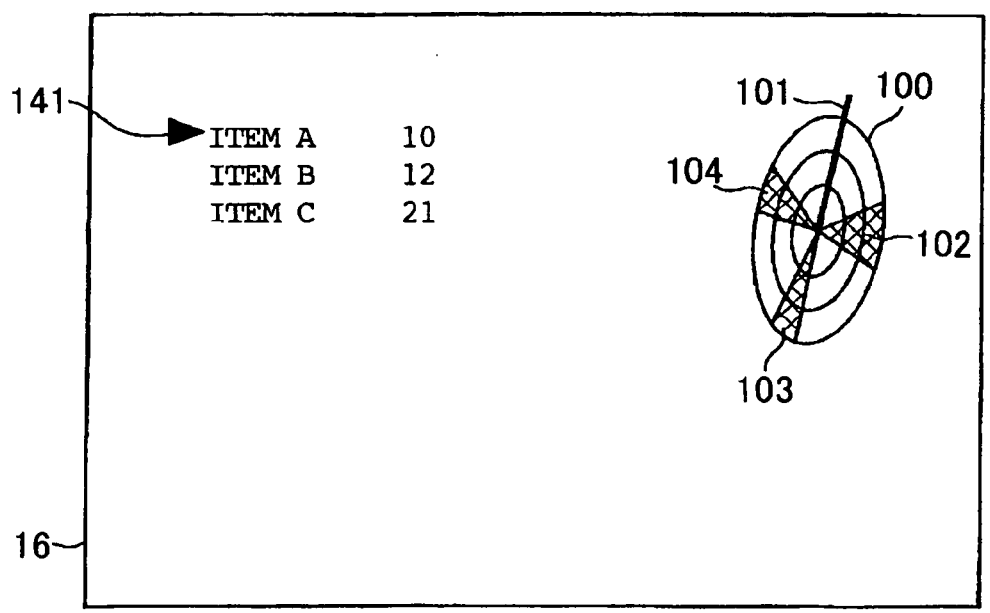
FIG. 45 is a view showing an item list screen.

FIG. 45 shows an example Item List Screen. A list of the items the player has on hand, the numbers of the items, and the judgment ring 100 are displayed on the Item List Screen. Items and the numbers thereof are displayed on the screen; that is, ten items A, twelve items B, and twenty-one items C.

After display of the Item List Screen, the Item Table (FIG. 33) is extracted from the DVD-ROM 31, and the thus-extracted item table is set in the predetermined area of the RAM 23 (ST112). Details of the Item Table are the same as those provided previously.

A determination is then made, on the Item List Screen, as to whether or not an item to be used has been selected (ST113). Specifically, a selection cursor 141 is displayed at a position on the left side of the item list on the Item List Screen. The player operates the up button 7 or the down button 8, to thus move the selection cursor 141 up or down. The item on whose left side the selection cursor 141 is situated is selected as an item to be used by means of operation of the O button 12.

Figure 46:
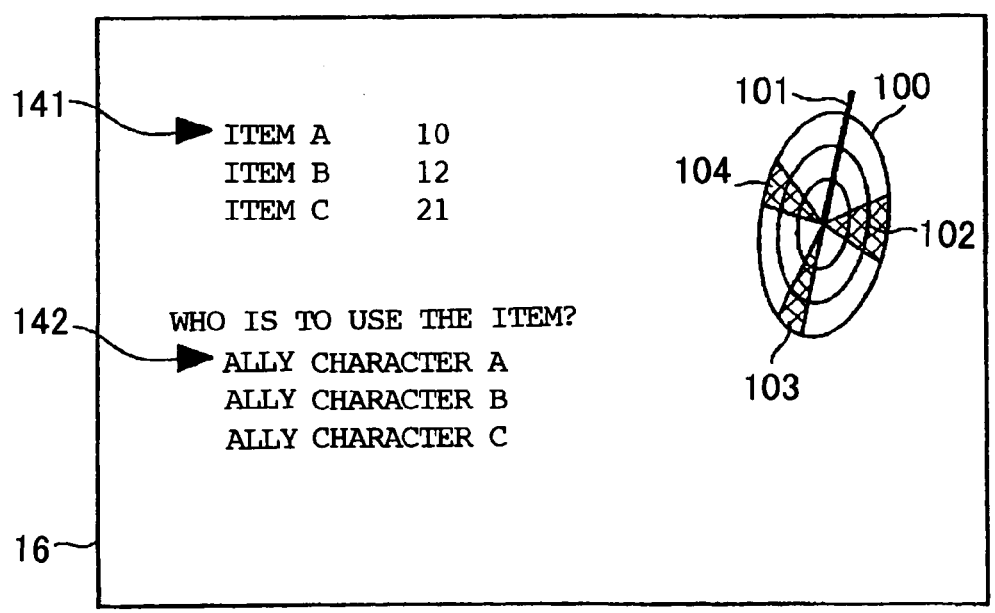
FIG. 46 is a view showing that a character selection item is displayed on the item list screen.

When the item to be used has been selected (when the result of determination in ST113 is YES), character selection items are displayed on the Item List Screen (ST114). FIG. 46 shows that the character selection items are displayed on the Item List Screen. Here, the ally character A, the ally character B, and the ally character C are displayed as the character selection items. The words "Who is to use?" appear over the character selection items, and a selection cursor 142 is displayed at a position on the left side of the character selection items.

Next, a determination is made, on the Item List Screen, as to whether or not the character which is to use the item has been selected (ST115). Specifically, the player moves the selection cursor 142 up or down on the Item List Screen shown in FIG. 46, by means of operating the up button 7 or the down button 8. The character on whose left side the selection cursor 142 is situated is selected as a character to be used, by means of the player operating the O button 12.

Figure 47:
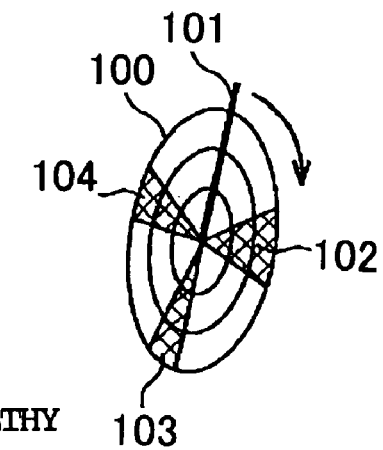
FIG. 47 is a view showing a screen which appears subsequent to the view of FIG. 46.

So long as the character which is to use the item has been selected (when the result of determination in ST115 is YES), the Judgment Ring Determination Processing is performed (ST116). The Judgment Ring Determination Processing involves the same procedures as those described by reference to FIG. 25. Specifically, the judgment ring 100 based on the selected item is displayed, and rotation of the rotary bar 101 is commenced. A display mode achieved at this time is shown in FIG. 47. During the course of rotation of the rotary bar 101, the selected item and explanations thereof appear on the display 16.

The Judgment Ring Judgment Processing is then performed (ST117). The Judgment Ring Judgment Processing involves the same procedures as those described by reference to FIG. 35. Specifically, an assessment is made of the pinpoint stopping of the O button 12 performed by the player. Efficacy of the used item on the character is determined in accordance with the result of determination.

On the basis of the result of determination made through the Judgment Ring Judgment Processing, the parameters of the character selected in ST115 are changed (ST118). For instance, when the selected item is one which recovers the status of the character, such as the HP value or the like, the recovery value is computed during the Judgment Ring Judgment Processing. The thus-computed value is added to the HP value or the like of the character.

There will now be described Selling/Buying Command Processing which is performed by selection of a buying/selling command when a Shop Screen representing a shop where items can be bought/sold appears. During the Buying/Selling Command Processing, an item in that shop can be purchased, and any of the items the party of ally characters have on hand can be sold.

Figure 48:
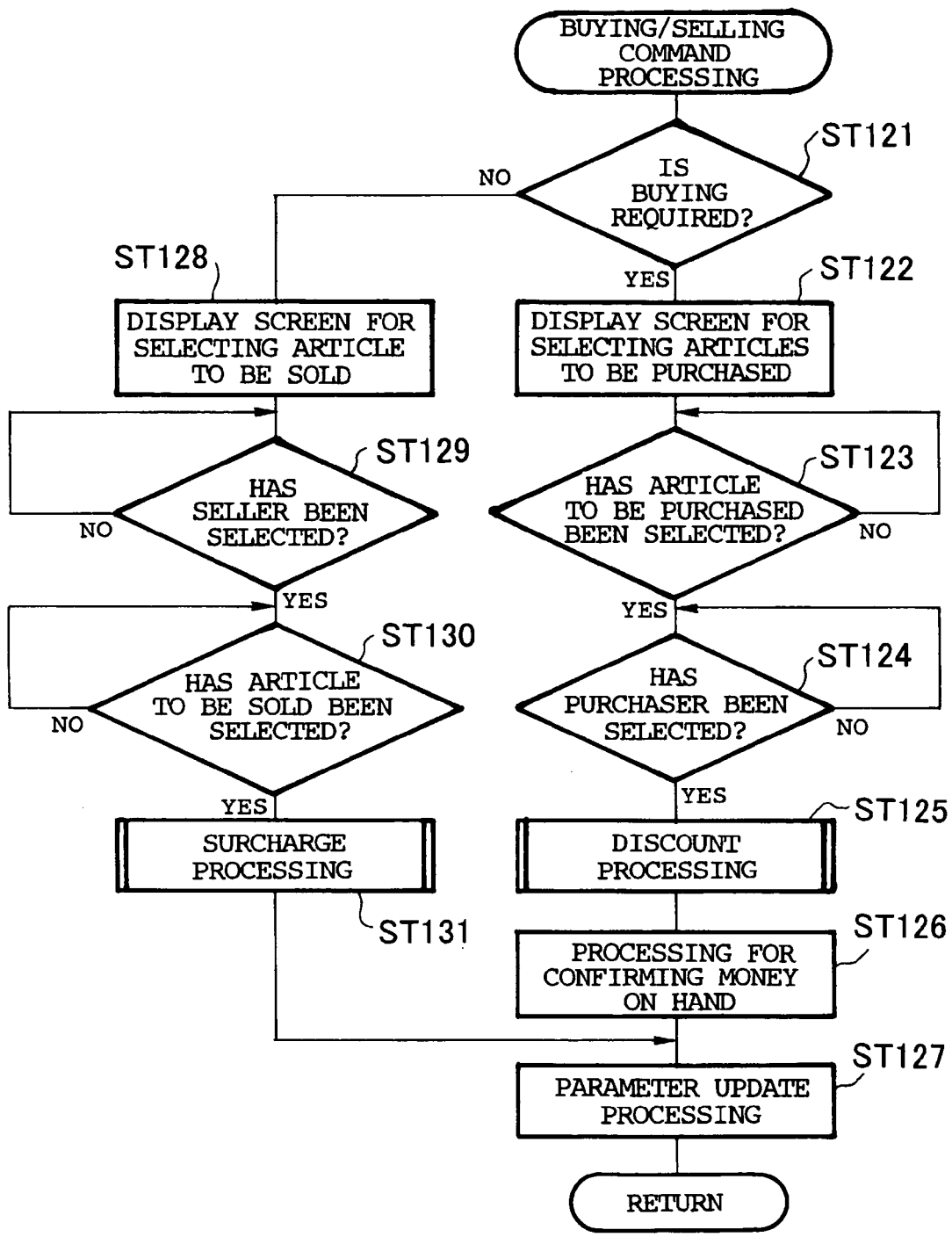
FIG. 48 is a flowchart showing procedures of buying/selling command processing.

FIG. 48 shows procedures of the Buying/Selling Processing. First, a determination is made as to whether or not Buy has been selected on the shop screen (ST121); specifically, a determination is made as to whether or not Buy has been selected from among the selection items displayed on the Shop Screen.

Figure 49:
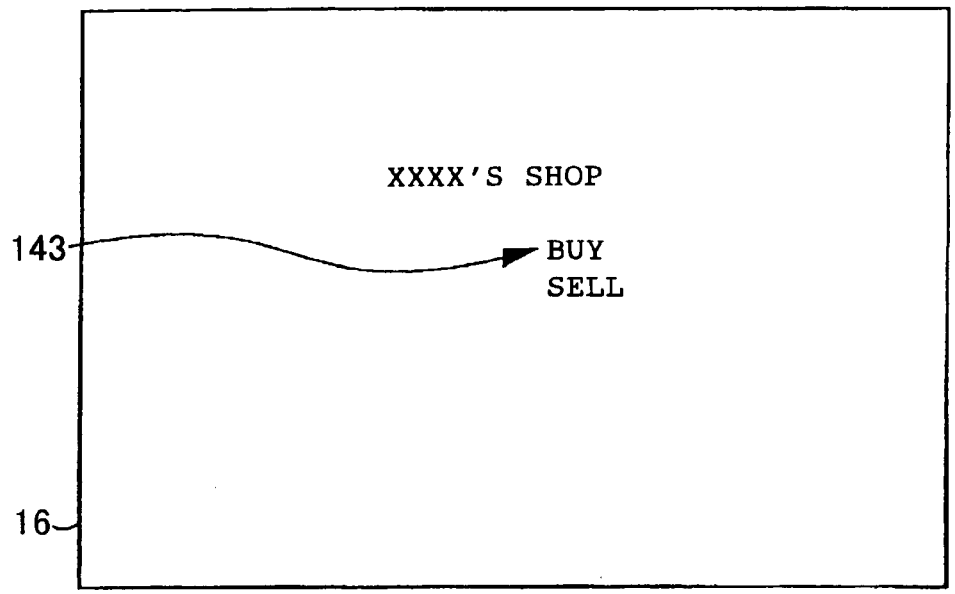
FIG. 49 is a view showing a shop screen.

As shown in FIG. 49, first, two selection items Buy and Sell are displayed on the Shop Screen. A selection cursor 143 is displayed at a position on the left side of these selection items. The selection cursor 143 is moved up or down by means of the player operating the up button 7 or the down button 8, thereby selecting any one from the selection items by means of operation of the O button 12.

When Buy is selected (when the result of determination in ST121 is YES), a Screen for Selecting Articles to be Purchased (ST122) is displayed. A determination is then made, on the Screen for Selecting Articles to be Purchased, as to whether or not articles to be purchased and the number thereof have been selected (ST123). When the result of determination is YES, another determination is made as to whether or not a purchaser has been specified on the Screen for Selecting Articles to be Purchased (ST124). There is performed Discount Processing for determining a discount rate for the amount of money incurred in purchasing the article through use of the judgment ring 100 (ST125).

Figure 50:
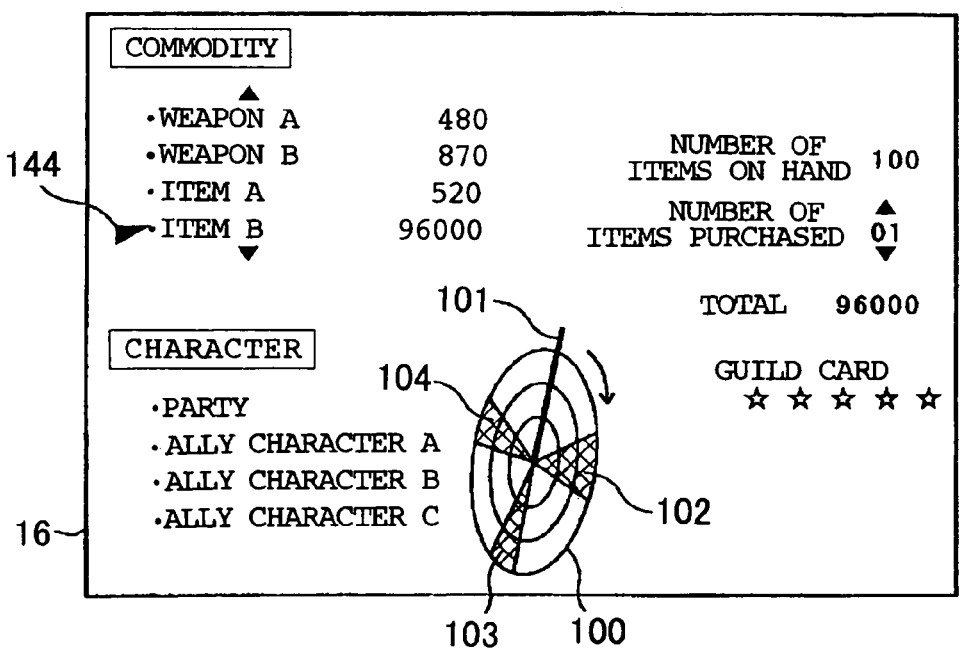
FIG. 50 is a view showing an article-to-be-purchased selection screen.

FIG. 50 shows an example Screen for Selecting Articles to be Purchased. A list of commodities handled by the shop and their prices are displayed in a left-side portion of the Screen for Selecting Articles to be Purchased, and a selection cursor 144 is disposed at a position on the left side of the list. The selection cursor 144 is moved up or down by means of the player operating the up button 7 or the down button 8, thereby selecting the item on whose left side the selection cursor 144 is situated when the O button 12 is operated.

Displayed in a right portion of the screen are the Number of Items on Hand showing the numbers of items that the entire party has on hand or those that individual ally characters have on hand; the Number of Items to be Purchased showing the number of articles selected to be purchased; a total amount of money required to purchase the selected commodities; and the number of guild cards required for obtaining a discount. The number of guild cards on hand is depicted by an asterisk. In relation to specification of the Number of Articles to be Purchased, the selection cursor 144 is moved to the left side of a position where the Number of Articles to be Purchased is to be displayed after selection of the articles to be purchased, thereby rendering the specification effective. The number of articles to be purchased can be incremented or decremented by operating the up button 7 or the down button 8, to thus specify the number.

Purchaser selection items to be used for selecting a purchaser are displayed below the list of commodities. After the number of articles to be purchased has been selected, the selection cursor 144 is moved to the left side of the purchaser selection items, thereby rendering specification of a purchaser effective. The selection cursor 144 is moved up or down by means of the player operating the up button 7 or the down button 8, thereby enabling specification of a purchaser. Purchasing of the commodities can be performed on a per-party basis or a per-ally-character basis. The party, the ally character A, the ally character B, and the ally character C are displayed as the purchaser selection items.

The judgment ring 100 is also displayed on the Screen for Selecting Articles to be Purchased. This screen is used for the Discount Processing, and a discount rate of the article to be purchased is determined on the basis of result of pinpoint stopping of the rotary bar 101 performed by the player. In the judgment ring 100 displayed on the Screen for Selecting Articles to be Purchased, the ranges of the timing areas are changed in accordance with the article to be purchased. Even in the case of identical commodities, the ranges of the timing areas are changed in accordance with the characteristics of the character such that the ranges of the timing areas in connection with the character who is skilled in physical attack are made broader than those in connection with the other characters when the Fight command has been selected for the character. The ranges of the timing areas are also changed depending on the number of guild cards to be used, as will be described later.

Figure 51:
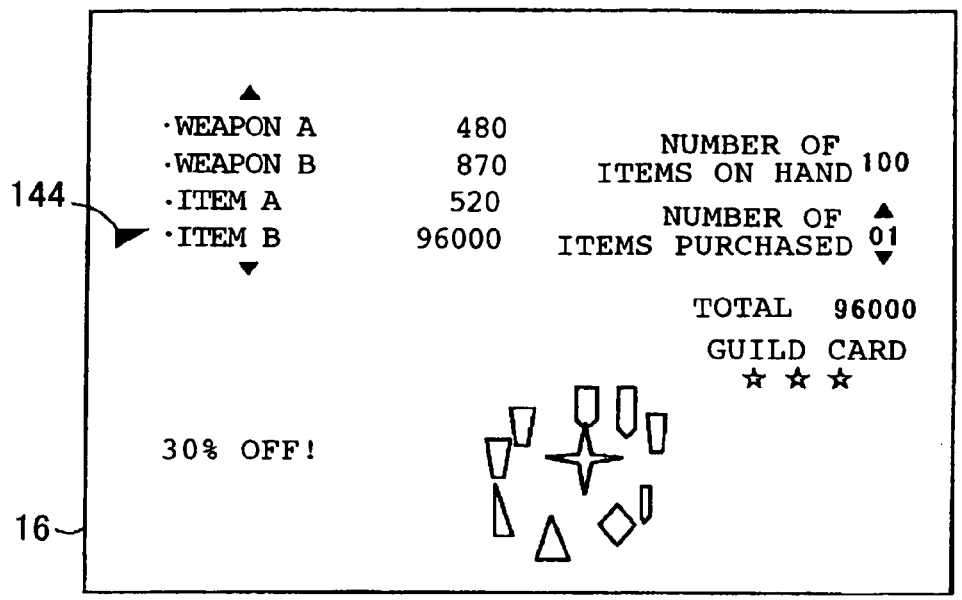
FIG. 51 is a view showing another display of the article-to-be-purchased selection screen.

When the pinpoint stopping of the judgment ring 100 has been performed well on the Screen for Selecting Articles to be Purchased, the judgment ring 100 becomes shattered simultaneous with stoppage of rotation of the rotary bar 101, as shown in FIG. 51, and blast of the fragments is displayed. The words "30% OFF!" then appear. Specifically, when the pinpoint stopping of the rotary bar 101 has been performed well, a preset discount rate is applied, whereby a predetermined amount is discounted from the total amount of money for purchasing the articles. Thus, the articles can be purchased with an amount of money smaller than an ordinary amount.

So long as the total amount of money required to purchase the articles has been determined again through the procedures of the Selling/Buying Processing shown in FIG. 48 and the Discount processing has been completed, there is performed Money Held on Hand Processing for ascertaining whether or not the article can be purchased with the money that the party has on hand (ST126).

When the money held on hand has been ascertained to be sufficient for purchasing the article in ST126, Parameter Change Processing for registering the purchased article as an item held by the party or the individual ally character is performed (ST127).

When the result of determination in ST121 is NO; that is, when Sell is selected, a Screen for Selecting Items to be Sold is displayed (ST128). Next, a determination is made, on this Screen for Selecting Items to be Sold, as to whether or not a seller has been specified (ST129). When the result of determination is YES, a determination is made, on the Screen for Selecting Items to be Sold, as to whether or not the articles to be sold and the numbers thereof have been selected (ST130). There is performed Surcharge Processing for determining a surcharge rate of prices for purchasing the articles to be sold, through use of the judgment ring 100 (ST131).

When the surcharge rate has been determined in ST131 and a final amount of money for purchasing has been determined, there is performed Parameter Update Processing for adding the amount of money to the money held by the party or the individual ally character (ST127).

Figure 52:
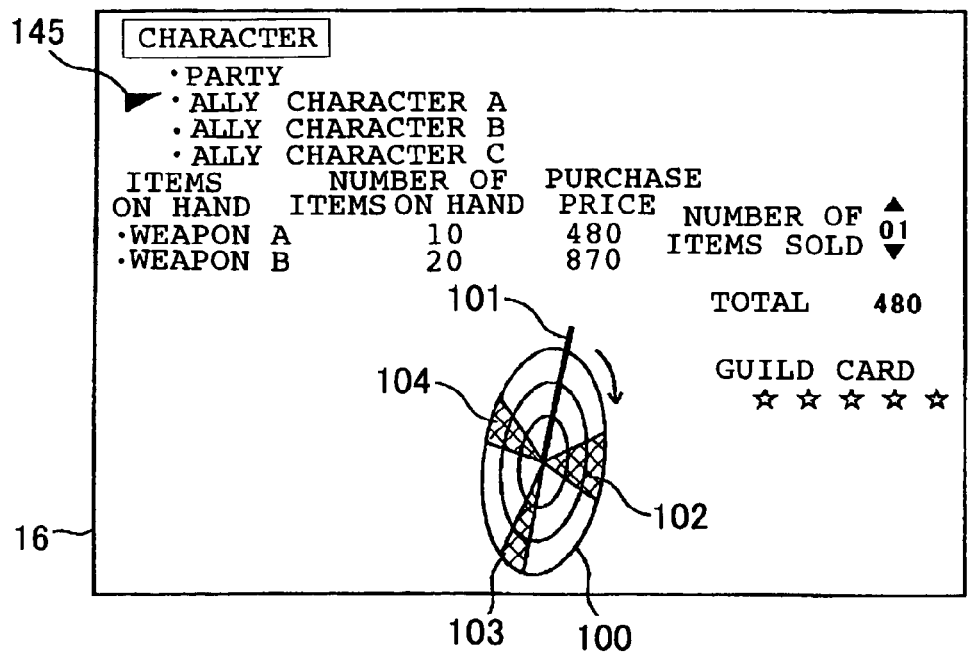
FIG. 52 is a view showing an article-to-be-sold selection screen.

FIG. 52 shows an example Screen for Selecting Items to be Sold. The party, the ally character A, the ally character B, and the ally character C are displayed as seller selection items at upper positions on this Screen for Selecting Items to be Sold. A selection cursor 145 is displayed on the left side of the seller selection items. A list of items held on hand by the seller on whose left side the selection cursor 145 is situated is displayed below the seller selection items. The names of the items, the numbers of the items on hand, and prices at which the shop will purchase the items are displayed in the list of the items on hand. The selection cursor 145 is moved up or down by means of the player operating the up button 7 or the down button 8.

When the seller is specified by means of the player having operated the O button 12, the selection cursor 145 is moved to the left side of the list of items held on hand. An article to be sold is selected by means of the player moving the selection cursor 145 and then operating the O button 12. Specification of the number of articles to be sold becomes effective as a result of the selection cursor 145 moving to the left of a display of the Number of Articles to be Sold after selection of the article to be sold. The number of articles to be sold can be incremented or decremented through operation of the up button 7 or the down button 8.

Selling or buying of the items held on hand can also be performed on a per-party basis or a per-ally-character basis.

The party, the ally character A, the ally character B, and the ally character C are displayed in the seller selection items.

The judgment ring 100 is also displayed on the Screen for Selecting Articles to be Sold, as well. This screen is used for Surcharge Processing. On the basis of the result of the pinpoint stopping of the rotary bar 101 performed by the player, the surcharge rate of the price for buying the articles to be sold is determined. In the judgment ring 100 displayed on the Screen for Selecting Articles to be Sold, the ranges of the timing areas are changed in accordance with the article to be sold. Even in the case of identical commodities, the ranges of the timing areas are changed depending on the seller. The ranges of the timing areas are also changed depending on the number of guild cards to be used, as will be described later.

When the pinpoint stopping of the judgment ring 100 has been performed well on the Screen for Selecting Articles to be Sold, the judgment ring 100 becomes shattered simultaneous with stoppage of rotation of the rotary bar 101, in the same manner as shown in FIG. 51, and blast of the fragments is displayed. The words "30% UP!" then appear. Specifically, when the pinpoint stopping of the rotary bar 101 has been performed well, a preset surcharge rate is applied, whereby a predetermined amount of money is levied on the price for purchasing the articles. Thus, the articles can be sold for an amount higher than an ordinary amount.

As mentioned above, a bargain of commodities which reflect the player's skill can be performed on the Screen for Selecting Articles to be Purchased and the Screen for Selecting Articles to be Sold, by means of pinpoint stopping of the judgment ring 100.

Figure 53:
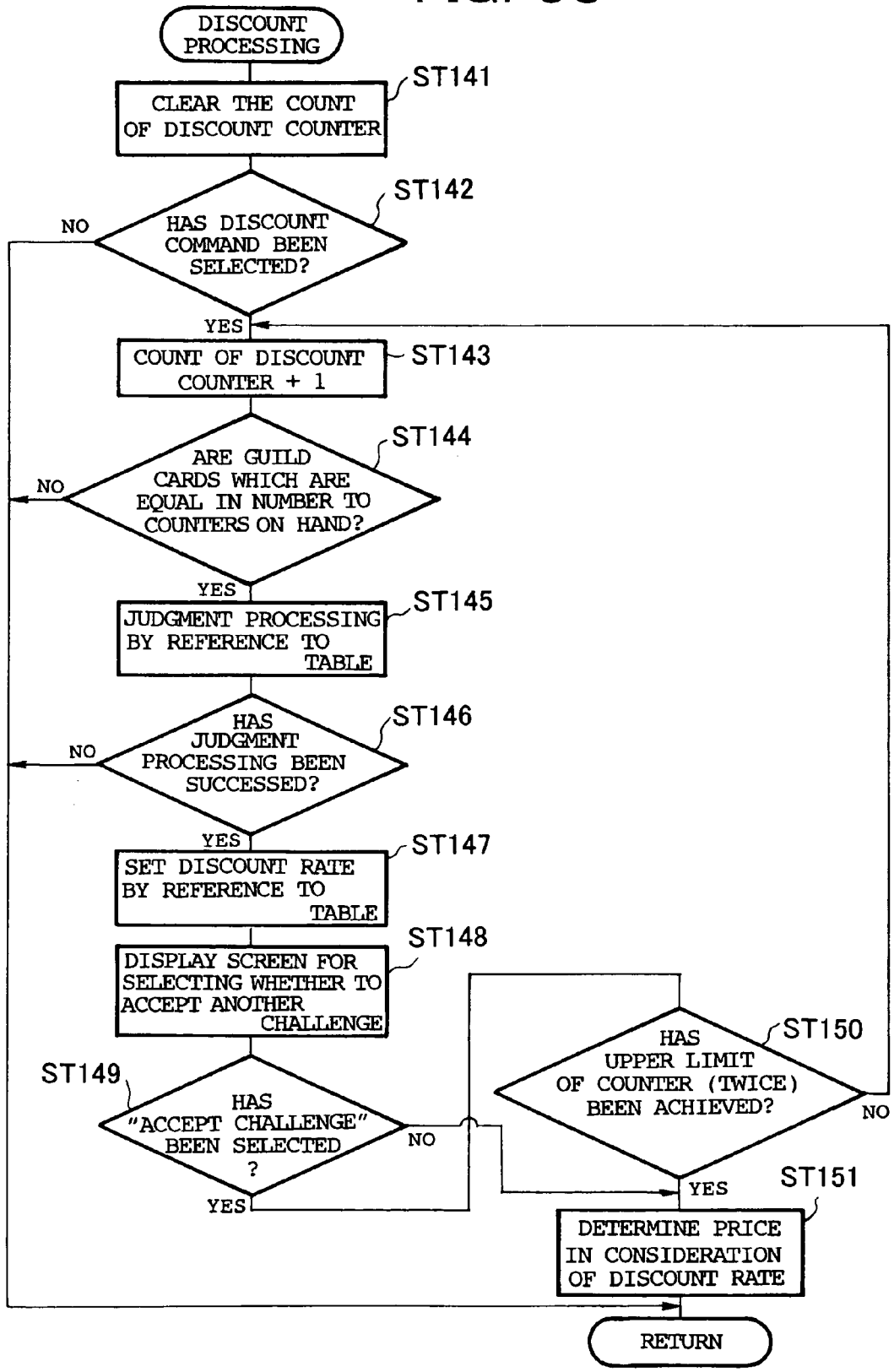
FIG. 53 is a flowchart showing procedures of discount processing.

FIG. 53 shows procedures of the Discount Processing. First, a Discount Count is reset to 0 (ST141). A determination is then made as to whether or not a Discount command has been selected (ST142). When the result of determination is NO, the Discount Processing is completed, whereby a bargain on an ordinary price is offered. When the result of determination is YES, the Discount Counter is incremented by one (ST143).

A determination is made as to whether or not the selected purchaser has guild cards corresponding to the count of the Discount Counter (ST144). The number of guild cards on hand is represented with an asterisk on the Screen for Selecting Articles to be Purchased. When the result of determination in ST144 is NO, the Discount Processing is terminated, and a bargain on an ordinary price is offered. When the result of determination is YES, a Trading Table is extracted from the DVD-ROM 31, and the thus-extracted trading table is set in the predetermined area of the RAM 23. Judgment Processing is performed on the basis of the trading table (ST145). Here, Bargain 1 is formed from a table referred to when the purchaser is an individual character (an example table is shown in FIG. 54) and another table referred to when the purchaser is a party (an example table is shown in FIG. 55). The ranges of the timing areas of the judgment ring 100 corresponding to the articles to be purchased are set in these tables. A discount rate, which is applied when the pinpoint stopping action has been performed successfully, is also set in the tables.

During the judgment processing performed in ST145, the judgment ring 100 whose timing areas have been set on the basis of the trading table is displayed on the screen for selecting an articles to be purchased, and the rotary bar 101 is rotated, thereby making a determination on the pinpoint stopping action performed by the player. Details of the processing are identical with those of processing pertaining to ST74.

Through the judgment processing, a determination is made as to whether or not the pinpoint stopping action has successfully been performed by the player (ST146). When the result of determination in ST146 is NO, the discount processing is terminated, and a bargain on an ordinary price is offered. When the result of determination is YES, a discount rate is set by reference to the set Trading Table (ST147).

Words asking the player whether to still continue a discount bargain; that is, whether to attempt pinpoint stopping of the judgment ring 100, are displayed on the screen for selecting articles to be purchased. Two selection items; that is, Try and Quit, are displayed (ST148). When Quit is selected (when NO is selected in ST149), processing proceeds to ST151, where a price—for which the discount rate set in ST147 is taken into consideration—is determined. When Try has been selected in ST149 (when YES is selected in ST149), a determination is made as to whether or not the count of the discount counter has reached the upper limit value of 2. When YES is selected, processing proceeds to ST151, where a price is determined. When NO is selected, processing returns to ST143, where processing pertaining to ST143 and subsequent processing are repeated.

FIG. 54 shows a trading table to which reference is made when a purchaser buys on a character basis. As shown in FIG. 54, the ranges of the timing areas are set in accordance with the types of the articles to be purchased. Here, an item that is well suited to the character is set. For instance, in the case of the ally character A, the weapon A is well suited to the character. In the case of the ally character B, the weapon B is well suited to the character. Thus, when the article to be purchased is well suited to the purchaser, the ranges of the timing areas are set wide, as shown in FIG. 54. In contrast, when the article to be purchased is not well suited to the purchaser, the ranges of the timing areas are set narrow, as shown in FIG. 54.

When pinpoint stopping of the rotary bar 101 has been successfully performed on the judgment ring 100 displayed on the basis of the trading table shown in FIG. 54, the discount rate of the purchase price is set to 10%.

FIG. 55 shows a trading table to which reference is made when the purchaser buys on a party basis. The ranges of the timing areas are set in accordance with the types of the articles to be purchased in this table, as well. The discount rate set when the pinpoint stopping action has been successfully performed on the judgment ring 100 displayed on the basis of the trading table shown in FIG. 55 is changed depending on the number of guild cards; that is, the number of times the pinpoint stopping action has been attempted. In the embodiment shown in FIG. 55, when the number of guild cards is one; that is, when the player has attempted the pinpoint stopping action only once, the discount rate of the purchase price is 5%. However, when the number of guild cards is two; that is, when the player has attempted the pinpoint stopping action twice, the discount rate of the purchase price is increased to 15%.

Figure 56:
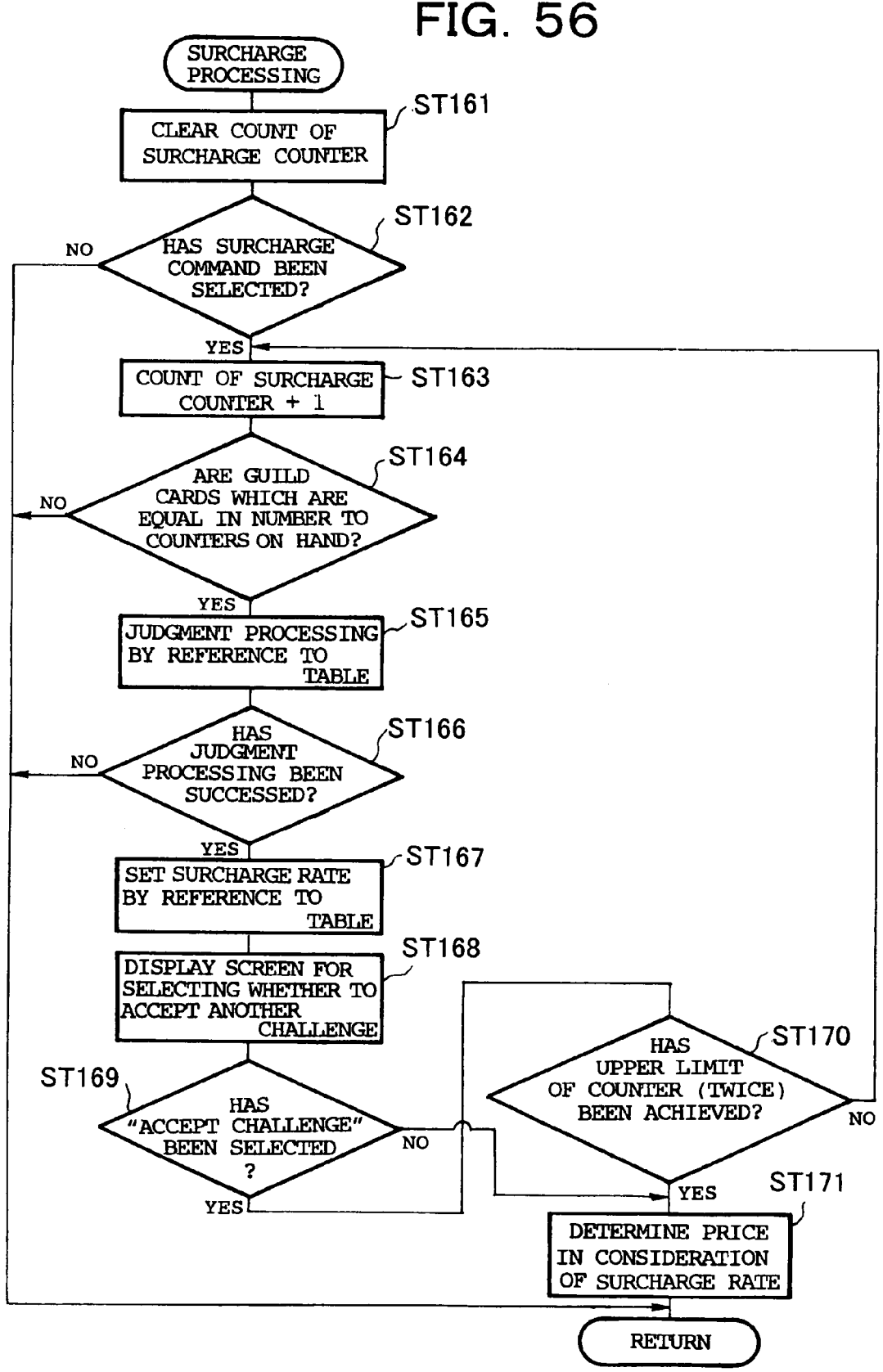
FIG. 56 is a flowchart showing procedures of surcharge processing.

FIG. 56 shows procedures of the Surcharge Processing. First, a Surcharge Count is reset to 0 (ST161). A determination is then made as to whether or not a Surcharge command has been selected (ST162). When the result of determination is NO, the Surcharge Processing is completed, whereby a bargain on an ordinary price is offered. When the result of determination is YES, the Surcharge Counter is incremented by one (ST163).

A determination is made as to whether or not the selected seller has guild cards corresponding to the count of the Surcharge Counter (ST164). The number of guild cards on hand is represented with an asterisk on the Screen for Selecting Articles to be Sold. When the result of determination in ST164 is NO, the Surcharge Processing is terminated, and a bargain on an ordinary price is offered. When the result of determination is YES, the Trading Table is extracted from the DVD-ROM 31, and the thus-extracted trading table is set in the predetermined area of the RAM 23. Judgment Processing is performed on the basis of the trading table (ST165). Here, the Trading table is identical with that used in the Discount processing.

During the judgment processing performed in ST165, the judgment ring 100 whose timing areas have been set on the basis of the trading table is displayed on the screen for selecting an articles to be sold, and the rotary bar 101 is rotated, thereby making a determination on the pinpoint stopping action performed by the player. Details of the processing are identical with those of processing pertaining to ST74.

Through the judgment processing, a determination is made as to whether or not the pinpoint stopping action has been successfully performed by the player (ST166). When the result of determination in ST166 is NO, the surcharge processing is terminated, and a bargain on an ordinary prices is offered. When the result of determination is YES, a surcharge rate is set by reference to the set Trading Table (ST167).

Words asking the player whether he desires to continue a surcharge bargain; that is, whether he desires to attempt pinpoint stopping of the judgment ring 100, are displayed on the screen for selecting articles to be sold. Two selection items; that is, Try and Quit, are displayed (ST168). When Quit is selected (when NO is selected in ST169), processing proceeds to ST171, where a price—for which the surcharge rate set in ST167 is taken into consideration—is determined. When Try has been selected in ST169 (when YES is selected in ST169), a determination is made as to whether or not the count of the surcharge counter has reached the upper limit value of 2 (ST170). When YES is selected in ST170, processing proceeds to ST171, where a price is determined. When NO is selected in ST170, processing returns to ST163, where processing pertaining to ST163 and subsequent processing are repeated.

The trading table to which reference is made during the Surcharge Processing differ from those shown in FIGS. 54 and 55, in that the Articles to be Purchased are replaced with the Articles to be Sold and the Discount Rate is replaced with the Surcharge Rate.

There will now be described Ring Customization Processing which is performed when a Ring Customization command is selected on the Menu Screen displayed as a result of the button 14 having been operated on the Sub-Map. During the Ring Customization Processing, any one type of judgment ring can be selected and specified for each ally character from a plurality of types of judgment rings in accordance with an operation input performed by way of the controller 4. The ranges of the timing areas of the specified judgment ring and the efficacy of the timing areas can be changed in accordance with the operation input performed by way of the controller 4. The display mode of a damage attribute of the final attack on the display 16 can be changed on an ally character basis in accordance with the operation input performed by way of the controller 4. Moreover, a special effect can also be imparted to the damage attribute of the final attack on a per-character basis in accordance with the operation input performed by way of the controller 4.

Figure 57:
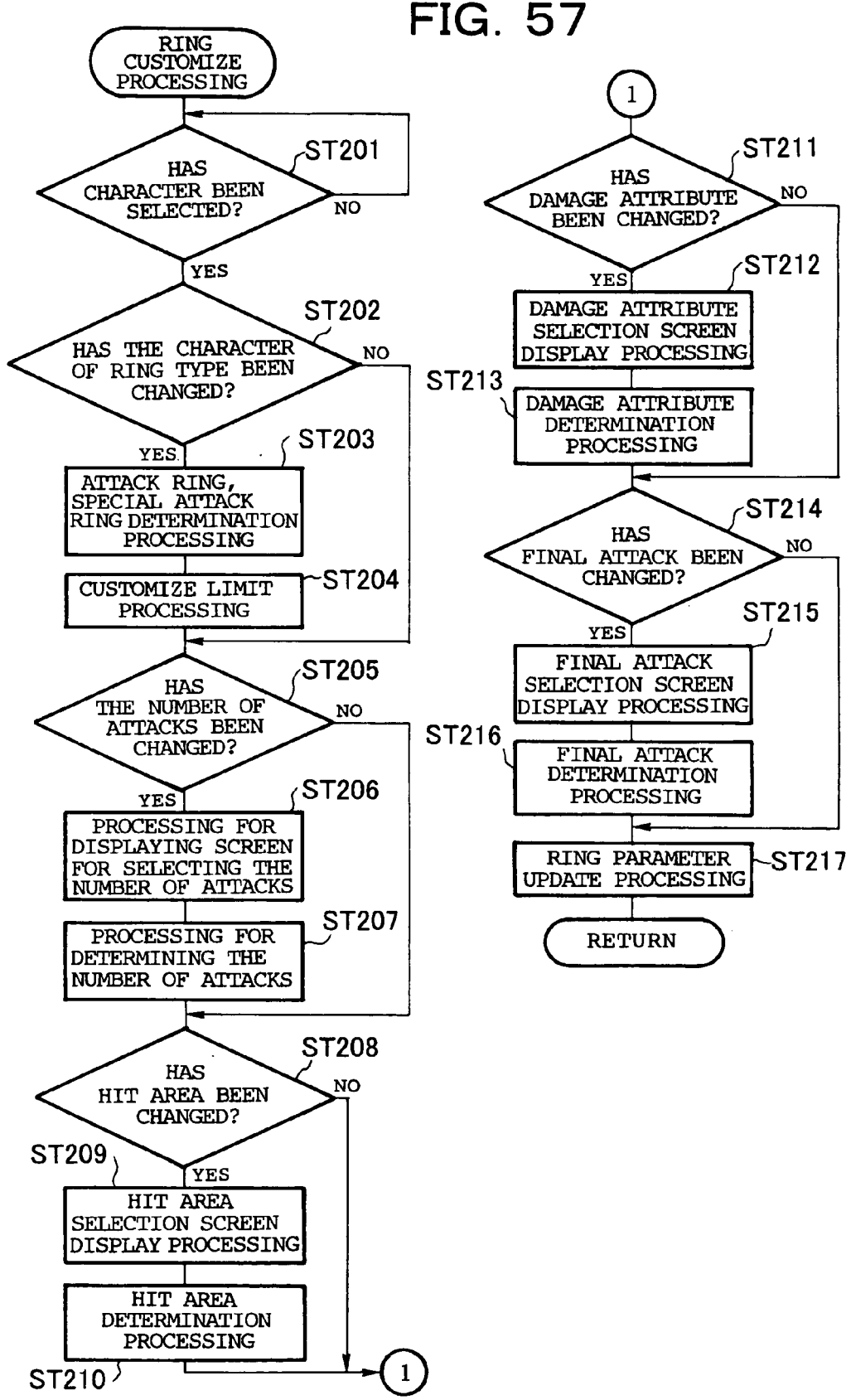
FIG. 57 is a flowchart showing procedures of ring customizing processing.
Figure 58:
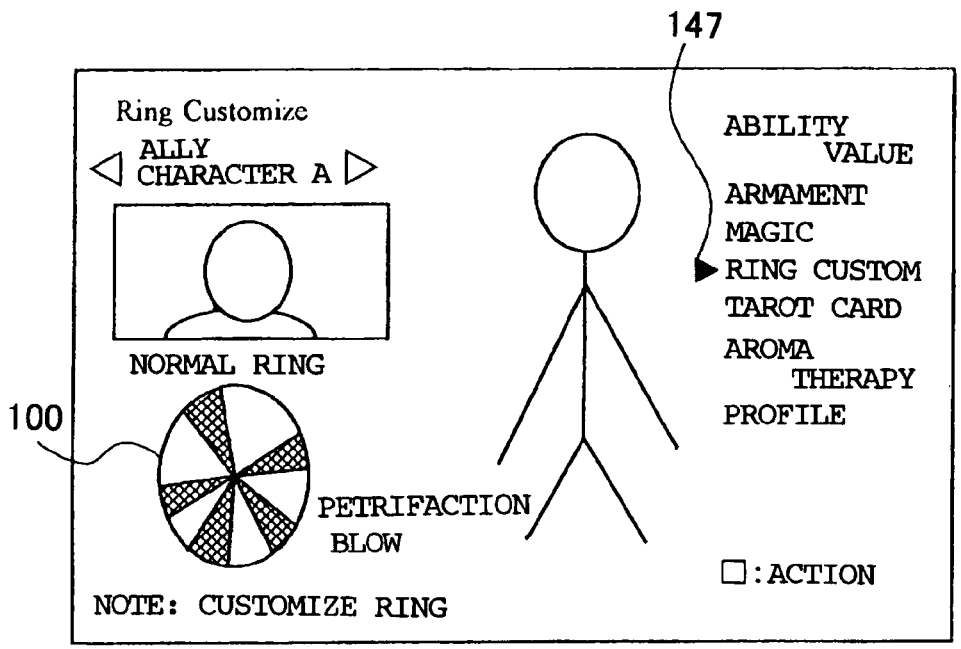
FIG. 58 is a view showing a ring customization screen displayed when the ring is customized.

FIG. 57 shows procedures of the Ring Customization Processing. FIG. 58 shows an example Ring Customization Screen displayed on the display 16. A guide message "Customization of the Ring is performed" appears as a Note at a position which is in the lower left corner of the Ring Customization Screen. Commands; that is, Ability Value, Armament, Magic, Ring Customization, Tarot Card, Aroma Therapy, and Profile, are displayed at upper right positions on the screen. A selection cursor 147 is displayed on the left side of any one of these commands. The selection cursor 147 is situated at the left side of the command desired to be executed, by means of the player operating the up button 7 or the down button 8 of the controller 4. Then, the button O 12 is operated, to thus enable selection of the command desired to be executed. The Ring Customization command is selected on the illustrated screen. When the Ring Customization command has been selected, the Ring Customization Processing shown in FIG. 57 is performed.

During this ring customization processing, a determination is first made as to whether or not a character which is an object of ring customization has been selected (ST201 in FIG. 57). A character which is to be an object of ring customization is displayed at an upper left position on the Ring Customization Screen. The Ally Character A is displayed on the illustrated example screen. The types of characters to be displayed at this location are scrolled by means of operating the left button 9 or the right button 10 of the controller 4. The O button 12 is operated while a character desired to be subjected to ring customization is being displayed, to thus enable specification of an object of ring customization.

Figure 59:
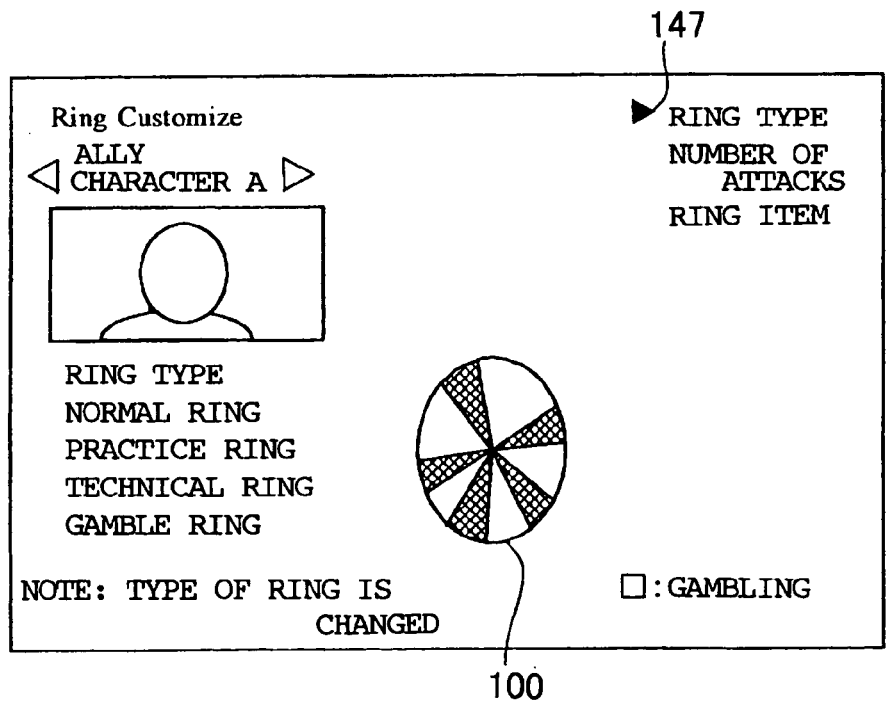
FIG. 59 is a view showing a screen displayed when a ring customization command is selected on the screen shown in FIG. 58.

When the Ring Customization command is selected on the Ring Customization Screen shown in FIG. 58, the Ring Customization Screen displayed on the display 16 turns into a screen shown in FIG. 59. Ring Type, Number of Attacks, and Ring Items are displayed, as objects of ring customization, at upper right positions on the screen. The selection cursor 147 is displayed at the left side of any one of these objects. The selection cursor 147 is moved to the object desired to be subjected to ring customization, by means of operating the up button 7 or the down button 8 of the controller 4. The O button 12 is then operated, thereby specifying an object of ring customization.

A determination is made as to whether or not the object of ring customization is a change in ring type (ST202). The Ring Type is selected as an object of ring customization on the example screen shown in FIG. 59, and a guide message "Ring Type is changed" is displayed in the Note section provided at a lower left position on the screen. Here, the ring type signifies the type of the judgment ring 100. The previously-described judgment ring 100 of normal ring type is set as a default. However, in the present embodiment, three other types are provided; namely, a practice ring, a technical ring, and a gamble ring. Total four ring types; i.e., the normal ring, the practice ring, the technical ring, and the gamble ring, are displayed on a left portion of the screen. Here, the normal ring is highlighted in relation to the other ring types, thereby indicating that the currently-set ring type is the normal ring.

Players intended to use the normal ring include all players. The normal ring is the basic form of the judgment ring 100, and no specific player group is set on this normal ring.

The characteristic of the normal ring lies in that processing is terminated when the judgment ring 100, or the attack ring, displayed on the display 16 as a result of selection of the attack command has failed to be operated well during the course of the game. Specifically, when the player has failed to operate the O button 12 of the controller 4 while the rotary bar 101 is situated in any of a plurality of the timing areas 102, 103, and 104 formed on the judgment ring 100, the judgment ring 100 disappears at that point in time in the manner mentioned previously, thereby terminating the judgment processing. Accordingly, when operation of the O button 12 of the controller 4 has failed while the rotary bar 101 is situated in the first timing area 102, the ally character does not make any attack. When the player has successfully operated the O button 12 of the controller 4 while the rotary bar 101 is situated in any one of the timing areas 102, 103, and 104, the ally character then makes attacks in number equal to the successful operations, as mentioned previously. When a key-based item is used, the rotary bar 101 revolves around the judgment ring 100 in a number of rotations equal in number to the key-based items.

The characteristic of the normal ring also lies in that the judgment ring 100 displayed on the display 16 as a result of selection of a special attack command; i.e., the special attack ring, having achieved success in all the timing areas 102 to 104, the ally character makes a special attack. Specifically, when the player has successfully operated the O button 12 of the controller 4 while the rotary bar 101 is situated in any one of the timing areas 102, 103, and 104, the ally character makes a special attack. In contrast, when the player has failed during the course of the game and operated the O button 12 while the rotary bar 101 is not situated in any of the timing areas 102 to 104, the ally character does not make any special attacks. The efficacy of the special attack is changed in accordance with a result of a game played in a final modulation area 104M.

Figure 60:
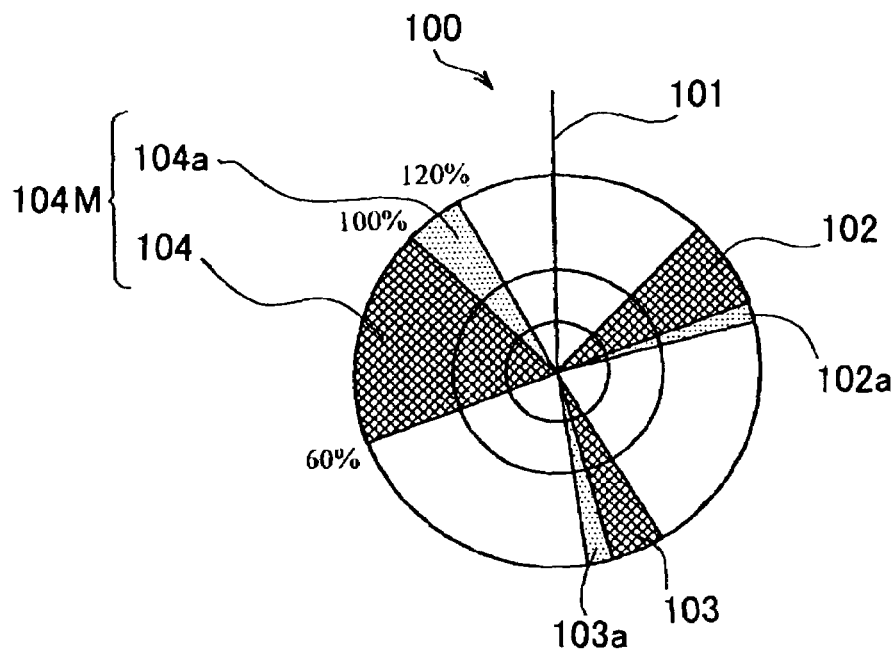
FIG. 60 is a view showing the configuration of a judgment ring appearing at the time of a special attack.

As shown in FIG. 60, the third timing area 104 and the 120% area 104a are set as a modulation area 104M in the judgment ring 100. The starting angle of the timing area 104 is assigned to, e.g., an efficacy of 60%; the end angle of the same is set to an efficacy of 100%; and the end angel of the 120% area 104a is assigned to an efficacy of 120%. Assignment of a percentage to the efficacy is arbitrary and can be changed in accordance with the type of a special attack, as required. The efficacy of the special attack is determined on the basis of a position within the modulation area 104M where the rotary bar 101 is situated when the O button 12 is operated. A percentage of efficacy set at the position—where the rotary bar 101 is situated when the O button 12 is operated—is determined through direct measurement.

Limitations are imposed on customization of the normal ring. An increase in the efficacy of the timing area stemming from customization of the timing area, which will be described later, is limited to a maximum of 200%. When the damage attribute to be described later is set to PYORI, the special effect to be described later cannot be imparted to the final attack.

Of all the four ring types, the practice ring has a setting of the lowest difficulty. Although the efficacy of an attack made by the practice ring is decreased, the O button 12 can be operated with a barrage of operating actions. In order to prevent a highly skilled player from using this ring, strict limitations are imposed on customization. Players who are intended to use this ring are beginner players who handle the judgment ring 100 or players who do not like action.

The characteristic of the practice ring lies in that, even when the attack ring has failed during the course of the game, processing is not terminated. Specifically, even when the player has failed to operate the O button 12 of the controller 4 while the rotary bar 101 is not situated in any of a plurality of the timing areas 102, 103, and 104 formed in the judgment ring 100, the judgment ring 100 does not disappear, and the judgment processing is continued. Specifically, even when the player has failed to operate the O button 12 of the controller 4 while the rotary bar 101 is situated in any of a plurality of the timing areas 102, 103, and 104 formed on the judgment ring 100, the judgment ring 100 does not disappear, and the judgment processing is continued. However, when the player has failed to operate the O button 12 in connection with the judgment rings 100 of the other types, the judgment processing is terminated at that point in time. In this practice ring, even when the player has made an operation failure, the rotary bar 101 continues rotating without modifications, and the judgement processing is not terminated. The ally character then makes attacks in number equal to successful operations finally achieved as a result of the player having operated the O button 12 while the rotary bar 101 is situated in any one of the timing areas 102, 103, and 104. The attack ring of this practice ring does not have any of the 120% areas 102a, 103a, and 104a where the efficacy of the attack is increased to 120%. When the key-based item is used, the rotary bar 101 revolves around the judgment ring 100 in a number of rotations equal in number to the key-based items, as in the case of the normal ring.

In the case of the attack ring of the practice ring, the attack power is corrected every time the O button 12 is operated by means of skipping any of the timing areas 102 to 104; the O button 12 is operated outside the timing areas 102 to 104; or the O button 12 is operated a plurality of times within any of the areas 102 to 104. For example, when the number of operation failures is one, the attack power is corrected to 90% of attack power gained when no correction is made. In the case where the number of operation failures is two, three, four, . . . , attack power is corrected to 81%, 72.9%, 65.61%, . . . of the attack power gained when no correction is made.

The characteristic of the practice ring lies in that, so long as the special attack ring has achieved success in the final modulation area 104M, a special attack is then made. Specifically, even in a case where the player has failed to operate the O button 12 while the rotary bar 101 is not situated in any of the timing areas 102, 103, the special attack can be made, so long as the player can operate the O button 12 while the rotary bar 101 is situated in the final modulation area 104M. The special attack ring of the practice ring does not have any of the 120% areas 102a, 103a, and 104a where the efficacy of the attack is increased to 120%, as well.

In the case of the attack ring of the practice ring, the attack power is corrected every time the O button 12 is operated by means of skipping any of the timing areas 102 to 104; the O button 12 is operated outside the timing areas 102 to 104; or the O button 12 is operated a plurality of times within any of the areas 102 to 104. For example, when the number of operation failures is one, the attack power is corrected to 90% of attack power gained when no correction is made. In the case where the number of operation failures is two, three, four, . . . , attack power is corrected to 81%, 72.9%, 65.61%, . . . of the attack power gained when no correction is made.

Limitations are imposed on customization of the practice ring, as well. The 120% areas 102a, 103a, and 104a where the efficacy of the attack is increased to 120% cannot be added to the respective timing areas 102, 103, and 104. An increase in the efficacy of the timing area stemming from customization of the timing area, which will be described later, is limited to a maximum of 150%.

Of the four ring types, the technical ring has a setting of fairly high difficulty, but no limitations are imposed on customization. Players intended to use this ring are highly-skilled players who are accustomed to handling the judgment ring 100, or those who love customization.

The characteristic of the technical ring lies in that an attack is made only when the attack ring has achieved a success in all stages. Specifically, the ally character makes an attack only after the player has successfully operated the O button 12 of the controller 4 while the rotary bar 101 is situated in all of the timing areas 102, 103, and 104 formed in the judgment ring 100. If the player has failed to operate the O button 12 in any one of the timing areas 102, 103, and 104, no attack is made.

The characteristic of the technical ring lies in that, so long as the special attack ring has achieved success in all the timing areas 102, 103 in a previous stage and success in the final modulation area 104M with an efficacy of 100% or more, a special attack is subsequently made. Namely, a special attack is made, so long as the player has successfully operated the O button 12 while the rotary bar 101 is situated in the respective timing areas 102, 103 in a previous stage and then has successfully operated the O button 12 while the rotary bar 101 is situated in the 120% area 104a of the final modulation area 104M. If the player has failed in the game by operating the O button 12 while the rotary bar 101 is situated outside the timing area or the efficacy has become less than 100% in the modulation area 104M, no special attack is made.

As mentioned previously, no upper limits are imposed on customization of the technical ring. However, as a result of customization of the technical ring, which will be described later, the efficacy of the timing areas and the widths of the timing areas are doubled. For instance, if the efficacy of the areas is set to increase by 5%, the increase corresponding to the settings will be automatically doubled, to yield 10%. In contrast, both ends of the respective areas will be originally narrowed by 2°, but the settings are made such that both ends of the areas are narrowed by a double amount; that is, by 4°.

Of the four ring types, the gamble ring has a setting of the highest difficulty. The gamble ring is much different from the other rings in that the rotational speed of the rotary bar 101 is made slightly faster during Gambling and a win or a loss in the game is determined by only a single operation of the button. The rotational speed of the rotary bar 101 is usually, e.g., 1.8 seconds/rotation. However the rotational speed is increased so that the time per revolution is 90% that achieved under the ordinary speed; that is, the time per revolution is set to 1.62 seconds/rotation. No limitations are imposed on customization of the gamble ring. Switching can be effected on the Ring Customization Screen between a display of the normal ring for "Normal Times" where a gambling characteristic is normal and a display of the gamble ring for "Gambling Times" where the gambling characteristic is high. Players intended to use this ring are gamblers.

The characteristic of the gamble ring lies in that a timing area available for the attack ring in the Gambling Times is reduced in number to only one. When the player has successfully operated the O button 12 by only one operation while the rotary bar 101 is situated in this one timing area, there is made an attack which is the same as that made as a result of the button having been operated three times in the Normal Times in which a plurality of the timing areas 102 to 104 are available. As a matter of course, when the player has failed by operating the O button 12 while the rotary bar 101 is not situated in the one timing area, no attack is made. The position of the timing area available for this attack ring and the width of the timing area are computed on the basis of data pertaining to the timing areas 102 to 104 available for the attack ring in Normal Times. The 120% area where the efficacy of the attack is increased to 120% is also added to the timing area. When the player has successfully operated the O button 12 while the rotary bar 101 is situated in the 120% area, the attack power of all attacks is increased to 120%. The number of rotations of the rotary bar 101 comes to one even in the case where the key-based item is used. However, when the key-based item is used, the difficulty is drastically changed in accordance with the number of revolutions which originally would have been increased.

The characteristic of the gamble ring lies in that a timing area available for the special attack ring in the Gambling Times is reduced in number to only one. When the player has successfully operated the O button 12 by only one operation while the rotary bar 101 is situated in this one timing area, there is made a special attack which is the same as that made in the Normal Times in which a plurality of the timing areas 102 to 104 are available. As a matter of course, when the player has failed by operating the O button 12 while the rotary bar 101 is not situated in the one timing area, no attack is made. The position of the timing area available for this attack ring and the width of the timing area are computed on the basis of data pertaining to the timing areas 102 to 104 available for the attack ring in Normal Times. The modulation area 104M and the 120% area where the efficacy of the attack is increased by 120% are formed in the timing area. When the player has successfully operated the O button 12, efficacy which reflects the efficacy of the area is yielded.

In the present embodiment, the gamble ring is computed on the basis of data pertaining to the timing areas 102 to 104 available for the attack ring and the special attack ring of the normal ring in Normal times. However, the ring type based on this standard is not limited to the normal ring. For instance, the gamble ring may be computed with reference to, e.g., the practice ring or the technical ring.

The positions, widths, and types of the timing areas available for the gamble ring are determined with reference to, e.g., the normal ring, as follows.

The types of all the areas available for the attack ring and the special attack ring in Normal times are first examined. When an area where the efficacy of attack power can be increased is present in the areas, the area is included in the areas available for the gamble ring. The term "area type" used herein includes a modulation area type (corresponding to the modulation area 104M), a strike area type (corresponding to the 120% areas 102a, 103a, and 104a), and a normal area type (corresponding to the timing areas 102, 103, and 104).

Position of the area is now determined. The area position is set to a mean position of all the areas available for the attack ring or the special attack ring in Normal Times. The width of the area is computed from the number of areas and the number of rotations of the rotary bar 101, by means of Equation (1) provided below.

$$\text{Area Width} = A + B \quad (1)$$

Here, A is a total width of all areas; B is a value obtained by adding up all values from 1 to n; and "n"=the number of areas×the number of revolutions of the rotary bar 101. For instance, in the case of n=3, there is derived B=1+2+3=6.

Actual computation pertaining to Equation (1) is performed separately in accordance with the area type. Specifically, the area type is a modulation area type; the modulation area 104M is formed from the timing area 104 and the 120% area 104a, as illustrated in FIG. 60. Therefore, computation of the area width is performed separately; that is, computation of the width of the timing area 104, and computation of the width of the 120% area 104*a*. When the area type is the strike-type area, computation of the area width is performed separately; for example, computation of the width of the timing area 103, and computation of the width of the 120% area 103*a*. The minimum widths of the respective areas are taken as 1°

For instance, under the assumptions that three areas 1, 2, and 3 are available for the gamble ring in Normal Times; that the starting angle of each of the areas is "t"; that the end angle of each of the areas is "e"; and that the width of the strike area from the end angel "e" to the start angle "t" is "w," the following are presumed.

Area 1: t=7°, e=97°, w=15°

Area 2: t=142°, e=210°, and w=12°

Area 3: t=279°, e=325°, and w=10°

Under this assumption, when the number of revolutions is one and the area type is the strike-area type, the position and width of the gamble area are computed as follows:

Center angles c1, c2, and c3 of the areas 1, 2, and 3 are computed as follows:

Area 1: $c1=\{(97-7)\div2\}+7=52°$

Area 2: $c2=\{(210-142)\div2\}+142=176°$

Area 3: $c3=\{(325-279)\div2\}+279=302°$

The center C of the gamble ring comes to a mean value of the thus-computed center angles c1, c2, and c3 and is computed as expressed by the following formula.

$C=(52+176+302)\div3\approx177°$

This center C is the position of the gamble area.
The width of the gamble area is computed as follows:
Widths nw1, nw2, and nw3 of the normal areas of the areas 1, 2, and 3 are computed by the following expressions:

Area 1: $nw1=97-7-15=75°$

Area 2: $nw2=210-142-12=56°$

Area 3: $nw3=325-279-10=36°$

A total A1 of the area widths nw1, nw2, and nw3 is computed as represented by the following expression.

$A1=75+56+36=167°$

The area widths sw1, sw 2, and sw3 of the strike areas of the areas 1, 2, and 3 are 15°, 12°, and 10° from the above assumptions. A total A2 of these widths is computed as represented by the following expression:

$A2=15+12+10=37°$

Since the number of areas is 3 and the number of revolutions is 1, "n" and B are computed as represented by the following expressions.

$n=3\times1=3$ $B=1+2+3=6$

Therefore, the width NW of the normal area and the width SW of the strike area are computed as represented by the following expressions:

$NW=A1\div B=167\div6\approx28°$ $SW=A2\div B=37\div6\approx6°$

As a result, the starting point and end point of the area for the gamble ring to be sought are computed as follows:

Starting point of area=$C-\{(NW+SW)\div2\}=177-\{(28+6)\div2\}=160°$

End point of area=Starting point of area+$(NW+SW)$ $=160+(28+6)=$194°

Specifically, the area range of the gamble ring is 160 to 194°, and the strike area is located at the back end of 6°.

The above example computation is based on the assumption that the number of revolutions is one. However, when a third key item is used, the number of revolutions becomes three. The range and position of the gambling area which are obtained when the number of revolutions is three are determined as follows. Here, as in the above case, the area type is assumed to be the strike area.

The area determined in this case takes the same position of 177° as obtained in a case where the number of revolutions is one. A total value A1 of widths of the normal areas assumes the same value of 167° as in a case where the number of revolutions is one. A total value A2 of the strike area also assumes the same value of 37° as obtained in a case where the number of revolutions is one. Further, the number of areas is three and the number of revolutions is three, and hence "n" assumes 9 as represented by the following equation.

$n=3\times3=9$

Therefore, B—which is a cumulative total of values from 1 to "n"—assumes 45. Therefore, the area width NW of the normal area and the area width SW of the strike area are computed as represented by the following equations.

$NW=A1\div B=167\div45\approx4°$ $SW=A2\div B=37\div45\approx1°$

Therefore, the starting point and the end point of the gambling area to be sought are computed as follows.

Starting point of the area: $C-\{(NW+SW)\div2\}=177-\{(4+1)\div2\}\approx$175°

Ending point of the area: Starting point of the area+ $(NW+SW)=175+(4+1)=180°$

Specifically, the range of the gamble ring is defined as 175° to 180°, and the strike area for the gamble ring is located at the back end of 1°.

Figure 61:
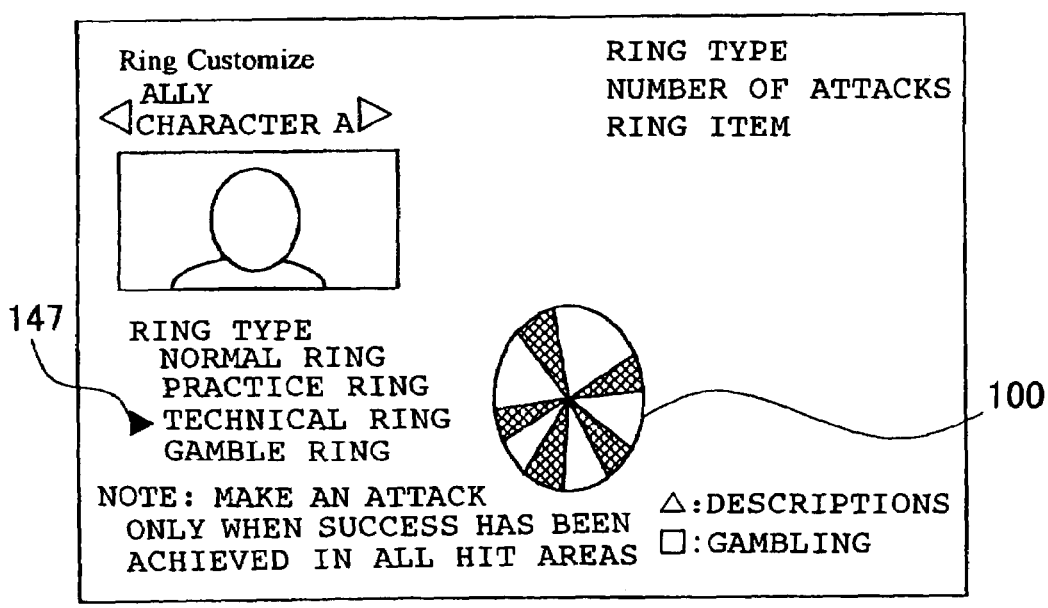
FIG. 61 is a view showing a screen appearing when a ring type has been selected as an object of ring customization processing on the screen shown in FIG. 59.

When the Ring Type on whose left side the selection cursor 147 is situated is selected as an object of customization on the Ring Customization Screen shown in FIG. 59, YES is selected as a result of a determination as to ring customization processing pertaining to ST 202 shown in FIG. 57. When an object other than the Ring Type has been selected, NO is selected as the result of determination, and processing proceeds to ST 205 to be described later. When YES is selected as the result of determination, the Ring Customization Screen displayed on the display 16 shown in FIG. 59 turns into a Ring Type Screen shown in FIG. 61. The selection cursor 147 is displayed on the left side of any one of the four ring types provided on the left part of the screen. On the illustrated screen, the selection cursor 147 is displayed on the left side of the Technical Ring. A guide message "An attack is made only when success is achieved in all hit areas" is provided in the Note section located at a lower left position on the screen. Brief explanations about the Technical Ring pointed out with the selection cursor 147 are provided.

Figure 62:
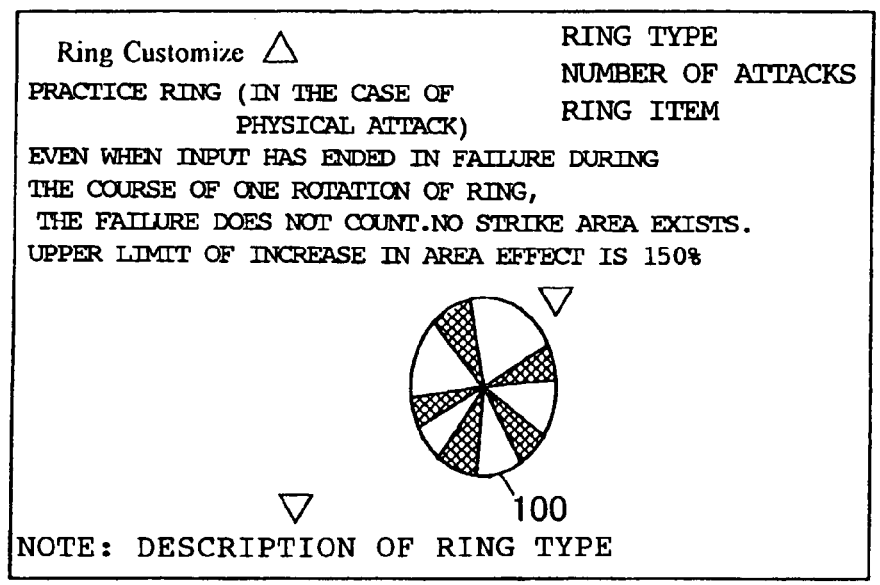
FIG. 62 is a view showing a screen appearing when a technical ring is selected as a ring type on the screen shown in FIG. 61.

When the player has operated the Δ button 11 of the controller 4 while this screen is displayed, the screen appearing on the display 16 turns into an Explanatory Screen of Ring Type shown in FIG. 62. A detailed explanation about the selected ring type is displayed on this screen. The ring type to be displayed can be changed by means of operating the up button 7 or the down button 8 of the controller 4. The selection cursor 147 is moved on the Ring Type Screen shown in FIG. 61, by means of operating the up button 7 or the down button 8 of the controller 4, and the O button 12 is operated while the selection cursor 147 is situated at the left side of the ring type to be selected, thereby determining a ring type to be selected. For instance, as illustrated, the O button 12 is operated with the selection cursor 147 situated at the left side of the Technical Ring, whereby the Technical Ring can be set as the ring type to be selected.

In the above descriptions, the normal ring is set as a default. The normal ring is changed to any of the three types of rings. However, a ring other than the normal ring may be set as the default. In this case, the default is changed to any one of the three ring types other than the default ring type. Alternatively, no ring type is set as a default, and any one ring type may be specified from the four ring types by means of customization.

When the ring type to be changed is determined, attack ring/special attack ring determination processing is performed (ST 203). Through the processing, various parameters, such as a customized attack ring and a customized special attack ring, are determined in accordance with an operation input performed by the player through use of the controller 4. In this case, customization limitation processing is performed (ST 204). Specifically, a minimum interval between adjacent hit areas is set to 5°, and ring customization for further reducing the interval cannot be performed. Customization limitation processing set for the respective ring types changed in ST202 is also performed. Further, a ring angle range from 0° to 5° and another ring angle range from 355° to 360° are prohibited. Customization which causes the hit area to enter these angle ranges cannot be performed.

Customization of the special attack ring enables customization of only the width of the hit area. Customization of the special effect ring can be performed not for a per-individual attack technique but for an attack on a large unit such as a special attack.

Customization of the attack ring and customization of the special attack ring are performed through use of the customization item. Customization is realized by incorporating the efficacy of the customization item into the selected basic form. When customization is reset, all the customization items used in customizing the attack ring and the special attack ring are returned; namely, the customization items do not disappear.

Figure 63:
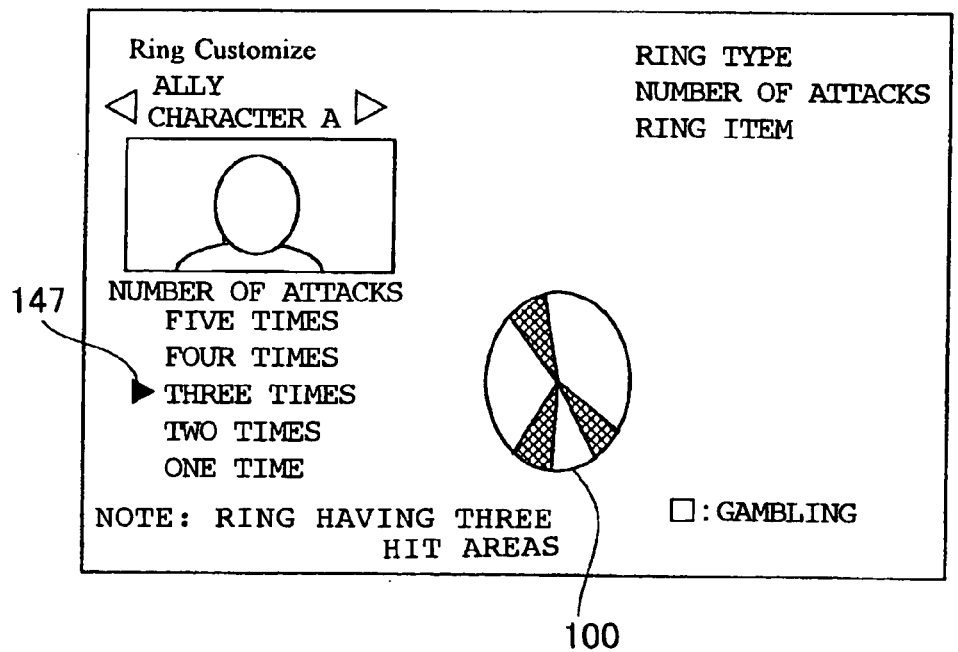
FIG. 63 is a view showing a screen appearing when the number of attacks is selected as an object of ring customization processing on the screen shown in FIG. 59.

Number of Attacks is selected as an object of customization on the Ring Customization Screen shown in FIG. 59, and a determination is made as to whether or not a request has been issued for changing the number of attacks (ST 205). When the O button 12 is operated with the selection cursor 147 being situated on the left side of the Number of Attacks, YES is selected for the determination result, and number-of-attacks selection screen display processing (ST 206) is performed, and the screen turns into a number-of-attacks screen shown in FIG. 63. When the request for a change in customization is not the Number of Attacks, NO is selected as the determination result, and processing proceeds to ST208 to be described later.

The number of attacks which can be made by the character selected at that time is displayed on the left part of the Number-of-Attacks Screen, and the selection cursor 147 is displayed at the left side of any one of the attack numbers. The numbers of attacks which the ally character A can make; that is, Five times, Four times, Three times, Two times, and One time, are displayed on the illustrated example screen, and the selection cursor 147 is situated at the left side of a display of Three times. When the O button 12 is operated in this state, number-of-attacks determination processing (ST 207) is performed, whereby Three times is selected as the number of attacks to be made by the ally character. At this time, three hit areas are set in the judgment ring 100 displayed on the screen of the display 16, as illustrated.

Five-stage default data are prepared as the number of attacks for each character. For instance, data pertaining to a maximum of five attacks are prepared for the ally character A. Data pertaining to a maximum of four attacks are prepared for the ally character B, and data pertaining to a maximum of three attacks are prepared for the ally character C. At the time of customization, an arbitrary number of times is selected from the thus-prepared maximum numbers. However, on the first occasion for selecting the number of attacks, the number of attacks to be performed by the ally character A can be selected from one time to three times; the number of attacks to be performed by the ally character B can be selected from one time to two times; and the number of attacks to be performed by the ally character C can be selected from only one time. The number of attacks can be increased by means of finding 16 items called Soul of the Rings scattered over the world. The greater the number of attacks, the heavier the damage that can be inflicted on the enemy. However, the width of the hit area becomes narrower, thus increasing difficulty.

Figure 64:
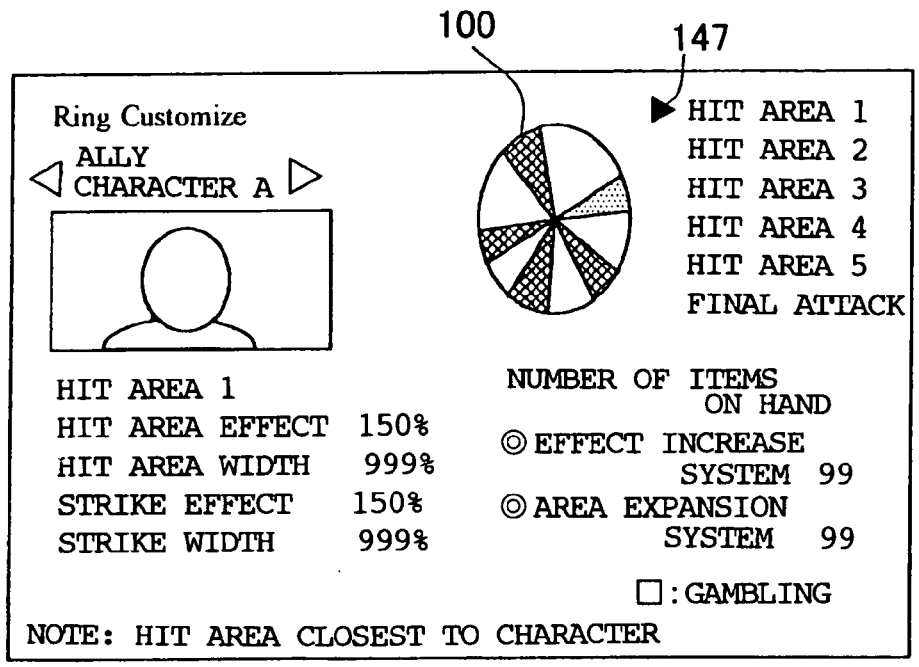
FIG. 64 is a view showing a screen appearing when a ring item is selected as an object of ring customization processing on the screen shown in FIG. 59.

When the Ring Item is selected as an object of customization on the Ring Customization Screen shown in FIG. 59, the screen turns into a Ring Item Screen shown in FIG. 64. Items, such as Hit Area 1, Hit Area 2, Hit Area 3, Hit Area 4, Hit Area 5, and Final Attack, are displayed at an upper right position on the screen, and the selection cursor 147 is displayed on the left side of any one of these items. The selection cursor 147 is situated on the left side of the Hit Area 1 on the illustrated example screen. Items which enable customization of the Hit Area 1; that is, Efficacy of Hit Area; Hit Area Width; Efficacy of Strike; and Strike Width, are displayed on the left part of the screen. The number of items held by the character selected at that time is displayed in the center of the screen while being categorized into an Efficacy Increase Item and an Area Extension Item.

Figure 65:
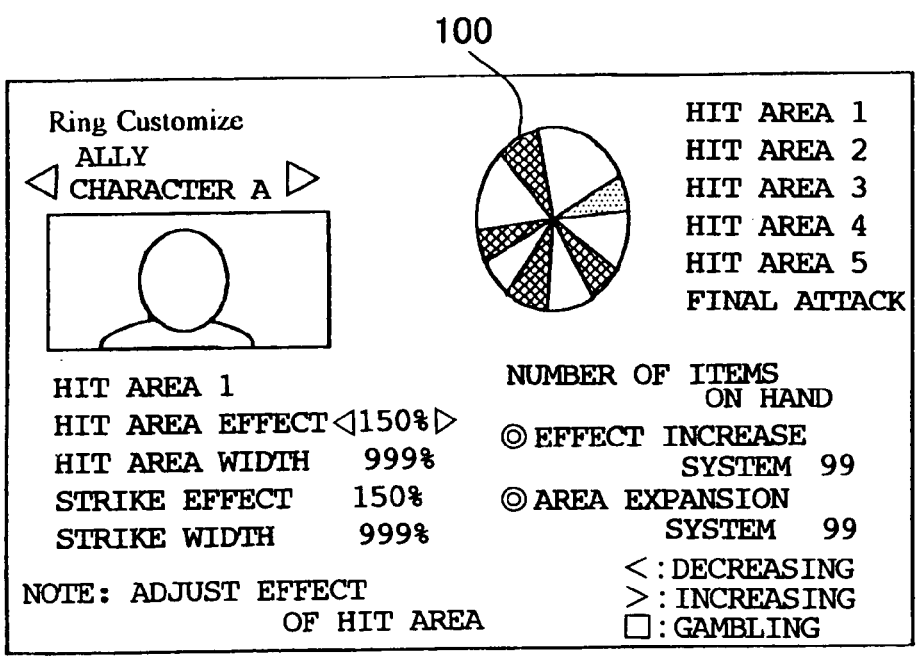
FIG. 65 is a view showing a screen appearing when a hit area 1 is selected on the screen shown in FIG. 64.

A determination is made, on this screen, as to whether or not a request has been issued for changing a hit area (ST208). When the O button 12 is operated with the selection cursor 147 being situated at the left side of any one of the Hit Area 1 to the Hit Area 5, YES is selected as the determination result, and Hit Area Selection Screen Display Processing (ST 209) is performed. The screen turns into the Hit Area Screen shown in FIG. 65. When the request for changing customization is not the request for changing a hit area, NO is selected as the determination result, and processing proceeds to ST211 to be described later.

Settings of the respective customizable items can be changed on the Hit Area Screen. For instance, in the illustrated example screen—on which the screen for changing the Hit Area 1 is displayed and the selection cursor 147 is situated at the left side of Efficacy of Hit Area—the percentage of efficacy of the hit area can be reduced by operation of the left button 9. The percentage of efficacy of the hit area can be increased by operation of the right button 10. The efficacy of the hit area can be increased by 5% as compared with the default value. However, when the efficacy of the area is increased by 5%, the width of that area is reduced at both ends thereof by 2°.

The efficacy of the strike area can be increased or decreased in the same manner by placing the selection cursor 147 on the left side of Efficacy of Strike. The efficacy of the strike area can be increased to a maximum of 2% as compared with the default value. However, when the efficacy of the strike area has been increased by 2%, the width of the strike area is reduced at both ends thereof by 2°. The width of the hit area can be increased or decreased by placing the selection cursor 147 on the left side of Hit Area Width by means of operation of the left button 9 or the right button 10. The width of the hit area can be increased at both ends thereof to a maximum of 2°. The width of the strike area can be increased or decreased by placing the selection cursor 147 on the left side of the Strike Width by means of operation of the left button 9 or the right button 10. The width of the strike area can be increased at both ends thereof to a maximum of 2°.

When the O button 12 is operated while a desired hit area change value is displayed, hit area determination processing (ST 210) is performed, and values displayed at that time are determined as parameters of the hit area.

A determination is made as to whether or not a request has been issued for changing the damage attribute of the final attack on the Ring Item screen shown in FIG. 64 (ST 211). When the O button 12 is operated with the selection cursor 147 situated on the left side of the Final Attack, YES is selected as the determination result. Damage attribute selection screen display processing (ST 212) is performed, and the screen turns into a Damage Attribute Screen shown in FIG. 66. When the request for changing customization is not the request for changing the damage attribute, NO is selected as the determination result, and processing proceeds to ST 214 to be described later.

Here, the damage attribute of the final attack signifies a final posture which the enemy character assumes when being defeated by the final attack of the ally character. A default damage attribute is set to Bend Backward, as displayed on the left part of the screen. Damage attributes to which the current damage attribute can be changed; that is, "Blown Away," "Levitation," "Knock Out," and "Pyori," are displayed in the center of the screen. The selection cursor 147 is displayed on the left side of any one of the damage attributes. "Blown Away" is a final posture wherein the enemy character is linearly blown away over a given distance at high speed. "Levitation" is a final posture wherein the enemy character is levitated in a parabolic pattern; "Knock Down" is a final posture wherein the enemy character is linearly knocked down on the ground and becomes floored upon contact with the ground; and "Pyori" is a final posture wherein the enemy character's movement becomes frozen at that point.

Figure 66:
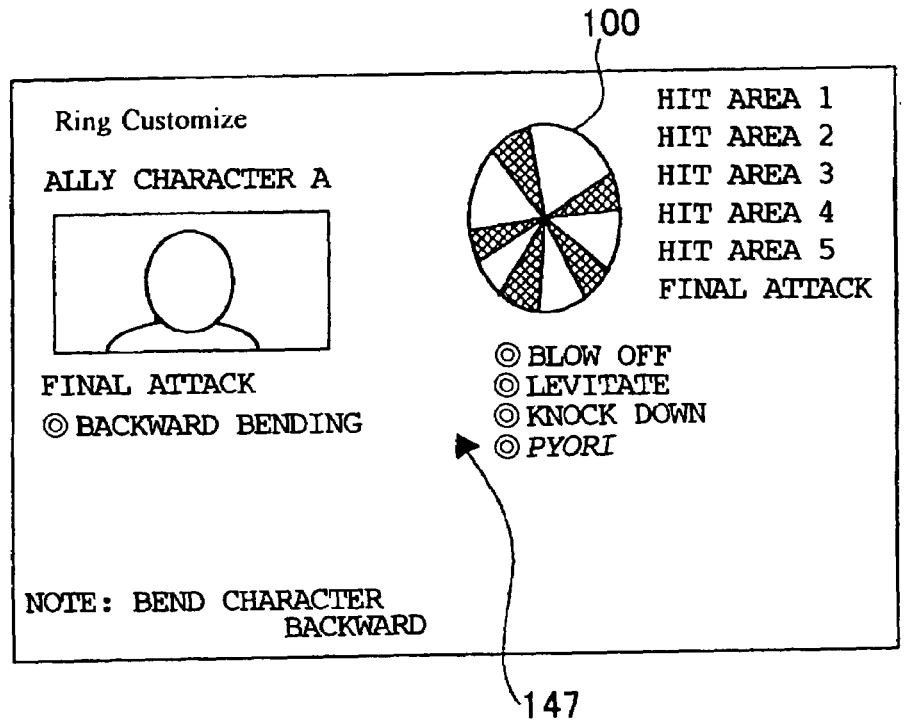
FIG. 66 is a view showing a screen appearing when a final attack is selected on the screen shown in FIG. 64.
Figure 67:
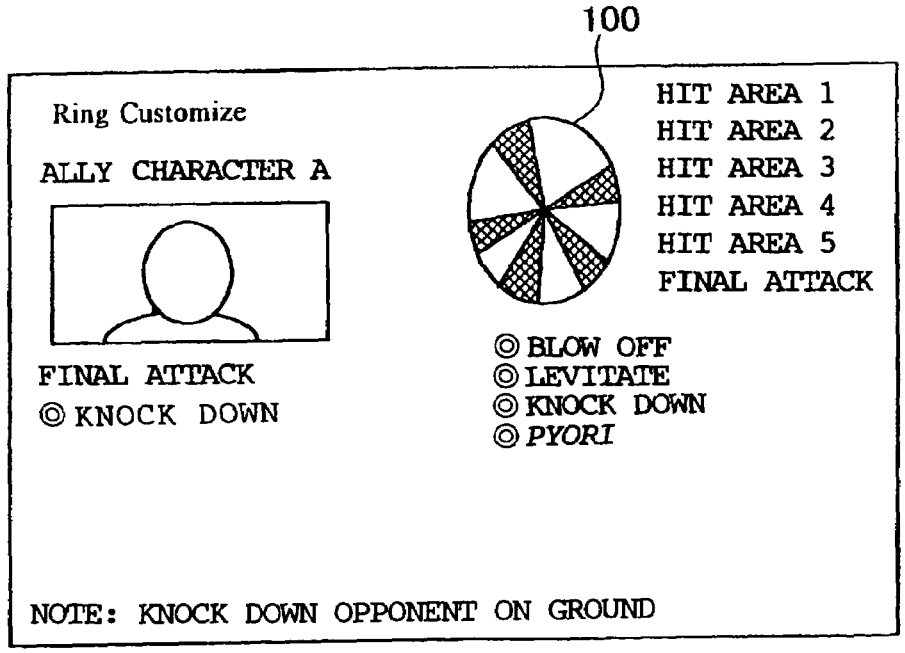
FIG. 67 is a view showing a screen appearing when knock down is selected on the screen shown in FIG. 66.

When the O button 12 is operated while the selection cursor 147 is situated on the left side of Knock Down on the illustrated example screen, the screen turns into the screen shown in FIG. 67. Namely, the currently-selected damage attribute Bend Backward, which is displayed on the left part of the screen shown in FIG. 66, is changed to "Knock Down" displayed in the screen shown in FIG. 67. When the O button 12 is operated in this state, damage attribute determination processing (ST 213) is performed, and "Knock Down" displayed on the left part of the screen is determined as the damage attribute. A plurality of damage attributes cannot be set simultaneously during the damage attribute determination processing.

Figure 68:
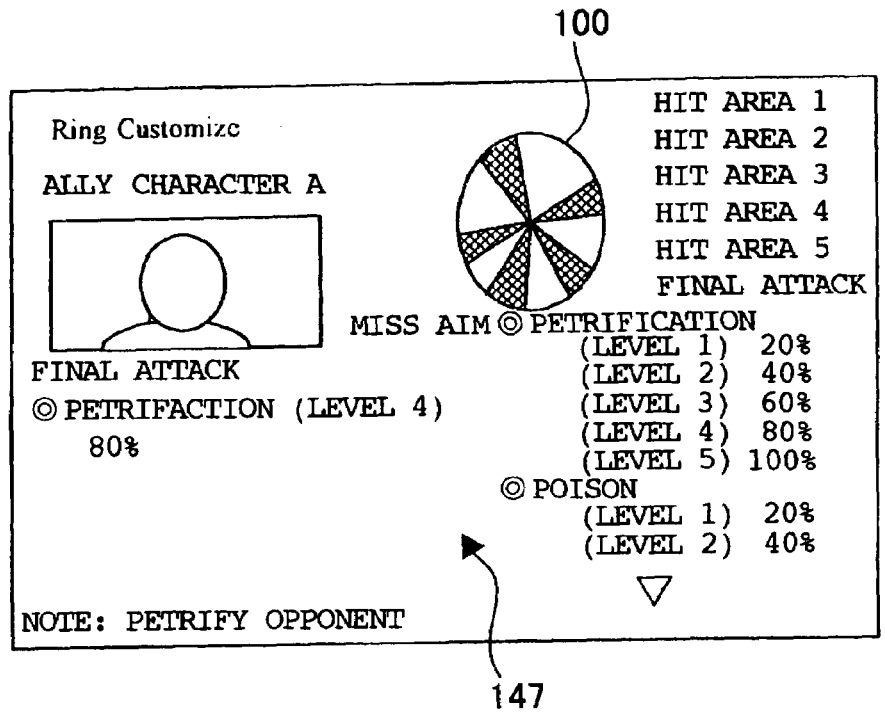
FIG. 68 is a view showing a screen appearing when the O button is operated on the screen shown in FIG. 67.

When the damage attribute has been determined in this manner, the screen turns into the Final Attack Screen shown in FIG. 68. Next, a determination is made as to whether or not a change request has been issued for adding a special effect to a damage attribute attack; that is, the final attack (ST 214). Special effect items which can be added to the final attack are displayed on the right part of the screen on a per-level basis. Petrifaction Items of levels 1 through 5 and Poison items of levels 1, 2 are displayed on the example screen. In addition to the Petrifaction item for rendering the enemy character unable to fight and the Poison item for inflicting a given amount of damage on the enemy character every turn, various special effect items are available; for instance, a Paralyzation item for rendering the enemy character immobilized; a Sealing item for disabling use of the special attack of the enemy character; an Instant Death item for rendering the enemy character unable to fight; an Effort Destroy item for ignoring a state in which the enemy makes an effort to withstand an attack; a Delay item for delaying a timing at which the next turn of the enemy character comes; a Physical Attack Power Down item for reducing the physical attack power of the enemy character; a Special Attack Power Down item for reducing the special attack power of the enemy character; a Physical Defense Power Down item for reducing the special defense power of the enemy character; an Agility Down item for decreasing the agility of action of the enemy character; and an Evasion Rate Down item for slowing an evasion rate at which the enemy character evades the attack of the ally character.

Efficacy levels 1 through 5 have previously been set for the respective items, and the items of these efficacy levels can be displayed on the screen by means of operating the up button 7 or the down button 8 of the controller 4. In the case of the item of level 1, damage inflicted on the enemy character comes to 20%. The items having the levels 2 through 5 inflict on the enemy characters damage of 40%, 60%, 80%, and 100%, respectively.

When the O button 12 is operated with the selection cursor 147 situated on the left side of any one of the Special Effect Items having these levels, YES is selected as a result of determination made in ST 214. Final attack selection screen display processing (ST 215) is performed, and the screen turns into a Final Attack Screen shown in FIG. 69 for use in selecting armament. When the request for changing customization is not the final attack change request, NO is selected as the result of determination made in ST 214, and processing proceeds to ST 217.

Figure 69:
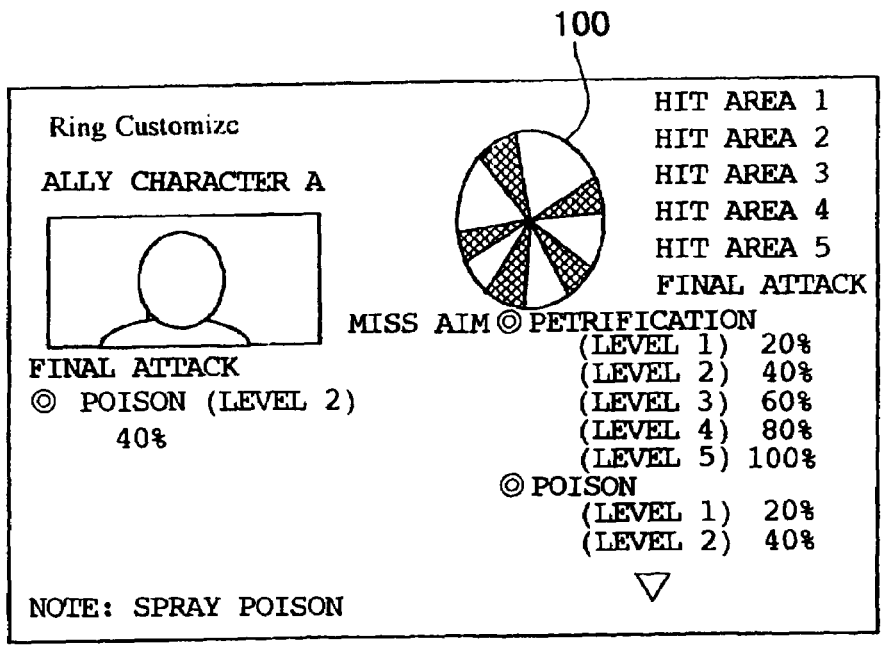
FIG. 69 is a view showing a screen appearing when a poison item of level 2 is selected on the screen shown in FIG. 68.

When the O button 12 is operated with the selection cursor 147 situated on the left side of the Poison Item having level 2 provided in the screen example on FIG. 68, the screen turns into the Final Attack Screen on FIG. 69 for use in selecting armament. Specifically, the currently-selected Petrifaction item of level 4 displayed in the left part of the screen in FIG. 68 is changed to the Poison item of level 2 on the screen in FIG. 69. When the O button 12 is operated in this state, final attack determination processing (ST 216) is performed, and the Poison item of level 2 displayed on the left part of the screen is determined as the special effect item to be added to the final attack. A plurality of special effect items cannot be set simultaneously by means of this final attack determination processing.

In the previous descriptions, the levels have previously been set for the respective special effect items, thereby determining the efficacy of the respective items. However, the number of special effect items to be added to the final attack is increased by operation of the left button 9 or the right button 10 of the controller 4, thereby multiplying the efficacy levels to increase the rate of success and the rate of decrease of efficacy of the respective items.

Finally, the ring parameter update processing (ST 217) is performed, and the parameters determined through customization are updated and stored in the RAM 23, and the ring customization processing is terminated.

According to this embodiment, when the judgment ring 100 is set to the technical ring, the efficacy of the action pattern is activated only when the player has performed operation input through use of the O button 12 when the rotary bar 101 is situated in all the timing areas 102 to 104. Specifically, in a case where the player has performed operation input through use of the O button 12 when the rotary bar 101 is not in any of the timing areas 102 to 104 during the course of the rotary bar 101 passing through any one of the timing areas 102 to 104, the judgment ring processing for determining the operation input timing is terminated at that point in time. Subsequently, the ally character does not make any attack. Therefore, the player comes to perform operation input through use of the O button 12 with care and tension such that the timing at which the O button 12 is operated coincides with a timing at which the rotary bar 101 is situated in any of the timing areas 102 to 104. Therefore, the player comes to feel amusement in operating buttons, and consequently the nature of interest in the game is improved.

As mentioned previously, when there is issued a request for increasing the efficacy of attack power on the timing areas 102 to 104 by 5%, the increase in efficacy of the attack power is doubled, to yield a 10% increase. However, the ranges of the timing areas 102 to 104 are reduced in accordance with the increase and made narrow at both ends of thereof by a factor of two; that is, by 4°. Specifically, the widths of the timing areas 102 to 104 are made narrow in exchange for enhancement of the efficacy of attack power, thereby increasing difficulty of operation input of the O button 12. Therefore, the player comes to perform operation input with much care and tension. Hence, the nature of interest in the game is greatly enhanced.

According to the present embodiment, when the judgment ring 100 is set to the gamble ring, only one timing area is formed in the judgment ring 100, as mentioned previously. Therefore, the player comes to perform operation input through use of the O button 12 with care and tension such that the timing at which the O button 12 is operated coincides with a timing at which the rotary bar 101 is situated in the timing area. Therefore, the player comes to feel amusement in operating buttons, and consequently the nature of interest in the game is improved.

In this case, the rotational speed of the rotary bar 101 achieved in the gamble ring is faster than the rotational speed of the rotary bar achieved in the other rings; that is, the normal ring, the practice ring, and the technical ring. Therefore, the player comes to perform operation input through use of the O button 12 with much greater care and tension. Hence, the nature of interest in game is greatly enhanced.

In such an embodiment, in a case where the judgment ring 100 is set to the practice ring, when the operation input has been performed through use of the O button 12 while the rotary bar 101 is not situated in any of the timing areas 102 to 104 and when there still remains a timing area through which the rotary bar 101 has not yet passed, a determination is made as to the operation input timing even in this timing area. Therefore, even when the player has performed operation input through use of the O button 12 while the rotary bar 101 is in the course of passing through the plurality of timing areas and is not situated in any of the timing areas, determination of the operation input timing is not completed at that point in time, and a determination is made in all the remaining timing areas, as well. The ally character makes attacks in number equal to the number of attacks which are made as a result of the player having performed operation input through use of the O button 12 while the rotary bar 101 is situated in any of the timing areas. According to the present embodiment, the player can perform operation input through use of the O button 12 in all the timing areas, and the chances of the player operating the buttons are increased. Consequently, a beginner player of the game can increase chances of the ally character making attacks, as well. Accordingly, the story of the game unfolds, and the player can sufficiently enjoy the game.

In this case, when operation input has been performed through use of the O button while the rotary bar 101 is not in any of the timing areas, a correction is made such that the efficacy value of the attack power is reduced in accordance with the number of times the operation input has been performed through use of the O button 12 while the rotary bar 101 is not situated in any of the timing areas. Therefore, the player comes to perform operation input with care through use of the O button 12 so as to prevent a correction for reducing the efficacy value of the attack power. Therefore, the player is made aware of an improvement in operation input and quickly becomes accustomed to operation input and quickly acquires skill.

The embodiment of the present invention has been described thus far. However, the present invention is not limited to this embodiment. For instance, the controller 4 to be operated by the player may be provided integrally in the main unit 1.

The present invention can be similarly applied to a portable gaming apparatus integrally comprising an operation section which the player can operate; a display section for displaying an image and generating sound; a storage section for storing a game program; and a control section for performing control processing in accordance with the game program, as well as to a desktop gaming apparatus.

The present invention can also be applied to a so-called network game, wherein the game program is stored in a server connected to a network, such as the Internet, and a player can play the game by connecting a personal computer, a portable cellular phone, or a portable data terminal (PDA) to the server.

Figure 70:
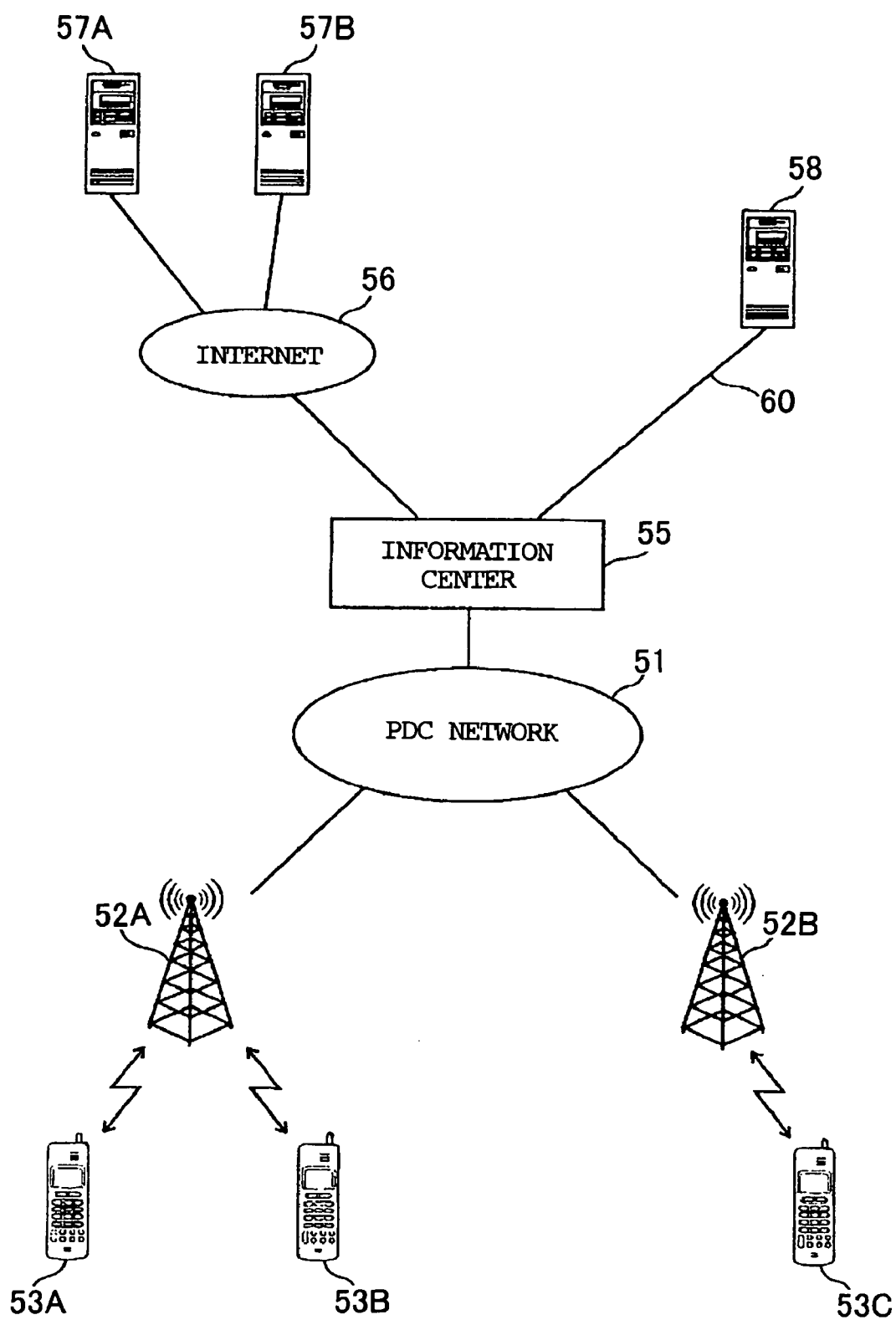
FIG. 70 is a view showing the configuration of a network gaming system.

As an example, a network gaming system shown in FIG. 70 will be described. In this network gaming system, portable cellular phones 53A, 53B, and 53C serving as terminals for playing the game are connected to a PDC network 51 capable of effecting packet communication, by way of base stations 52A, 52B. An access is made to a data center 55 by way of the PDC network 51 in accordance with the player's operation or a game status. In response to the requests from the portable cellular phones 53A, 53B, and 53C, the data center 55 acquires various data sets from servers 57A, 57B, where data required by the game as well as the game program are stored, by way of the network, such as the Internet, and transmits data to be required for playing the game to portable cellular phones 53A, 53B and 53C. As in the case of a server 58 shown in FIG. 70, the server where the game data or the like are stored may be connected to the data center 55 by way of a private communications line 60 without use of the network such as the Internet.

A method which enables a player to play a game is realized by downloading, before commencement of the game, a game program from the servers 57A, 57B to the portable cellular phones 53A, 53B, and 53C, and the game program is executed by means of the portable cellular phones 53A, 53B, and 53C. Moreover, various conceivable methods include a method for imparting the role of a browser to the portable cellular phones 53A, 53B, and 53C by causing the servers 57A, 57B to execute the game program in accordance with commands from the portable cellular phones 53A, 53B, and 53C. Moreover, the portable cellular phones may be interconnected through use of the PDC network 51, thereby enabling the players to share the gaming system or play a multi-player fight game.

According to the present invention, only when the player has made an operation input at the time of an overlap existing between all the effective zones of the reference zone and the variable zone, the efficacy of the action pattern is activated. In a case where the player makes an operation input during the course of the variable zone passing through a plurality of the effective zones and when no overlap exists between the effective zones, determination of the operation input timing is terminated at that point in time. Therefore, the player comes to perform operation input with tension and extra care such that a timing of operation input arises when the effective zone of the reference zone and the variable zone have overlapped each other. Consequently, the player feels amusement in operating the buttons, and interest in the game is enhanced.

When a request for changing the efficacy of the action pattern in the effective zone of the reference zone has been issued through the operation input, the efficacy of the action pattern is multiplied by a predetermined factor equal to the number of times the operation input is performed; and there is performed a step of making narrow the range of the effective zone in accordance with a change for enhancing the effect of the action pattern when the change has been made on the effective zone of the reference zone. In the case of a configuration in which the range of the effective zone of the reference zone is narrowed in accordance with the change, the degree of difficulty of the operation input becomes higher in exchange for enhancement of the action pattern. Therefore, the player comes to perform operation input with much greater tension and care. Accordingly, interest in the game is enhanced to a great extent.

Further, according to the present invention, only one effective zone advantageous to the player is formed in the reference zone or the variable zone of the variable display zone. Therefore, the player comes to perform operation input with tension and extra care such that a timing of operation input arises when the effective zone of the reference zone and the variable zone have overlapped each other. Accordingly, the player feels amusement in operating the buttons, and consequently interest in the game is enhanced.

When the variation speed of the variable zone in the reference zone is faster than that of the variable zone in another type of variable display zone, the player comes to perform operation input with much greater care and tension. Therefore, interest in the game is improved to a great extent.

Moreover, according to the present invention, in a case where the operation input is performed when no overlap exists between the variable zone and the effective zone and where the effective zone, which becomes an object of determination as to timing of the operation at that time, still remains in the reference zone, a determination is made as to timing of the operation input in connection with this remaining effective zone. Therefore, even when the player has performed operation input during the course of the reference zone passing through a plurality of the effective zones and when no overlap exists between the effective zone of the reference zone and the effective zone of the variable zone, a determination as to the timing of the input operation is not terminated at that point in time and is made in connection with all the remaining effective zones to be objects of determination. The character performs action by an amount corresponding to the number of operation inputs performed when an overlap exists between the effective zone of the reference zone and that of the variable zone. Namely, the player becomes able to perform operation input in all the effective zones of the reference zone to be an object of determination, and hence the chance of the player being able to operate the buttons is increased. Consequently, even a beginner player can increase the character's chances of being able to act, thereby unfolding the story of the game. Thus, the player can sufficiently enjoy interest in the game.

In the case of a configuration in which, when the operation input has been made when no overlap exists between the effective zone of the reference zone and the effective zone of the variable zone, the player comes to perform operation input with care such that the efficacy of the action pattern is not corrected. Therefore, the player is made aware of an improvement in operation input and quickly becomes accustomed to operation input and quickly acquires skill.

What is claimed is:

1. A computer-readable program, stored in a storage medium, for implementing a game which displays a plurality of characters on a screen, determines action patterns of the characters by means of a player selecting commands, and causes a story to proceed on the screen, the program comprising the steps of:

displaying on the screen a variable display zone including a reference zone and a variable zone which varies with lapse of time with reference to the reference zone, the reference zone and the variable zone respectively including at least one of a plurality of effective zones whose ranges are set in accordance with a parameter set for each character and which are relatively advantageous to the player and a non-effective zone whose range is set in accordance with a parameter set for each character and which is relatively disadvantageous to the player;

determining whether or not a timing of an operation input performed by way of an operation section when the variable zone has changed with reference to the reference zone corresponds to a time when an overlap exists between effective zones of both the reference zone and the variable zone;

determining the efficacy of the action patterns determined on the basis of a determination result; and activating the efficacy of the action patterns only when the operation input has been performed when an overlap exists between all the effective zones of the reference zone and the effective zone of the variable zone.

2. The program according to claim 1, wherein the reference zone is a circular zone; the effective zones of the reference zone are sector zones of the predetermined center angle range located within the circular zone; and the effective zone of the variable zone is an indicator which rotates around an axis of rotation located at the center of the circular zone.

3. The program according to claim 1, wherein the parameter corresponds to abilities set for each character, the types of items the character has on hand, or the status of the character.

4. The program according to claim 1, further comprising:
a step of multiplying the efficacy of the action patterns by a factor which is a predetermined multiple of the operation input, when a request for changing the efficacy of the action pattern in the effective zone of the reference zone has been issued through the operation input; and
a step of making narrow the range of the effective zone in accordance with a change for enhancing the effect of the action patterns when the change has been made on the effective zone of the reference zone.

5. The program according to claim 1, wherein a special zone is set in the reference zone; and
further comprising a step of activating an efficacy specially set as the efficacy of the action patterns when the operation input has been performed when an overlap exists between all the effective zones of the reference zone and the effective zone of the variable zone and when the operation input has been performed when an overlap exists between the effective zone of the special zone and the effective zone of the variable zone.

6. A gaming machine comprising:
an operation section which can be operated by a player; and
a machine main unit which displays a plurality of characters on a screen, determines action patterns of the characters by means of the player selecting commands, and causes a story to proceed on the screen, wherein the machine main unit comprises
an action pattern determination section which determines the action patterns of the characters in accordance with an operation input performed by way of the operation section;
a variable display control section which displays, on the screen, a variable display zone including a reference zone and a variable zone which varies with lapse of time with reference to the reference zone, the reference zone and the variable zone respectively including at least one of
a plurality of effective zones whose ranges are set in accordance with a parameter set for each character and which are relatively advantageous to the player and
a non-effective zone whose range is set in accordance with a parameter set for each character and which is relatively disadvantageous to the player; and
an action pattern efficacy determination section which determines the efficacy of the action patterns determined in the action pattern determination section on the basis of the result of a determination as to whether or not a timing of an operation input performed by way of the operation section when the variable zone has changed with reference to the reference zone corresponds to a time when an overlap exists between effective zones of both the reference zone and the variable zone, and
activating the efficacy of the action patterns only when the operation input has been performed when an overlap exists between all the effective zones of the reference zone and the effective zone of the variable zone.

7. A computer-readable program, stored in a storage medium, for implementing a game which displays a plurality of characters on a screen, determines an action pattern of a character by means of a player selecting a command, and causes a story to proceed on the screen, the program comprising the steps of:
displaying on the screen a variable display zone including a reference zone and a variable zone which varies with lapse of time with reference to the reference zone, the reference zone and the variable zone respectively including at least one of one effective zone whose range is set in accordance with a parameter set for each character and which is relatively advantageous to the player and a non-effective zone whose range is set in accordance with the parameter set for each character and which is relatively disadvantageous to the player;
determining whether or not a timing of an operation input performed by way of an operation section when the variable zone has changed with reference to the reference zone corresponds to a time when an overlap exists between effective zones of both the reference zone and the variable zone; and
determining the efficacy of the action pattern determined on the basis of a determination result.

8. The program according to claim 7, wherein the reference zone is a circular zone; the effective zone of the reference zone is sector zone of the predetermined center angle range located within the circular zone; and the effective zone of the variable zone is an indicator which rotates around an axis of rotation located at the center of the circular zone.

9. The program according to claim 7, wherein the parameter corresponds to abilities set for each character, the types of items the character has on hand, or the status of the character.

10. The program according to claim 7, further comprising:
a plurality of variable display zones which differ from the variable display zone and which each include a reference zone and a variable zone varying with lapse of time with reference to the reference zone,
wherein variation speed of the variable zone in the variable display zone with reference to the reference zone is set so as to become faster than variation speeds of the respective variable zones with reference to the respective reference zones in a plurality of the respective variable display zones differing from the variable display zone.

11. The program according to claim 10, wherein the variation speeds of the respective variable zones are set in accordance with the parameter.

12. A gaming machine comprising:
an operation section which can be operated by a player; and
a machine main unit which displays a plurality of characters on a screen, determines action patterns of the characters by means of the player selecting commands, and causes a story to proceed on the screen, wherein the machine main unit comprises
an action pattern determination section which determines the action patterns of the characters in accordance with an operation input performed by way of the operation section;
a variable display control section which displays, on the screen, a Variable display zone including a reference zone and a variable zone varying with lapse of time with reference to the reference zone,
the reference zone and the variable zone respectively including at least one of one effective zone whose range is set in accordance with a parameter set for each character and which is relatively advantageous to the player, and
a non-effective zone whose range is set in accordance with a parameter set for each character and which is relatively disadvantageous to the player; and
an action pattern efficacy determination section which determines the efficacy of the action patterns determined in the action pattern determination section on the basis of the result of a determination as to whether or not a timing of the operation input performed by way of the operation section when the variable zone has changed with reference to the reference zone corresponds to a time when an overlap exists between effective zones of both the reference zone and the variable zone.

13. A computer-readable program, stored in a storage medium, for implementing a game which displays a plurality of characters on a screen, determines action patterns of the characters by means of a player selecting a command, and causes a story to proceed on the screen, the program comprising the steps of:
displaying on the screen a variable display zone including a reference zone and a variable zone varying with lapse of time with reference to the reference zone, the reference zone and the variable zone respectively including at least one of a plurality of effective zones whose ranges are set in accordance with a parameter set for each character and which are relatively advantageous to the player and a non-effective zone whose range is set in accordance with a parameter set for each character and which is relatively disadvantageous to the player;
determining whether or not a timing of an operation input performed by way of an operation section when the variable zone has changed with reference to the reference zone corresponds to a time when an overlap exists between effective zones of both the reference zone and the variable zone;
determining the efficacy of the action patterns determined on the basis of a determination result; and
making a determination as to an effective zone to be an object of a determination in a case where the operation input is performed when no overlap exists between the effective zones of both the reference zone and the variable zone and the object effective zone has been left in the reference zone at that time.

14. The program according to claim 13, wherein the reference zone is a circular zone; the effective zones of the reference zone are sector zones of the predetermined center angle range located within the circular zone; and the effective zone of the variable zone is an indicator which rotates around an axis of rotation located at the center of the circular zone.

15. The program according to claim 13, wherein the parameter corresponds to abilities set for each character, the types of items the character has on hand, or the status of the character.

16. The program according to claim 13, wherein, when the operation input has been performed when no overlap exits between the effective zones, the efficacy of the action patterns is corrected.

17. The program according to claim 16, wherein the correction is made corresponding to the number of input operations performed when no overlap exists between the effective zones.

18. The program according to claim 13, wherein a special zone is set in the reference zone; and
further comprising a step of activating an efficacy specially set as the efficacy of the action patterns when the operation input has been performed when an overlap exists between the effective zone of the special zone and the effective zone of the variable zone.

19. A gaming machine comprising:
an operation section which can be operated by a player; and
a machine main unit which displays a plurality of characters on a screen, determines action patterns of the characters by means of the player selecting commands, and causes a story to proceed on the screen, wherein the machine main unit comprises
an action pattern determination section which determines an action pattern of a character in accordance with an operation input performed by way of the operation section;
a variable display control section which displays on the screen a variable display zone including a reference zone and a variable zone varying with lapse of time with reference to the reference zone,
the reference zone and the variable zone respectively including at least one of
a plurality of effective zones whose ranges are set in accordance with a parameter set for each character and which are relatively advantageous to the player and
a non-effective zone whose range is set in accordance with a parameter set for each character and which is relatively disadvantageous to the player; and
an action pattern, efficacy determination section which determines the efficacy of the action pattern determined in the action pattern determination section on the basis of the result of a determination as to whether or not a timing of the operation input performed by way of the operation section when the variable zone has changed with reference to the reference zone corresponds to a time when an overlap exists between effective zones of both the reference zone and the variable zone and
making a determination as to an effective zone to be an object of a determination in a case where the operation input is performed when no overlap exists between the effective zones of both the reference zone and the variable zone and the object effective zone has been left in the reference zone at that time.

20. A gaming machine comprising:
operation means which can be operated by a player; and
a machine main unit which displays a plurality of characters on a screen, determines action patterns of the characters by means of the player selecting commands, and causes a story to proceed on the screen, wherein the machine main unit comprises
action pattern determination means for determining the action patterns of the characters in accordance with an operation input performed by way of the operation means;
variable display control means for displaying, on the screen, a variable display zone including a reference zone and a variable zone varying with lapse of time with reference to the reference zone,
the reference zone and the variable zone respectively including at least one of a plurality of effective zones whose ranges are set in accordance with a parameter set for each character and which are relatively advantageous to the player and a non-effective zone whose range is set in accordance with a parameter set for each character and which is relatively disadvantageous to the player; and action pattern efficacy determination means for determining the efficacy of the action patterns determined in the action pattern determination means on the basis of the result of a determination as to whether or not a timing of the operation input performed by way of the operation means when the variable zone has changed with reference to the reference zone corresponds to a time when an overlap exists between effective zones of both the reference zone and the variable zone and activating the efficacy of the action patterns only when the operation input has been performed when an overlap exists between all the effective zones of the reference zone and the effective zone of the variable zone.

21. A gaming machine comprising:

operation means which can be operated by a player; and a machine main unit which displays a plurality of characters on a screen, determines action patterns of the characters by means of the player selecting commands, and causes a story to proceed on the screen, wherein the machine main unit comprises action pattern determination means for determining the action patterns of the characters in accordance with an operation input performed by way of the operation means;

variable display control means for displaying, on the screen, a variable display zone including a reference zone and a variable zone varying with lapse of time with reference to the reference zone, the reference zone and the variable zone respectively including at least one of an effective zone whose range is set in accordance with a parameter set for each character and which is relatively advantageous to the player and a non-effective zone whose range is set in accordance with a parameter set for each character and which is relatively disadvantageous to the player; and action pattern efficacy determination means for determining the efficacy of the action patterns determined in the action pattern determination means on the basis of the result of a determination as to whether or not a timing of the operation input performed by way of the operation means when the variable zone has changed with reference to the reference zone corresponds to a time when an overlap exists between effective zones of both the reference zone and the variable zone.

22. A gaming machine comprising:

operation means which can be operated by a player; and a machine main unit which displays a plurality of characters on a screen, determines action patterns of the characters by means of the player selecting commands, and causes a story to proceed on the screen, wherein the machine main unit comprises action pattern determination means for determining an action pattern of a character in accordance with an operation input performed by way of the operation means;

variable display control means for displaying on the screen a variable display zone including a reference zone and a variable zone varying with lapse of time with reference to the reference zone, the reference zone and the variable zone respectively including at least one of a plurality of effective zones whose ranges are set in accordance with a parameter set for each character and which are relatively advantageous to the player and a non-effective zone whose range is set in accordance with a parameter set for each character and which is relatively disadvantageous to the player; and action pattern efficacy determination means for determining the efficacy of the action pattern determined in the action pattern determination means on the basis of the result of a determination as to whether or not a timing of the operation input performed by way of the operation means when the variable zone has changed with reference to the reference zone corresponds to a time when an overlap exists between effective zones of both the reference zone and the variable zone and making a determination as to an effective zone to be an object of a determination in a case where the operation input is performed when no overlap exists between the effective zones of both the reference zone and the variable zone and the object effective zone has been left in the reference zone at that time.

* * * * *

UNITED STATES PATENT AND TRADEMARK OFFICE
CERTIFICATE OF CORRECTION

| | | |
|---|---|---|
| PATENT NO. | : 7,223,174 B2 | Page 1 of 1 |
| APPLICATION NO. | : 10/869973 | |
| DATED | : May 29, 2007 | |
| INVENTOR(S) | : Matsuzo Machida | |

It is certified that error appears in the above-identified patent and that said Letters Patent is hereby corrected as shown below:

Column 54,
Line 63, delete "Variable" and substitute therefore -- variable --

Column 56,
Line 34, delete "pattern," and substitute therefore -- pattern --

Signed and Sealed this

Sixth Day of November, 2007

JON W. DUDAS
*Director of the United States Patent and Trademark Office*